US012067950B2

(12) United States Patent
Tomizawa et al.

(10) Patent No.: US 12,067,950 B2
(45) Date of Patent: Aug. 20, 2024

(54) DISPLAY DEVICE

(71) Applicant: Japan Display Inc., Tokyo (JP)

(72) Inventors: Kazunari Tomizawa, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/370,990

(22) Filed: Sep. 21, 2023

(65) Prior Publication Data

US 2024/0105135 A1 Mar. 28, 2024

(30) Foreign Application Priority Data

Sep. 27, 2022 (JP) ................................ 2022-154008

(51) Int. Cl.
*G09G 3/36* (2006.01)

(52) U.S. Cl.
CPC ... *G09G 3/3607* (2013.01); *G09G 2300/0452* (2013.01); *G09G 2310/0213* (2013.01); *G09G 2320/0666* (2013.01)

(58) Field of Classification Search
USPC .......................................................... 345/690
See application file for complete search history.

(56) References Cited

U.S. PATENT DOCUMENTS

2010/0134535 A1* 6/2010 Shidara ................ G09G 3/3208 348/E5.062
2010/0177126 A1* 7/2010 Inoue ..................... G09G 3/007 345/690
2017/0061842 A1* 3/2017 Cok ...................... G09G 3/2003
2018/0018916 A1* 1/2018 Chung ................. G09G 3/3225
2018/0107011 A1* 4/2018 Lu ........................... G09G 3/003
2018/0114495 A1* 4/2018 Jung ..................... G09G 3/3607
2018/0261160 A1* 9/2018 Wu ........................ H10K 50/81
2019/0347974 A1* 11/2019 Henry .................. G09G 3/3216
2019/0355330 A1* 11/2019 Lin ......................... G09G 5/026
2021/0193062 A1* 6/2021 Ikeda ................... G09G 3/3607
2023/0096961 A1* 3/2023 Mi ............................ G09G 3/32 345/55

FOREIGN PATENT DOCUMENTS

WO WO2013/150913 A1 10/2013

* cited by examiner

*Primary Examiner* — Chineyere D Wills-Burns
(74) *Attorney, Agent, or Firm* — K&L Gates LLP

(57) ABSTRACT

A display device includes: a display panel with pixels arranged in a first direction and a second direction; and a light source. Each pixel includes: a first sub-pixel including a color filter for a first color; and a second sub-pixel arranged adjacent to the first sub-pixel in the first direction and including a color filter for a complementary color between a second color and a third color. The light source includes: a first light emitter configured to emit light in the first color; a second light emitter configured to emit light in the second color; and a third light emitter configured to emit light in the third color. One frame period includes: a first light emission period of causing the first and second light emitters to emit light simultaneously; and a second light emission period of causing the first and third light emitters to emit light simultaneously.

16 Claims, 53 Drawing Sheets

DISPLAY DEVICE

CROSS-REFERENCE TO RELATED APPLICATION

This application claims the benefit of priority from Japanese Patent Application No. 2022-154008 filed on Sep. 27, 2022, the entire contents of which are incorporated herein by reference.

BACKGROUND

1. Technical Field

What is disclosed herein relates to a display device.

2. Description of the Related Art

Virtual reality (VR) systems are known in which a head-mounted display (HMD) is placed in front of eyes of a user and the display of images changes with movement of the point of view. In the VR systems, pixels are easily visually recognizable because a displayed video is magnified by lenses. Therefore, the definition of display panels is required to be higher.

In liquid crystal display devices using typical color filters in a plurality of colors, sub-pixels for the plurality of colors constitute one pixel. In contrast, field-sequential color liquid crystal display devices are known. The field-sequential color liquid crystal display device divides one frame period into a plurality of sub-field periods and displays color images by driving pixels by emitting light in colors different between the sub-field periods to a display area. The field-sequential system can express a plurality of colors with one pixel, and therefore, can achieve higher definition than the color filter system in which sub-pixels for a plurality of colors constitute one pixel. However, the field-sequential system displays different colors in a time-division manner, and therefore, causes a problem in that a phenomenon what is called color breakup is likely to occur. Conventionally, systems are disclosed that reduce the occurrence of the color breakup in a liquid crystal display device using the field-sequential system (for example, International Patent Application Publication No. WO 2013/150913).

In a liquid crystal display panel, the upper limit of the frame rate is generally limited by the length of the write period of pixels for one frame and the length of the response period of liquid crystals. Since a field-sequential liquid crystal display panel displays an image for one frame with the plurality of sub-field periods, the write period and the response period may be more difficult to be secured than in a liquid crystal display panel in which a plurality of sub-pixels constitute one pixel.

For the foregoing reasons, there is a need for a display device capable of easing the limitation imposed by the write period and the response period in a field-sequential display panel.

SUMMARY

According to an aspect, a display device includes: a display panel having a display area in which a plurality of pixels are arranged in a first direction and a second direction orthogonal to the first direction; and a light source configured to emit light to the display panel. Each of the pixels includes: a first sub-pixel including a color filter for a first color; and a second sub-pixel that is arranged adjacent to the first sub-pixel in the first direction and includes a color filter for a complementary color between a second color and a third color. The light source includes: a first light emitter configured to emit light in the first color; a second light emitter configured to emit light in the second color; and a third light emitter configured to emit light in the third color. One frame period in which one screen is displayed in the display area includes: a first light emission period of causing the first light emitter and the second light emitter to emit light simultaneously; and a second light emission period of causing the first light emitter and the third light emitter to emit light simultaneously.

DETAILED DESCRIPTION

Figure 1:
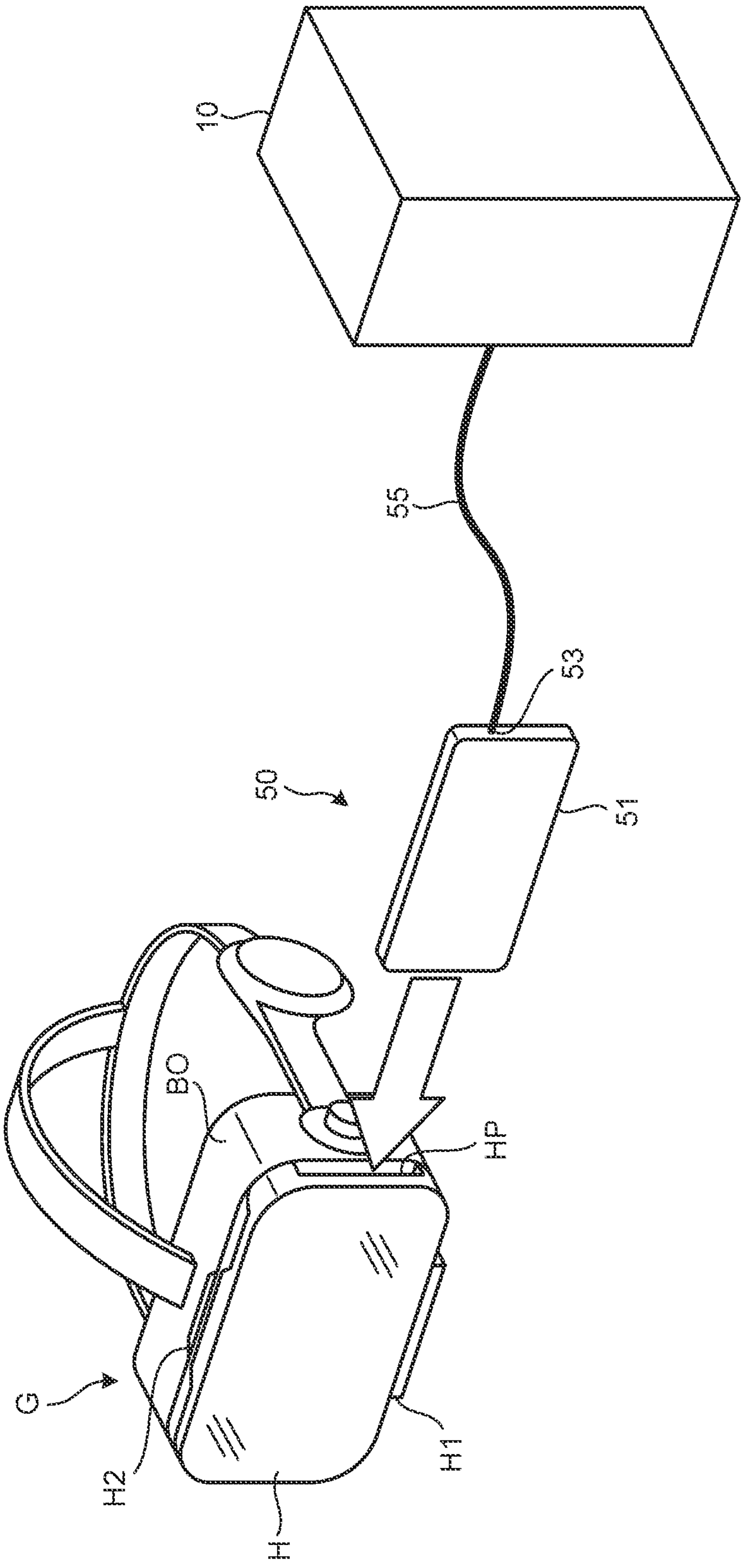
FIG. 1 is a view illustrating a main configuration of a display system.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

Figure 2:
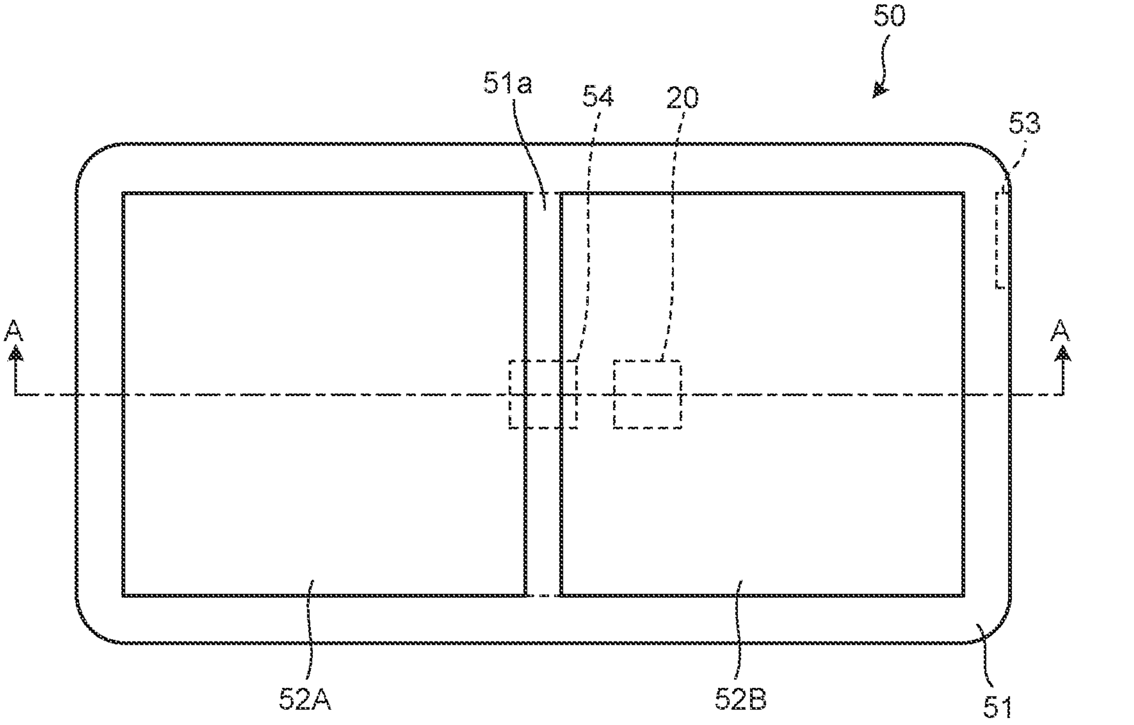
FIG. 2 is a view illustrating a main configuration of a display device.
Figure 3:
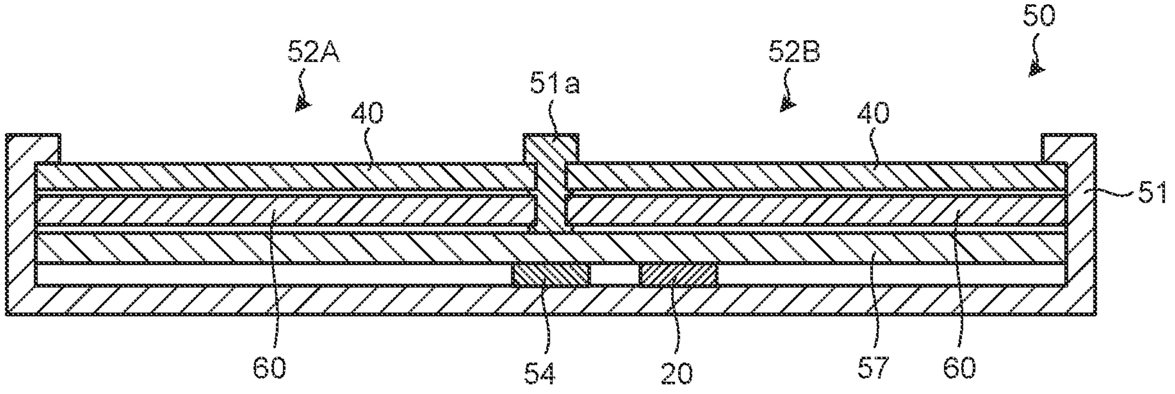
FIG. 3 is an A-A sectional view of FIG. 2.

FIG. 1 is a view illustrating a main configuration of a display system. FIG. 2 is a view illustrating a main configuration of a display device. FIG. 3 is an A-A sectional view of FIG. 2. The display system includes a display device 50 and an information processing device 10. The display device 50 is removably provided on virtual reality (VR) goggles G. When a user views images, the display device 50 is mounted on the VR goggles G. The VR goggles G are a device that supports the display device 50 near the head of the user such that the lines of sight of the user are aligned with two displays 52A and 52B included in the display device 50.

The VR goggles G only need to be goggles that accommodate the display device 50 and are used to support the display device 50 near the head of the user, and are not limited to goggles for displaying VR videos, but may be goggles for displaying videos such as augmented reality (AR) videos and mixed reality (MR) videos.

The VR goggles G include, for example, a housing BO and a holder H. The housing BO and the holder H are rotatably connected to each other using, for example, a hinge H1 as an axis of rotation. A claw H2 is provided on the opposite side to the hinge H1. The claw H2 is a portion that is hooked onto the housing BO in order to fix the holder H to the housing BO. The display device 50 is disposed between the housing BO and the holder H. When mounting the display device 50 onto the VR goggles G, in a state where the fixation of the holder H to the housing BO by the claw H2 is released, the holder H is rotated with respect to the housing BO to secure a gap between the housing BO and the holder H. In this state, the display device 50 is placed between the housing BO and the holder H; the holder H is rotated so as to hook the claw H2 to the housing BO; and the display device 50 is held between the holder H and the housing BO. The VR goggles G may, for example, have an opening HP and be coupled to the display device 50 such that the display device 50 and a cable 55 pass through the opening HP when the display device 50 is placed in an accommodating portion. The structure of the accommodating portion is not limited to this structure, but the holder H may be formed integrally with the housing BO and an opening that allows insertion of the display device 50 may be disposed in a side surface or an upper surface of the holder H. The VR goggles G also include, as a fixture, a ring-shaped band that passes around the side of the head and a band that passes around the top of the head and is connected to the ring-shaped band. The structure of the fixture is not limited to this structure, but may be only a ring-shaped band that passes only through the side of the head, or may be a hook-shaped structure that is hooked over the ears like glasses, or the fixture may be omitted. The VR goggles G are held by the fixture or the hands of the user so as to be disposed near the head and used while accommodating the display device 50 so that the images displayed by the display device 50 are displayed in front of the eyes of the user through the VR goggles G.

The information processing device 10 outputs the images to the display device 50. The information processing device 10 is coupled to the display device 50 through the cable 55, for example. The cable 55 transmits signals between the information processing device 10 and the display device 50. The signals include an image signal Sig2 that is output from the information processing device 10 to the display device 50. The specific form of the coupling between the information processing device 10 and the display device 50 is not limited to that through the cable 55, but may be through wireless communication.

The display device 50 includes, for example, a housing 51, the two displays 52A and 52B, an interface 53, a multiaxial sensor 54, a substrate 57, and a signal processing circuit 20, as illustrated in FIGS. 2 and 3, for example.

The housing 51 holds the other components included in the display device 50. For example, the housing 51 holds the displays 52A and 52B arranged with a predetermined gap interposed therebetween. In the example illustrated in FIG. 2, a partition 51*a* is provided between the displays 52A and 52B, but the partition 51*a* need not be provided.

The displays 52A and 52B are display panels provided so as to be operable independently from each other. In the present disclosure, each of the displays 52A and 52B is a liquid crystal display panel including a display panel 40 and a light source 60.

The display panel 40 is controlled to be driven based on signals from the signal processing circuit 20. The display panel 40 includes, for example, a first substrate 42 and a second substrate 43. Liquid crystals forming a liquid crystal layer (not illustrated) are sealed between the first substrate 42 and the second substrate 43. The light source 60 illuminates the display panel 40 from the back side. The display panel 40 displays the images using the signals from the signal processing circuit 20 and light from the light source 60.

The interface 53 is a coupling portion provided so as to be couplable to the cable 55. Specifically, the interface 53 is an interface obtained by, for example, integrating High-Definition Multimedia Interface (HDMI) (registered trademark) with a Universal Serial Bus (USB) interface. While not illustrated in the drawings, the cable 55 branches to HDMI (registered trademark) and the USB interface on the information processing device 10 side.

The multiaxial sensor 54 is a sensor disposed in the display device 50 to detect a movement of the display device 50. In the display system, the display device 50 is accommodated in the VR goggles G and the VR goggles G is worn by the user, whereby the movement of the user can be detected. The multiaxial sensor 54 and the signal processing circuit 20 are circuitry provided on the substrate 57. The interface 53 is coupled to the displays 52A and 52B, the multiaxial sensor 54, and the signal processing circuit 20 through the substrate 57.

The display device 50 operates by being supplied with power from, for example, the information processing device 10 coupled thereto through the interface 53, but may include an own power supply.

Figure 4:
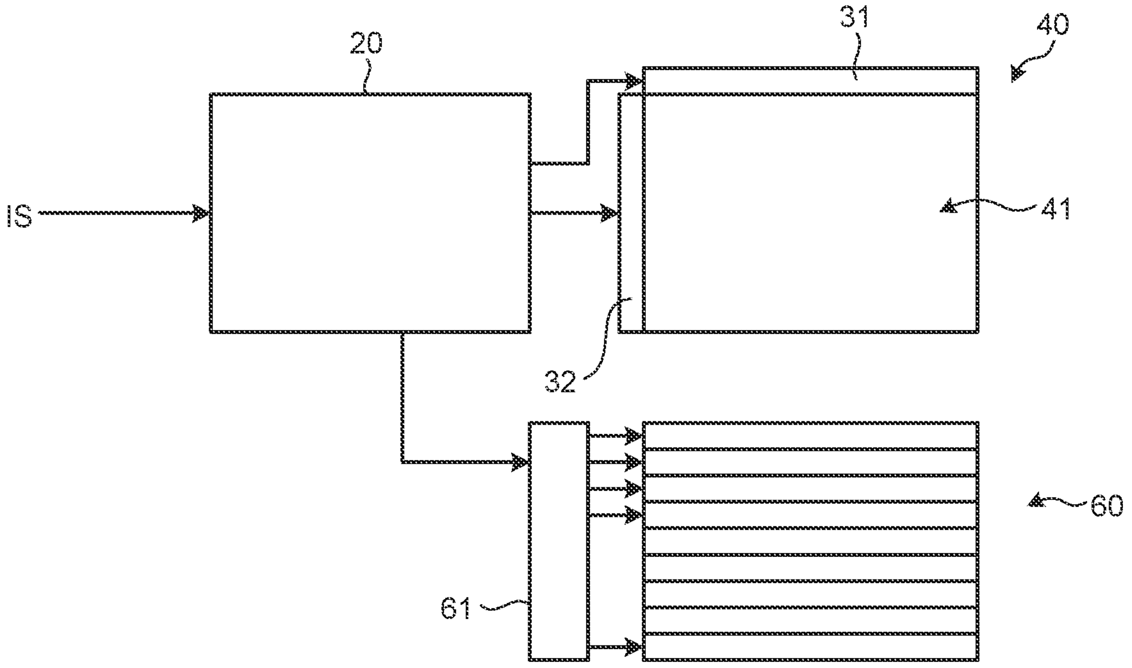
FIG. 4 is a schematic diagram illustrating an exemplary block configuration of the display device according to a first comparative example.
Figure 5:
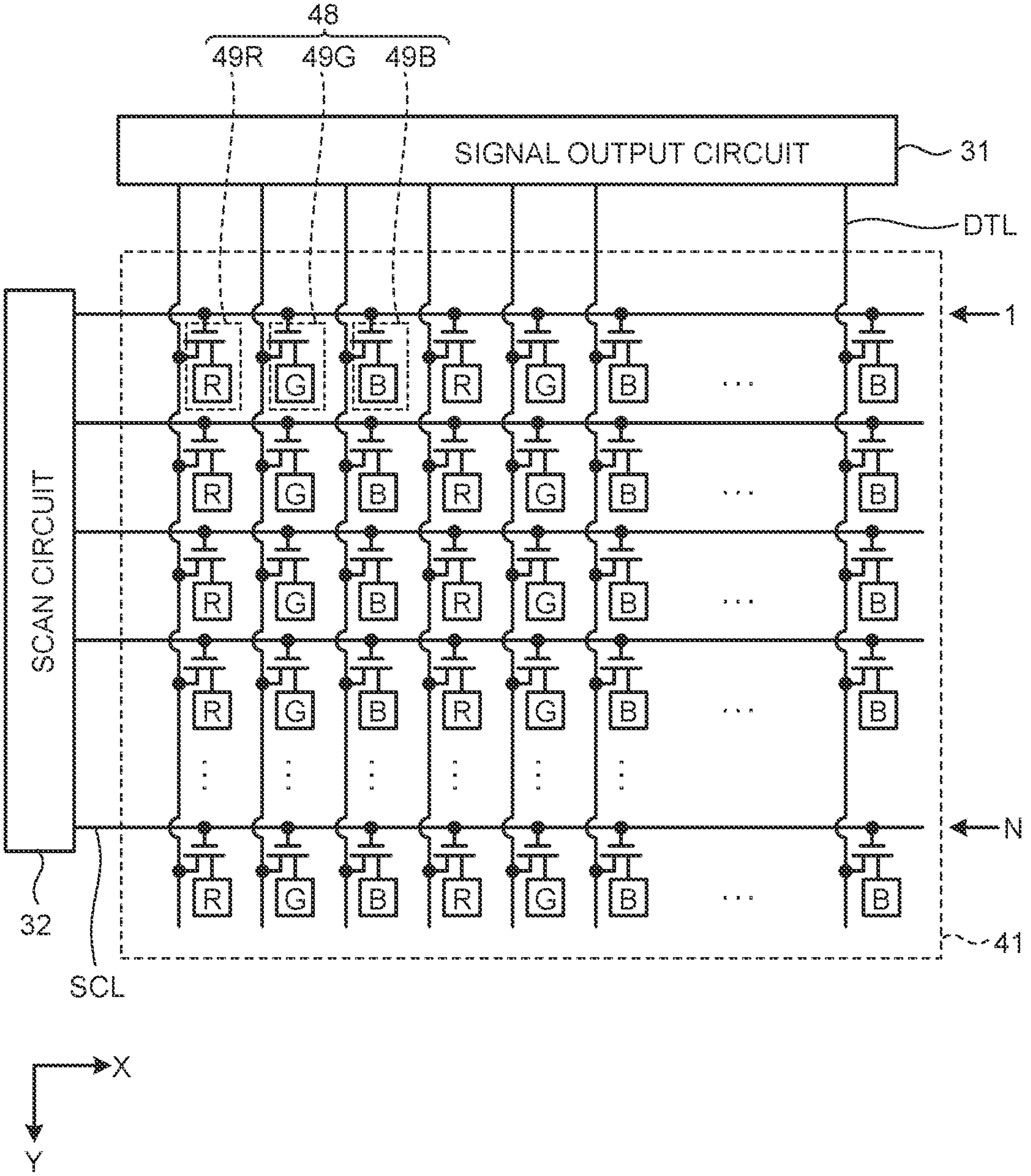
FIG. 5 is a schematic diagram illustrating a configuration example of a display panel according to the first comparative example.

FIG. 4 is a schematic diagram illustrating an exemplary block configuration of the display device according to a first comparative example. FIG. 5 is a schematic diagram illustrating a configuration example of the display panel according to the first comparative example. The configuration of the first comparative example includes the signal processing circuit 20, the display panel 40, and the light source 60 as a main block configuration.

The display panel 40 is provided with a display area 41 in which a plurality of pixels 48 are arranged in an X-direction (first direction) and a Y-direction (second direction).

As illustrated in FIG. 5, each of the pixels 48 includes, for example, a first sub-pixel 49R that displays a first color (for example, red (R)), a second sub-pixel 49G that displays a second color (for example, green (G)), and a third sub-pixel 49B that displays a third color (for example, blue (B)). The example illustrated in FIG. 5 illustrates a configuration including a pixel configuration having a stripe array in which the first, the second, and the third sub-pixels 49R, 49G, and 49B are arranged in the X direction.

The display panel 40 is, for example, a transmissive color liquid crystal display panel. A first color filter that overlaps a position provided with a pixel electrode of the first sub-pixel 49R and transmits light in the first color is disposed on the display panel 40. A second color filter that overlaps a position provided with a pixel electrode of the second sub-pixel 49G and transmits light in the second color is also disposed on the display panel 40. A third color filter that overlaps a position provided with a pixel electrode of the third sub-pixel 49B and transmits light in the third color is also disposed on the display panel 40.

The orientation of liquid crystal molecules contained in the liquid crystal layer of the display panel 40 is determined correspondingly to the potential of the pixel electrode. Thus, the light transmittance of the first, the second, and the third sub-pixels 49R, 49G, and 49B is controlled.

The display panel 40 includes a signal output circuit 31 and a scan circuit 32.

The signal output circuit 31 outputs an image signal having a predetermined potential corresponding to a video signal from the signal processing circuit 20 to the display panel 40 The signal output circuit 31 is electrically coupled to the display panel 40 through signal lines DTL.

The scan circuit 32 controls ON/OFF of switching elements to control the operation (light transmittance) of the first, the second, and the third sub-pixels 49R, 49G, and 49B on the display panel 40. The switching elements are thin-film transistors (TFTs), for example. Hereafter, the switching elements provided in the first, the second, and the third sub-pixels 49R, 49G, and 49B are each also referred to as a "pixel transistor". The scan circuit 32 is electrically coupled to the display panel 40 through scan lines SCL.

The scan circuit 32 outputs drive signals to a predetermined number of the scan lines SCL, and thus drives the first, the second, and the third sub-pixels 49R, 49G, and 49B coupled to the scan lines SCL to which the drive signals are output. The pixel transistors of the first, the second, and the third sub-pixels 49R, 49G, and 49B are turned on in response to the drive signals, and pixel signals having potentials corresponding to the image signals are transmitted through the signal lines DTL to the pixel electrodes and potential holders (such as capacitors) of the first, the second, and the third sub-pixels 49R, 49G, and 49B. The scan circuit 32 scans the display panel 40 by shifting the scan line SCL to which the drive signal is output.

The scan lines SCL are arranged in the Y-direction. In the present disclosure, the number of the scan lines SCL is N (where N is a natural number). Each of the scan lines SCL extends in the X-direction. The pixels 48 arranged in the X-direction share the scan line SCL. Therefore, the pixels 48 sharing the same scan line SCL are driven at the same time in response to the drive signal. The scan circuit 32 sequentially supplies the drive signals to the first, the second, and the third sub-pixels 49R, 49G, and 49B arranged in the Y-direction in the display area 41.

The scan circuit 32 shifts the output target of the drive signal from a scan line SCL(1) toward a scan line SCL(N). Alternatively, in an aspect of the present disclosure, the output target of the drive signal may be shifted from the scan line SCL(N) toward the scan line SCL(1). In the present disclosure, an example will be described in which the output target of the drive signal is shifted from the scan line SCL(1) toward the scan line SCL(N).

The light source 60 is disposed on the back side of the display panel 40. The light source 60 emits light toward the display panel 40.

As illustrated in FIG. 4, the light source 60 includes a plurality of light emitters. The light emitters may be arranged in a plane on the light source 60, or the light emitters may be arranged at an end of a light guide plate to emit light to a display surface of the display panel 40 (side light source). The light emitters are light-emitting diodes (LEDs), for example, but are not limited thereto. The light emitters only need to be configured to be individually controllable, and may be cold cathode fluorescent lamps (CCFLs), for example. The light emitters are coupled to a light source control circuit 61. The light source control circuit 61 controls the light emission timing, the light emission duration, and the light emission intensity under the operational control of the signal processing circuit 20.

The signal processing circuit 20 controls the display output by the display device 50 by outputting various signals for controlling the operation timing of the signal output circuit 31, the scan circuit 32, and the light source control circuit 61 in accordance with an input signal IS from the information processing device 10.

The signal processing circuit 20 sequentially receives frame image signals the number of which corresponds to a frame rate as the input signal IS. The frame rate indicates the number of frame images displayed in predetermined time (for example, one second). The scanning of the display area 41 is periodically repeated according to the frame rate, and the image signals corresponding to the frame images are given to the pixels 48 to update the display output.

Figure 6:
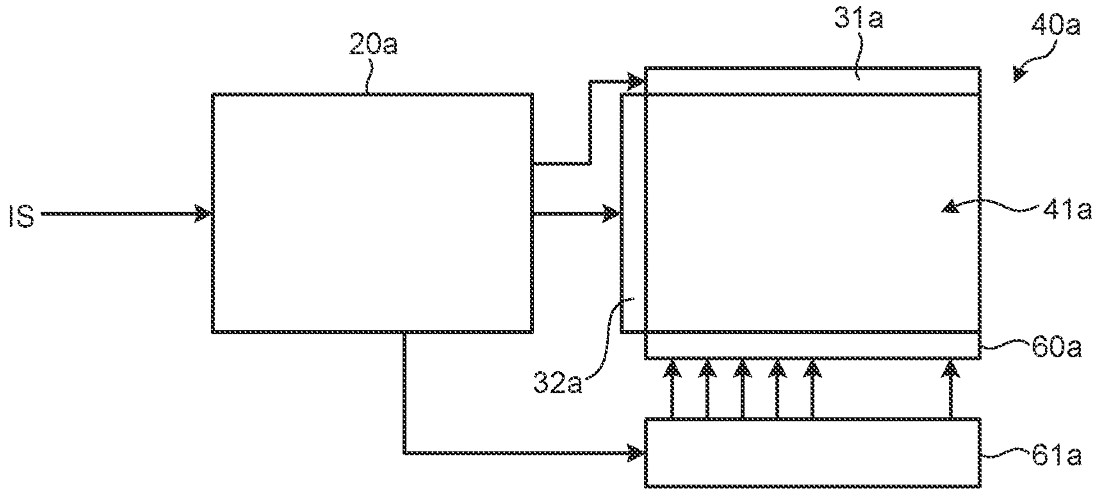
FIG. 6 is a schematic diagram illustrating an exemplary block configuration of the display device according to a second comparative example.
Figure 7:
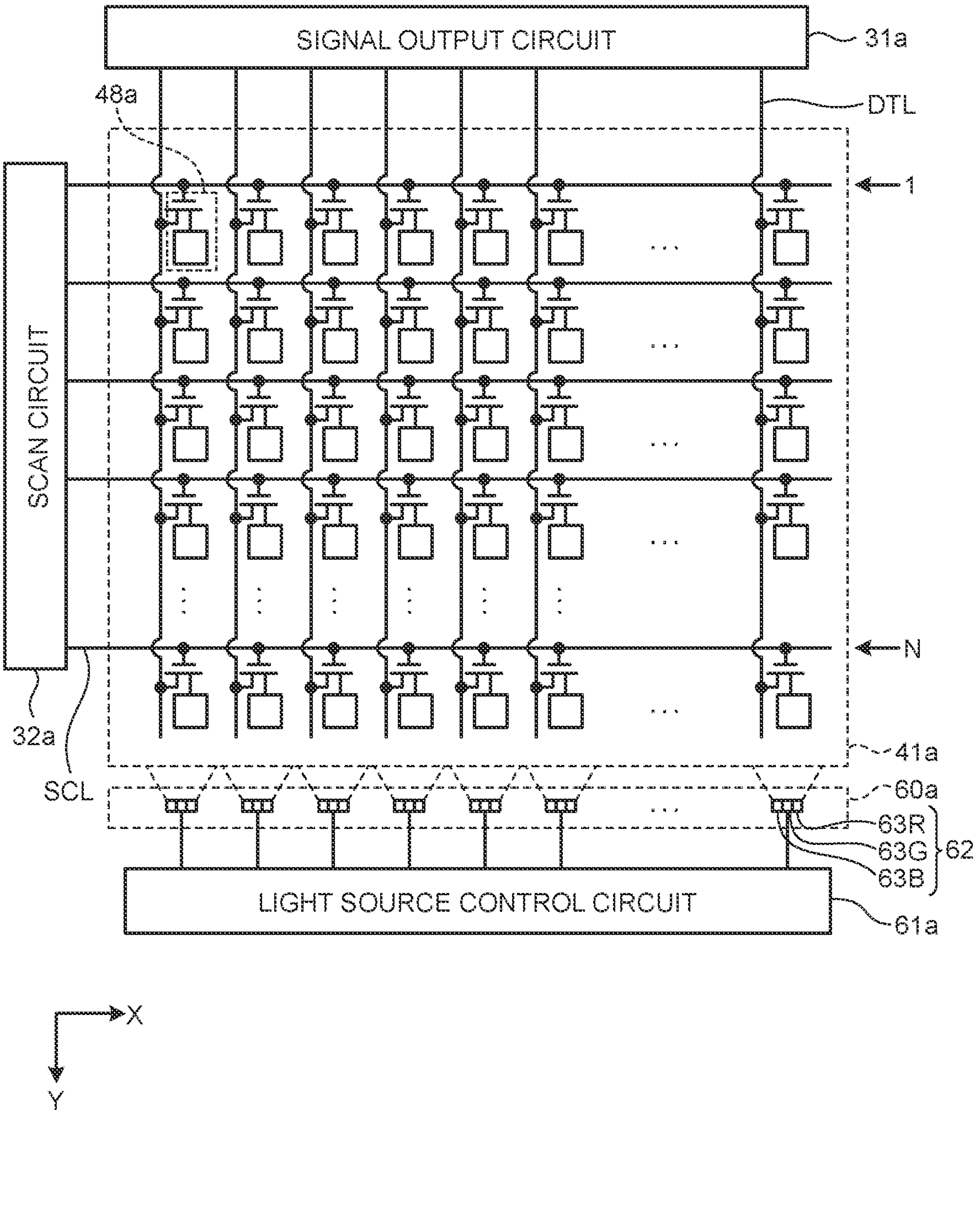
FIG. 7 is a schematic diagram illustrating a configuration example of a display panel according to the second comparative example.

FIG. 6 is a schematic diagram illustrating an exemplary block configuration of the display device according to a second comparative example. FIG. 7 is a schematic diagram illustrating a configuration example of a display panel according to the second comparative example. The configuration according to the second comparative example includes a signal processing circuit 20*a*, a display panel 40*a*, and a light source 60*a* as a main block configuration. In the configuration according to the second comparative example, the display panel 40*a* is, for example, an active matrix color liquid crystal display panel driven based on a field-sequential system.

The display panel 40*a* is provided with a display area 41*a* in which a plurality of pixels 48*a* are arranged in the X-direction (first direction) and the Y-direction (second direction).

The signal processing circuit 20*a* controls the display output by the display device 50 by outputting the various signals for controlling the operation of a signal output circuit 31*a*, a scan circuit 32*a*, and a light source control circuit 61*a* in accordance with the input signal IS from the information processing device 10.

In the configuration according to the second comparative example, the light source 60*a* includes a plurality of light-emitting devices 62. The light source 60*a* is coupled to the light source control circuit 61*a*. The light source 60*a* is called a side light source. Light emitted from a plurality of light emitters arranged at an end of a light guide plate is transmitted through the light guide plate and emitted from the light source 60*a*. The light emitted from the light source 60*a* passes through the display panel 40*a* to enable the display output.

Each of the light-emitting devices 62 includes a light emitter 63R of a first color (such as red), a light emitter 63G of a second color (such as green), and a light emitter 63B of a third color (such as blue). The light source control circuit 61*a* controls each of the light emitter 63R of the first color, the light emitter 63G of the second color, and the light emitter 63B of the third color to emit light in a time-division manner based on a light source control signal from the signal processing circuit 20*a*. Thus, the light emitter 63R of the first color, the light emitter 63G of the second color, and the light emitter 63B of the third color are driven based on the field-sequential system. The light source control signal is, for example, a signal containing information on the light intensity of the light-emitting device 62 that is set according to an input gradation value to each of the pixels 48*a*. For example, when a darker image is to be displayed, the light intensity of the light-emitting device 62 is set lower. When a brighter image is to be displayed, the light intensity of the light-emitting device 62 is set higher.

Figure 8:
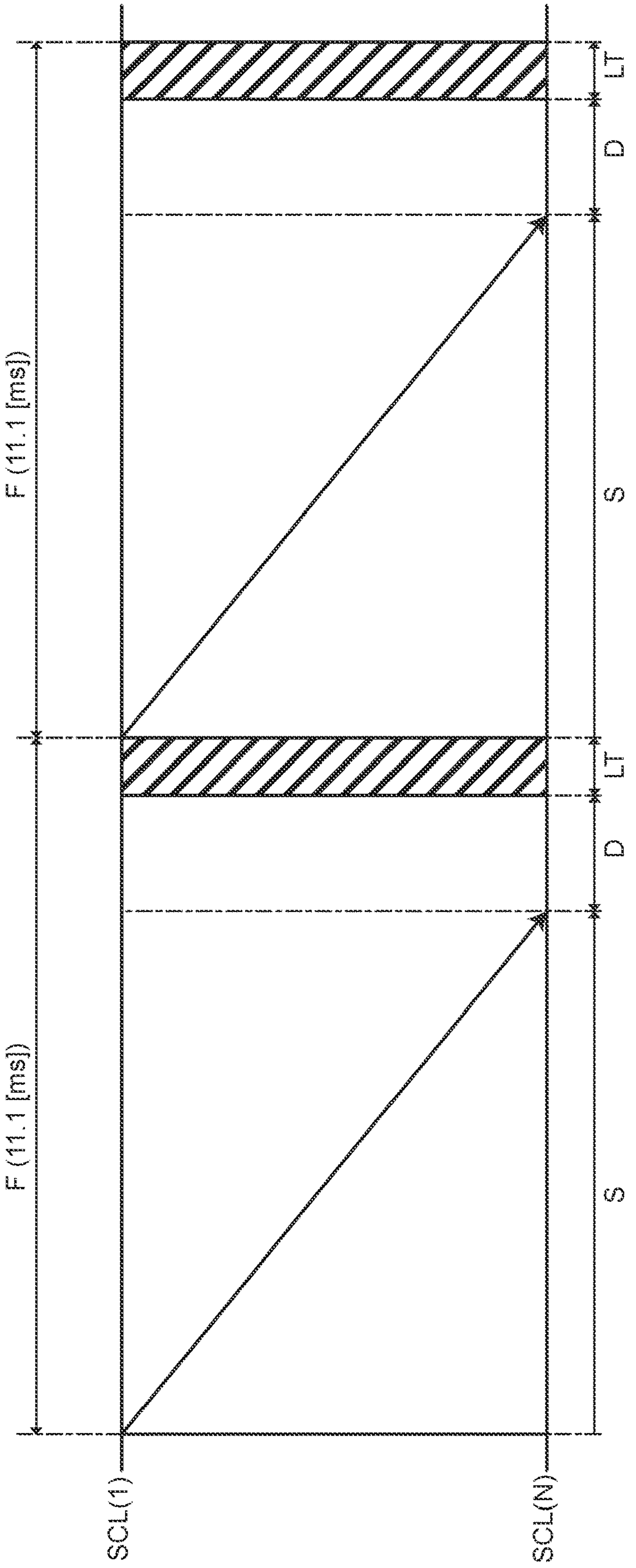
FIG. 8 is a timing diagram illustrating an example of a write period, a response period, and a light emission period in one frame period of the display device according to the first comparative example.
Figure 9:
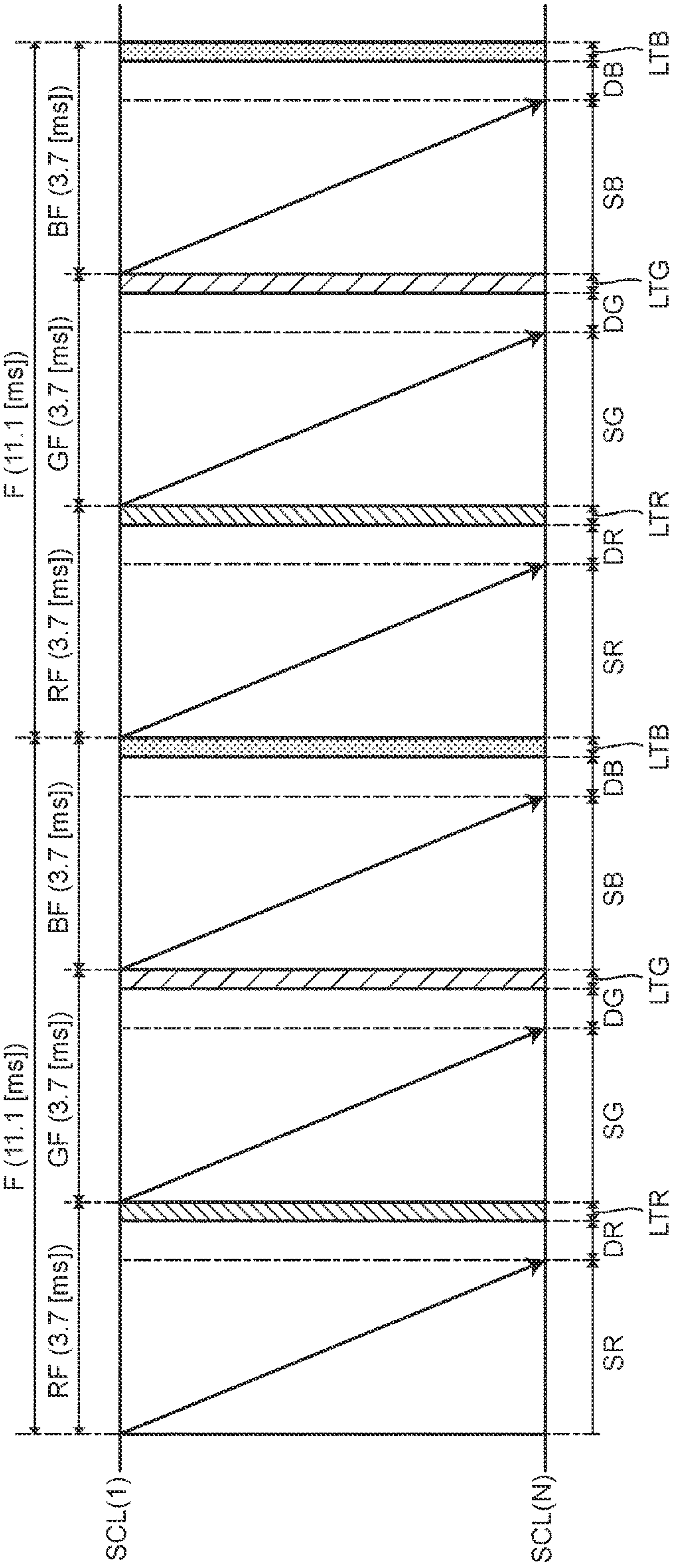
FIG. 9 is a timing diagram illustrating an example of the write period, the response period, and the light emission period in one frame period of the display device according to the second comparative example.

FIG. 8 is a timing diagram illustrating an example of a write period, a response period, and a light emission period in one frame period of the display device according to the first comparative example. FIG. 9 is a timing diagram illustrating an example of the write period, the response period, and the light emission period in one frame period of the display device according to the second comparative example. Hereafter, a period in which one frame image (one screen) is displayed in the display area is referred to as one frame period F. In the present disclosure, one frame period F is 11.1 ms, for example. That is, in the present disclosure, the frame rate is set at 90 Hz.

In the configuration using the display panel 40 based on the color filter system described in the first comparative example, the first color filter that transmits light in the first color, the second color filter that transmits light in the second color, and the third color filter that transmits light in the third color are provided in the positions overlapping the pixel electrodes of the first, the second, and the third sub-pixels 49R, 49G, and 49B. A color image is displayed by simultaneously driving the first, the second, and the third sub-pixels 49R, 49G, and 49B in one frame period F.

As illustrated in FIG. 8, in the first comparative example, the drive signals are sequentially supplied to the scan lines SCL(1) to SCL(N) during one frame period F; and the pixel signals corresponding to the first, the second, and the third sub-pixels 49R, 49G, and 49B of each of the pixels 48 coupled to each of the scan lines SCL are written to the first, the second, and the third sub-pixels 49R, 49G, and 49B, respectively. In the first comparative example, a response period D of the liquid crystals is provided between a write period S of sub pixels and a light emission period LT of the light source 60. The write period S is a period in which the writing is performed to the first, the second, and the third sub-pixels 49R, 49G, and 49B of each of all the pixels 48 in the display area 41.

In the field-sequential display panel 40*a* described in the second comparative example, images in the first, the second, and the third colors are displayed in one frame period F by driving each of the pixels 48*a* in a time-division manner in one frame period F. Since the human eye has a limited resolution in terms of time and afterimages occur, an image in which three colors are composed (mixed) is recognized in one frame period F.

As illustrated in FIG. 9, in the second comparative example, one frame period F is equally divided into three periods of a first sub-field period RF, a second sub-field period GF, and a third sub-field period BF.

A write period SR for the first color is provided in the first sub-field period RF, and a response period DR is provided between the write period SR and a light emission period LTR of the light emitter 63R of the first color. A write period SG for the second color is provided in the second sub-field period GF, and a response period DG is provided between the write period SG and a light emission period LTG of the light emitter 63G of the second color. A write period SB for the third color is provided in the third sub-field period BF, and a response period DB is provided between the write period SB and a light emission period LTB of the light emitter 63B of the third color.

When one frame period F is 11.1 ms in the same manner as in the first comparative example, each of the first sub-field period RF, the second sub-field period GF, and the third sub-field period BF is 3.7 ms. In this case, the sufficient write period and the sufficient response period are sometimes not ensured in each of the sub-field periods compared with the first comparative example.

The following describes a configuration and an operation of the field-sequential display panel that can ease the limitation imposed by the write period and the response period. In the following description, the first color, the second color, and the third color are each one of three primary colors (red, green, and blue) of light.

First Embodiment

Figure 10:
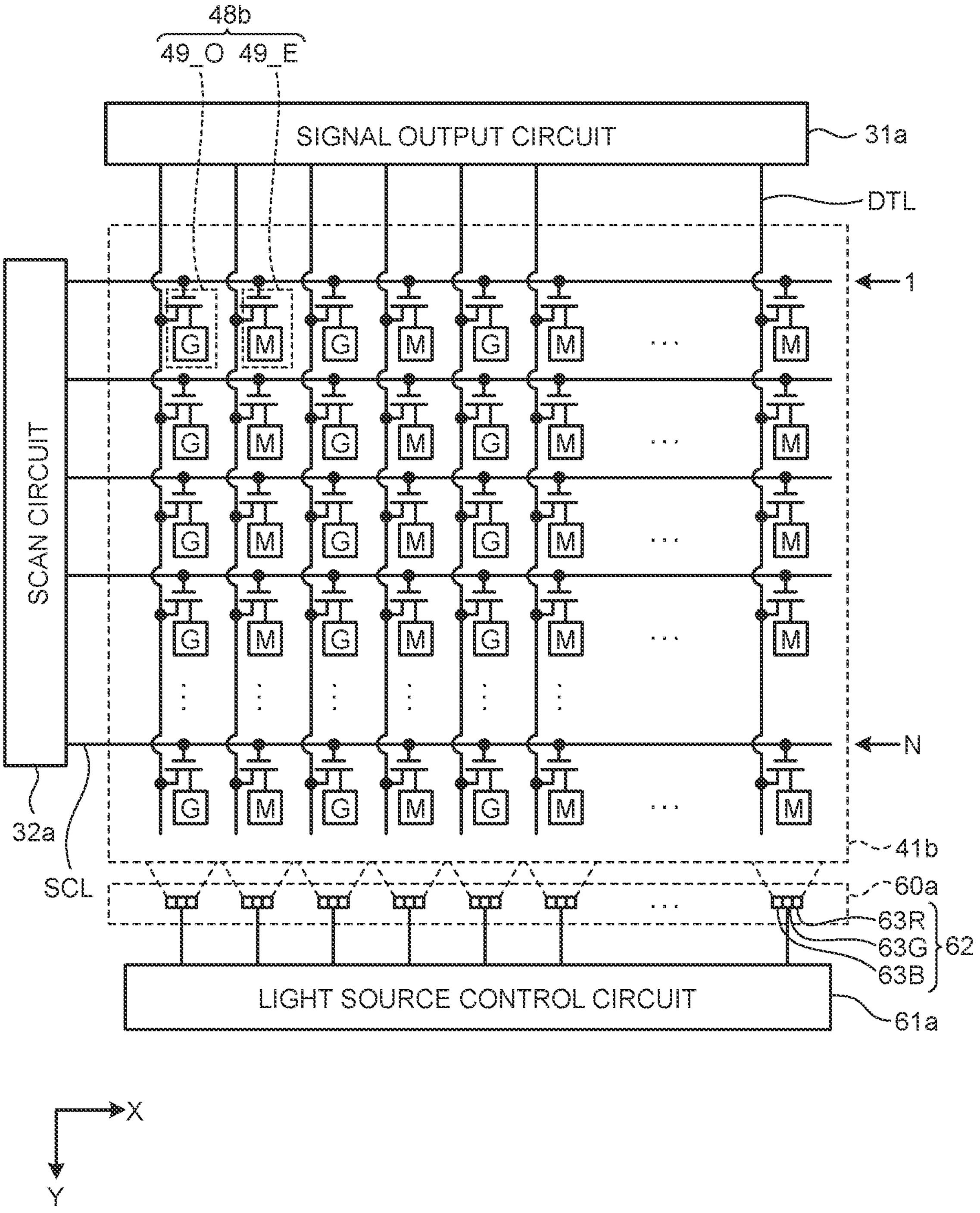
FIG. 10 is a schematic diagram illustrating a configuration example of the display panel of the display device according to a first embodiment of the present disclosure.

FIG. 10 is a schematic diagram illustrating a configuration example of the display panel according to a first embodiment of the present disclosure. The block configuration of the display device according to the first embodiment is the same as that of the second comparative example illustrated in FIG. 6, and therefore, will not be described in detail.

In the configuration according to the first embodiment, a pixel 48*b* includes a first sub-pixel 49_O that displays green (first color) and a second sub-pixel 49_E that is arranged adjacent to the first sub-pixel 49_O in the X direction.

In the configuration according to the first embodiment, the first color filter that overlaps a position in a display area 41*b* where a pixel electrode of the first sub-pixel 49_O is provided and transmits light in green (first color) is disposed on the display panel 40*a*. In the configuration according to the first embodiment, the second color filter that overlaps a position in the display area 41*b* where a pixel electrode of the second sub-pixel 49_E is provided and transmits light in red (second color) or blue (third color) is disposed on the display panel 40*a*. The second color filter is a color filter of magenta that is a complementary color between red (second color) and blue (third color).

The magenta color filter has a property of transmitting light having a wavelength of red (second color) and transmitting light having a wavelength of blue (third color). Therefore, by causing the light emitter 63R of red (second color) and the light emitter 63B of blue (third color) to emit light in a time-division manner, two colors of red (second color) and blue (third color) can be displayed by the second sub-pixel 49_E.

Figure 11:
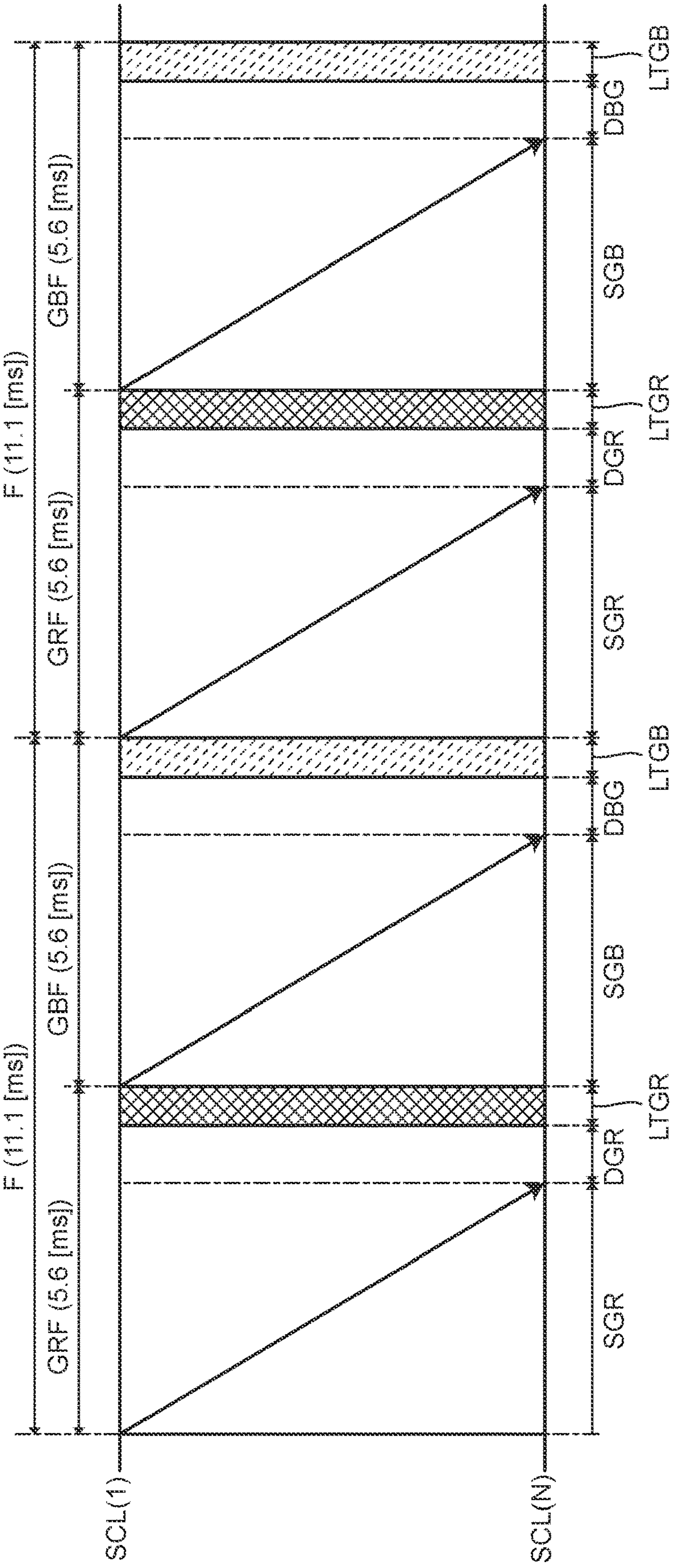
FIG. 11 is a timing diagram illustrating an example of the write period, the response period, and the light emission period in one frame period of the display device according to the first embodiment.

FIG. 11 is a timing diagram illustrating an example of the write period, the response period, and the light emission period in one frame period of the display device according to the first embodiment.

Figure 12A:
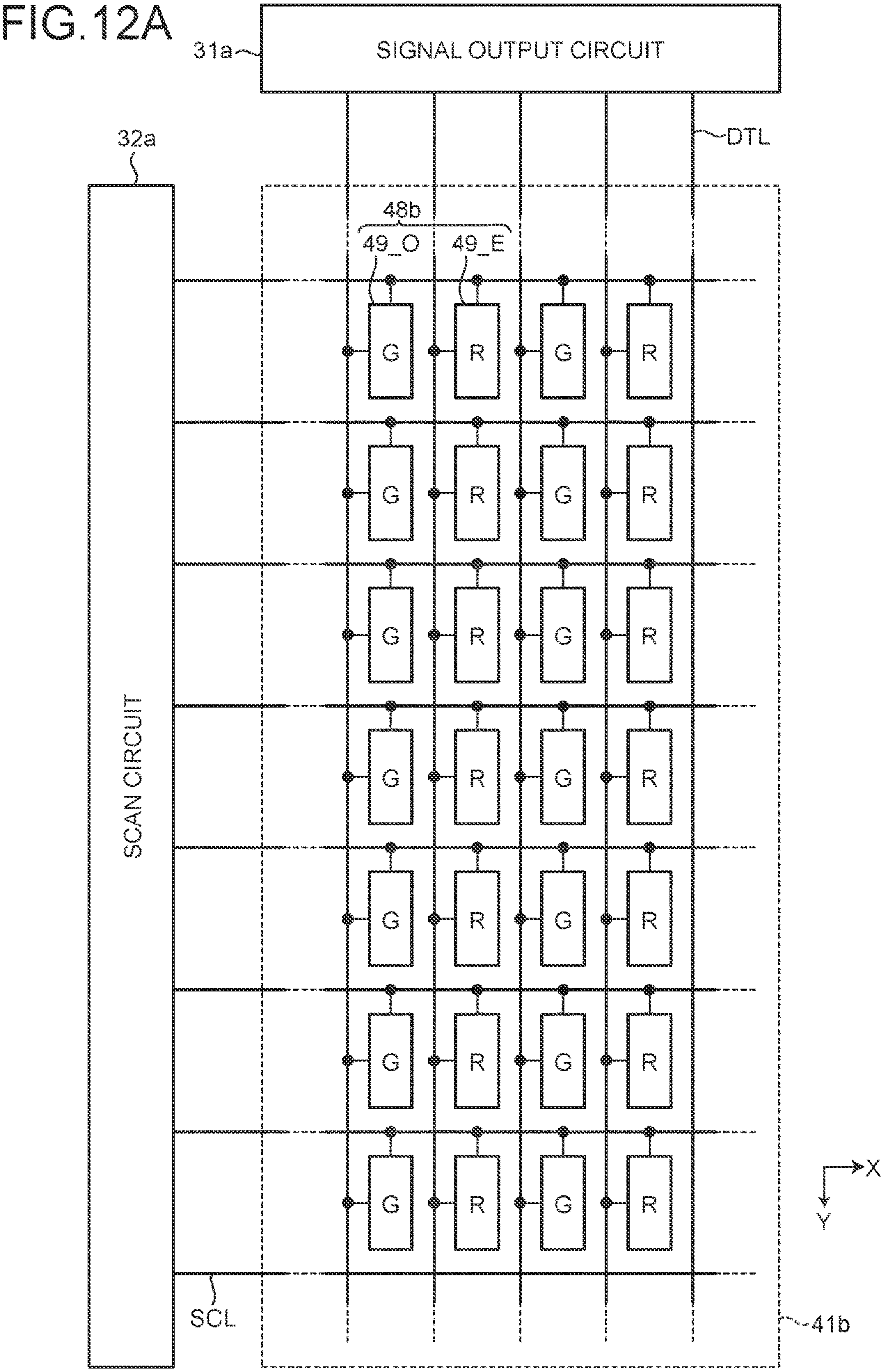
FIG. 12A is a diagram illustrating an exemplary display state in a first sub-field period of the display device according to the first embodiment.
Figure 12B:
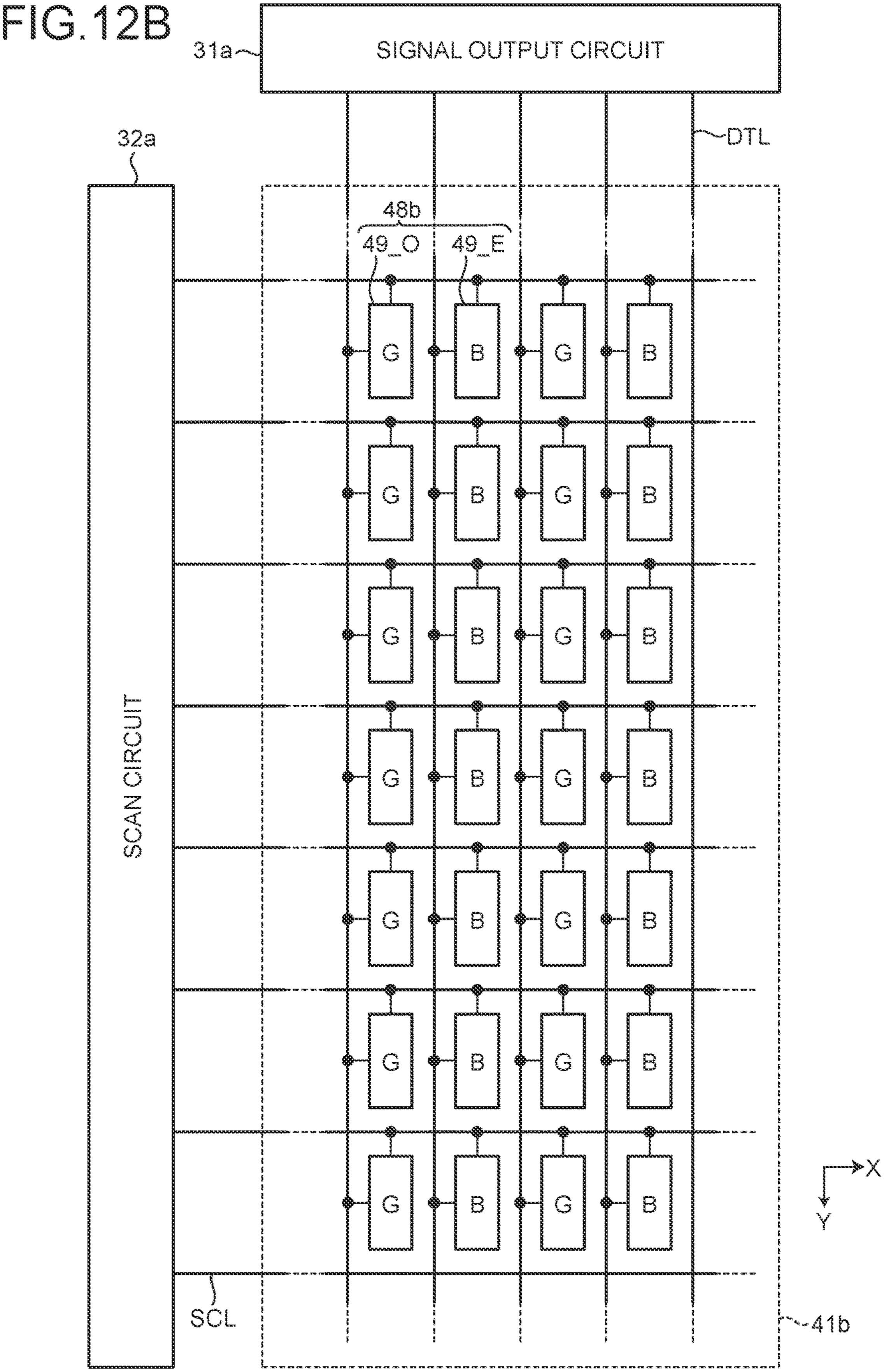
FIG. 12B is a diagram illustrating an exemplary display state in a second sub-field period of the display device according to the first embodiment.

As illustrated in FIG. 11, in the first embodiment, one frame period F is divided into two periods of a first sub-field period GRF and a second sub-field period GBF. FIG. 12A is a diagram illustrating an exemplary display state in the first sub-field period of the display device according to the first embodiment. FIG. 12B is a diagram illustrating an exemplary display state in the second sub-field period of the display device according to the first embodiment.

The first sub-field period GRF includes a first write period SGR of writing green (first color) pixel signals to the first sub-pixels 49_O and writing red (second color) pixel signals to the second sub-pixels 49_E. After the first write period SGR, a first light emission period LTGR is provided to cause the light emitters 63G of green (first color) and the light emitters 63R of red (second color) to emit light simultaneously.

The scan circuit 32*a* sequentially supplies the drive signals to the scan lines SCL(1) to SCL(N) during the first write period SGR of the first sub-field period GRF, and the signal output circuit 31*a* outputs the pixel signals corresponding to the first sub-pixels 49_O and the second sub-pixels 49_E. Then, during the first light emission period LTGR after a first response period DGR, the light source control circuit 61*a* controls the light emitters 63G of green (first color) and the light emitters 63R of red (second color) to emit light simultaneously. As a result, as illustrated in FIG. 12A, an image in green (first color) and red (second color) is displayed in the display area 41*b* during the first sub-field period GRF.

The subsequent second sub-field period GBF includes a second write period SGB of writing the green (first color) pixel signals to the first sub-pixels 49_O and writing blue (third color) pixel signals to the second sub-pixels 49_E. After the second write period SGB, a second emission period LTGB is provided to cause the light emitters 63G of green (first color) and the light emitters 63B of blue (third color) to emit light simultaneously.

The scan circuit 32*a* sequentially supplies the drive signals to the scan lines SCL(1) to SCL(N) during the second write period SGB of the second sub-field period GBF, and the signal output circuit 31*a* outputs the pixel signals corresponding to the first sub-pixels 49_O and the second sub-pixels 49_E. Then, during the second light emission period LTGB after a second response period DGB, the light source control circuit 61*a* controls the light emitters 63G of green (first color) and the light emitters 63B of blue (third color) to emit light simultaneously. As a result, as illustrated in FIG. 12B, an image in green (first color) and blue (third color) is displayed in the display area 41*b* during the second sub-field period GBF.

In the configuration and the operation of the first embodiment, for example, when one frame period F is 11.1 ms, the first sub-field period GRF and the second sub-field period GBF are each 5.6 ms. As a result, the limitation imposed by the write period and the response period in each of the sub-field periods can be more eased than in the second comparative example described above.

In the configuration and the operation of the first embodiment, the first sub-pixel 49_O displays a green color, which has higher luminance, during both the first sub-field period GRF and the second sub-field period GBF; the second sub-pixel 49_E displays a red color, which is less luminous than the green color, during the first sub-field period GRF; and the second sub-pixel 49_E displays a blue color, which is less luminous than the green color, during the second sub-field period GBF. That is, the green color, which has high luminance, is always lit during the light emission period of each of the sub-field periods, and the red and blue colors, which are relatively less luminous, are alternately lit in each of the sub-field periods. Therefore, there is an advantage that a phenomenon what is called flicker is less visually recognizable.

The colors displayed by the first sub-pixel 49_O and the second sub-pixel 49_E can be changed. The following describes modifications of the first embodiment in which the display colors of the first sub-pixel 49_O and the second sub-pixel 49_E are changed.

First Modification

Figure 13:
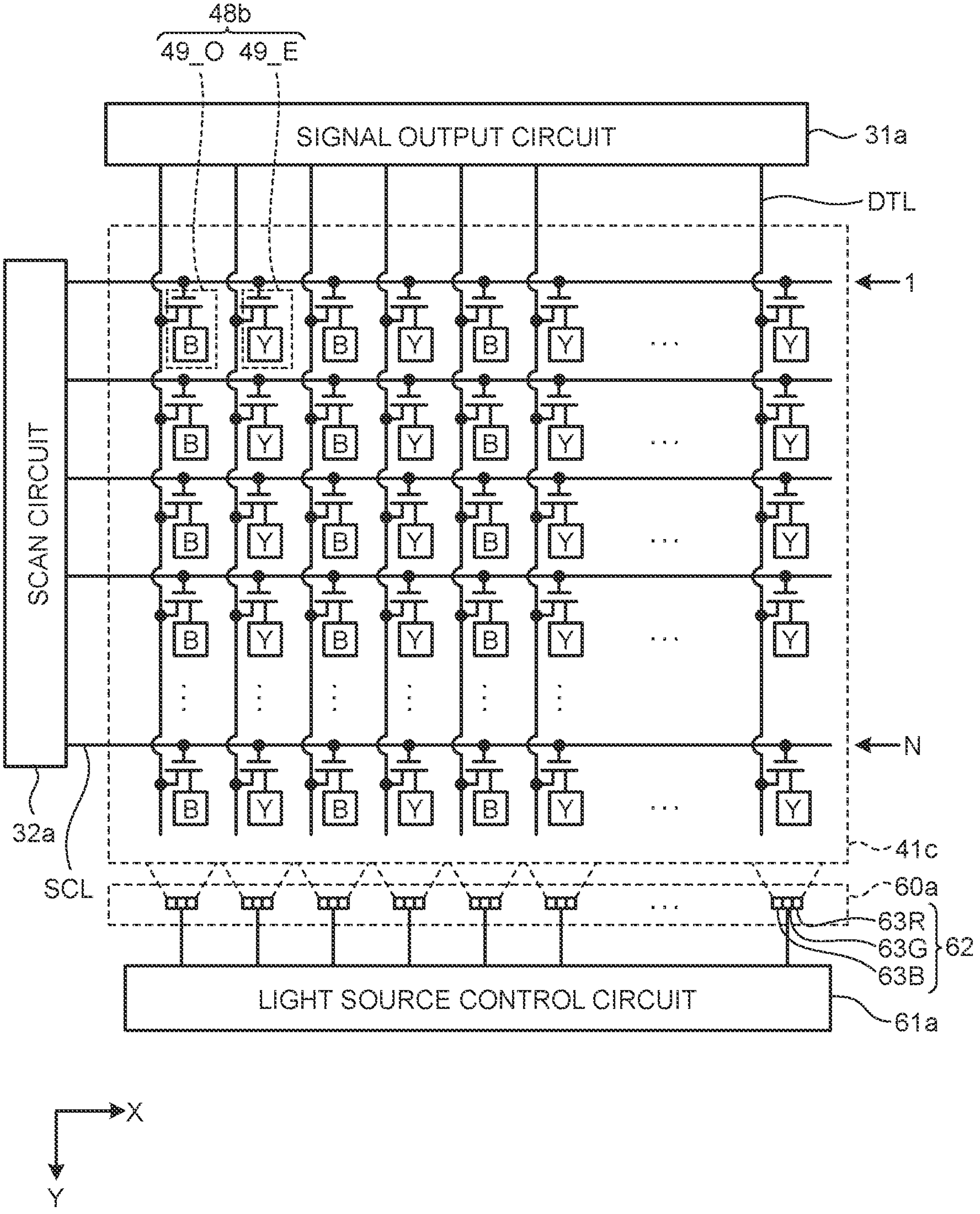
FIG. 13 is a schematic diagram illustrating a configuration example of the display panel according to a first modification of the first embodiment.

FIG. 13 is a schematic diagram illustrating a configuration example of the display panel according to a first modification of the first embodiment.

In the configuration according to the first modification of the first embodiment, the pixel 48*b* includes the first sub-pixel 49_O that displays blue (first color) and the second sub-pixel 49_E that is arranged adjacent to the first sub-pixel 49_O in the X direction.

In the configuration according to the first modification of the first embodiment, the first color filter that overlaps a position in a display area 41*c* where the pixel electrode of the first sub-pixel 49_O is provided and transmits light in blue (first color) is disposed on the display panel 40*a*. In the configuration according to the first modification of the first embodiment, the second color filter that overlaps a position in the display area 41*c* where the pixel electrode of the second sub-pixel 49_E is provided and transmits light in red (second color) or green (third color) is disposed on the display panel 40*a*. The second color filter is a color filter of yellow that is a complementary color between red (second color) and green (third color).

The yellow color filter has a property of transmitting light having a wavelength of red (second color) and transmitting light having a wavelength of green (third color). Therefore, by causing the light emitter 63R of red (second color) and the light emitter 63G of green (third color) to emit light in a time-division manner, two colors of red (second color) and green (third color) can be displayed by the second sub-pixel 49_E. The yellow color filter is generally said to be manufacturable at lower cost than color filters of other complementary colors.

Figure 14:
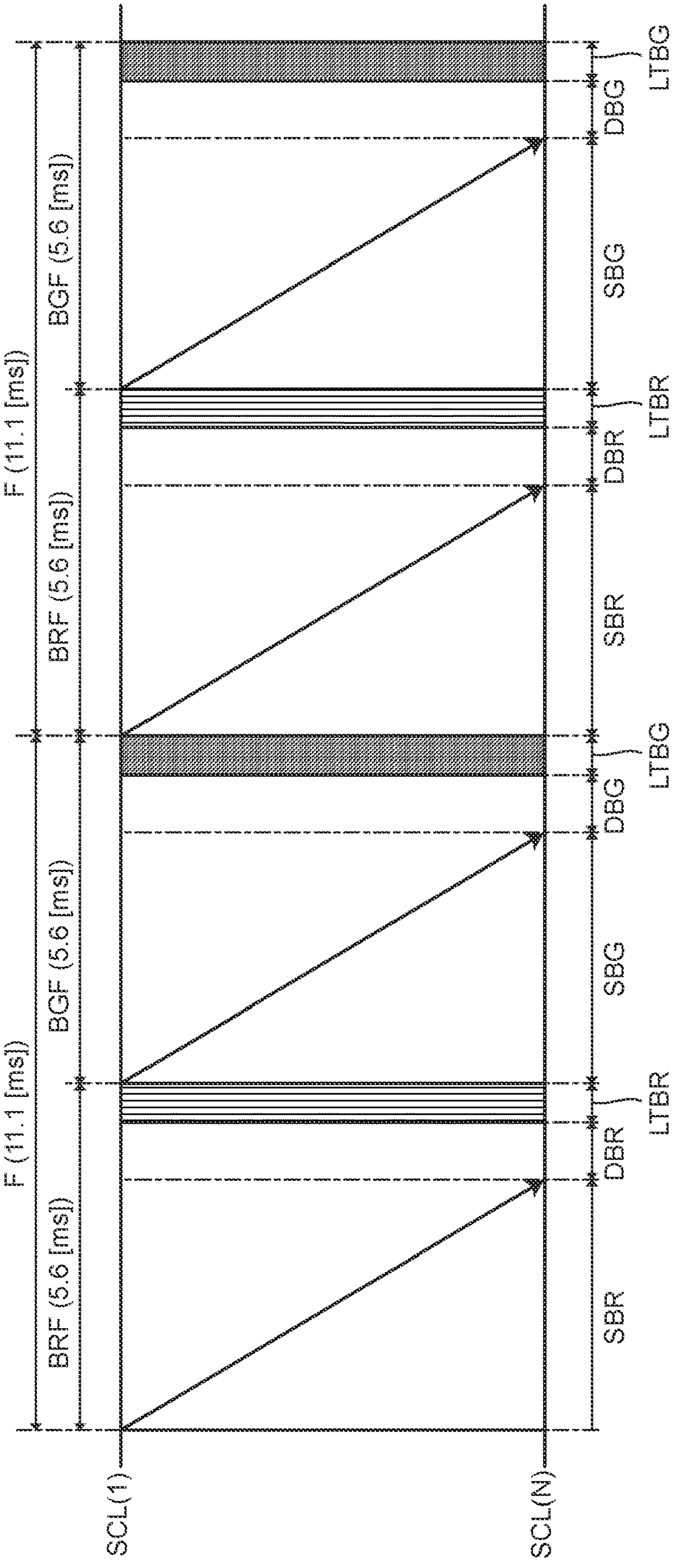
FIG. 14 is a timing diagram illustrating an example of the write period, the response period, and the light emission period in one frame period of the display device according to the first modification of the first embodiment.

FIG. 14 is a timing diagram illustrating an example of the write period, the response period, and the light emission period in one frame period of the display device according to the first modification of the first embodiment.

Figure 15A:
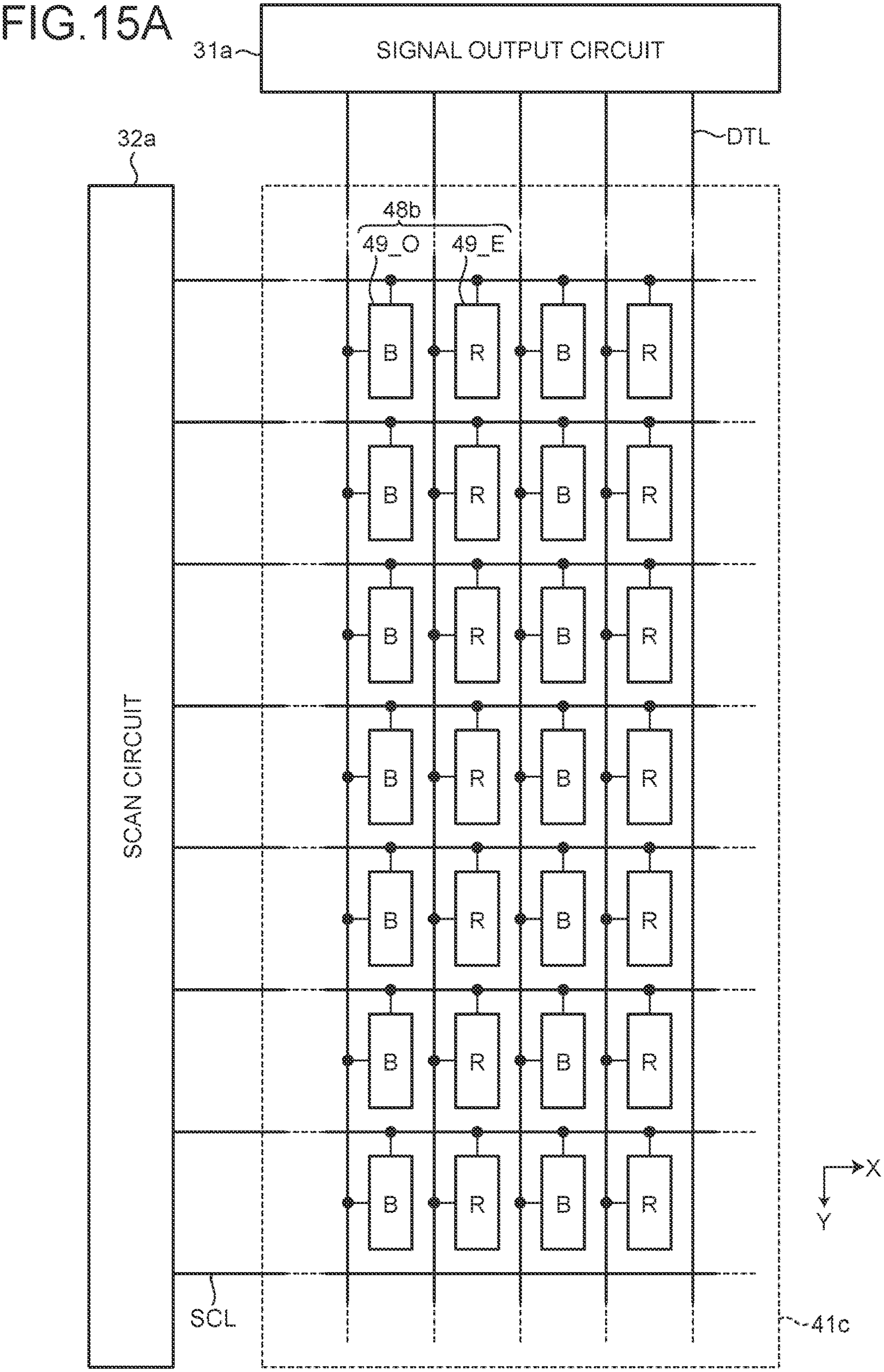
FIG. 15A is a diagram illustrating an exemplary display state in the first sub-field period of the display device according to the first modification of the first embodiment.
Figure 15B:
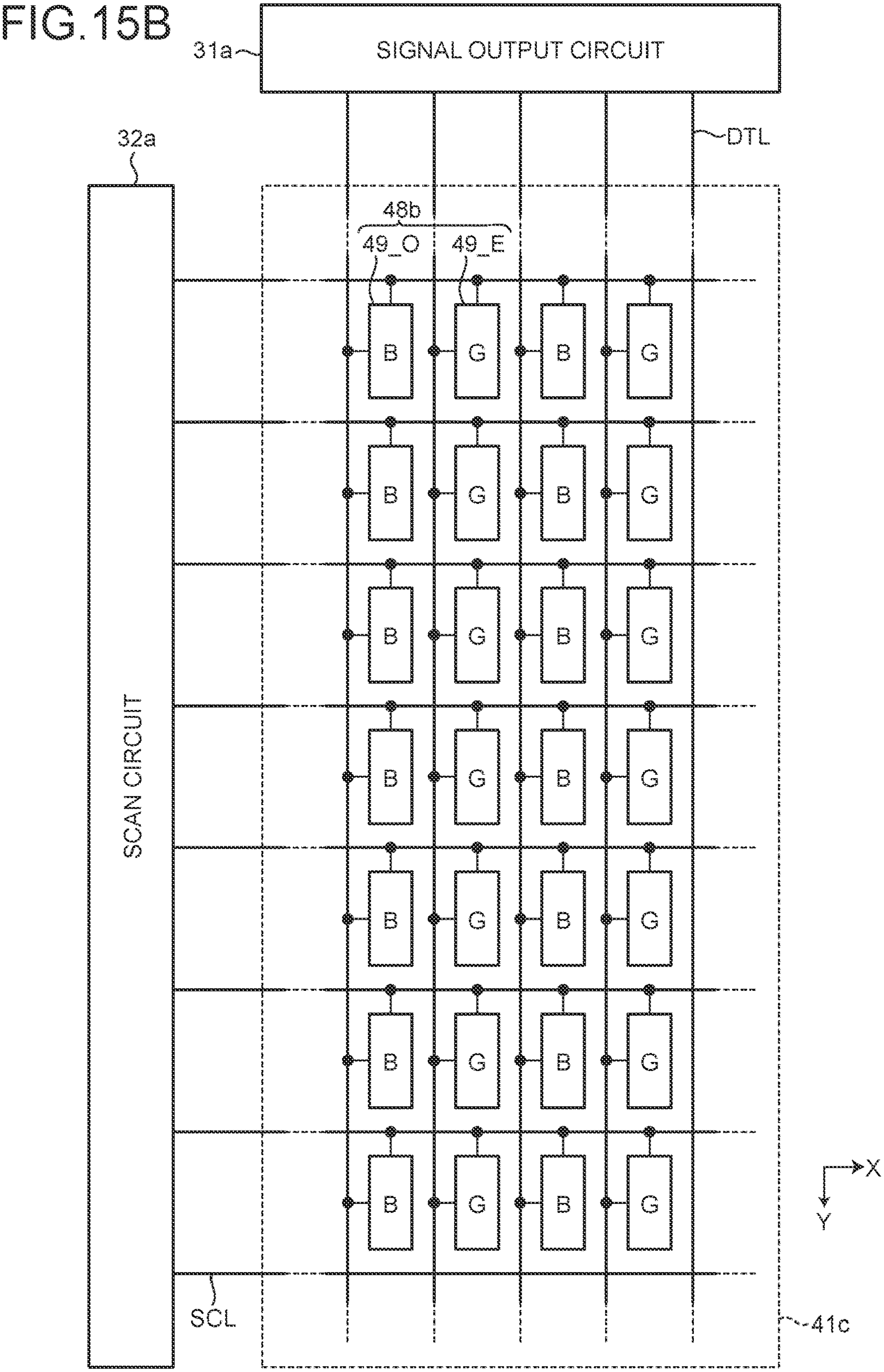
FIG. 15B is a diagram illustrating an exemplary display state in the second sub-field period of the display device according to the first modification of the first embodiment.

As illustrated in FIG. 14, in the first modification of the first embodiment, one frame period F is divided into two periods of a first sub-field period BRF and a second sub-field period BGF. FIG. 15A is a diagram illustrating an exemplary display state in the first sub-field period of the display device according to the first modification of the first embodiment. FIG. 15B is a diagram illustrating an exemplary display state in the second sub-field period of the display device according to the first modification of the first embodiment.

The first sub-field period BRF includes a first write period SBR of writing blue (first color) pixel signals to the first sub-pixels 49_O and writing the red (second color) pixel signals to the second sub-pixels 49_E. After the first write period SBR, a first light emission period LTBR is provided to cause the light emitters 63B of blue (first color) and the light emitters 63R of red (second color) to emit light simultaneously.

The scan circuit 32*a* sequentially supplies the drive signals to the scan lines SCL(1) to SCL(N) during the first write period SBR of the first sub-field period BRF, and the signal output circuit 31*a* outputs the pixel signals corresponding to the first sub-pixels 49_O and the second sub-pixels 49_E. Then, during the first light emission period LTBR after a first response period DBR, the light source control circuit 61*a* controls the light emitters 63B of blue (first color) and the light emitters 63R of red (second color) to emit light simultaneously. As a result, as illustrated in FIG. 15A, an image in blue (first color) and red (second color) is displayed in the display area 41*c* during the first sub-field period BRF.

The subsequent second sub-field period BGF includes a second write period SBG of writing the blue (first color) pixel signals to the first sub-pixels 49_O and writing green (third color) pixel signals to the second sub-pixels 49_E. After the second write period SBG, a second light emission period LTBG is provided to cause the light emitters 63B of blue (first color) and the light emitters 63G of green (third color) to emit light simultaneously.

The scan circuit 32*a* sequentially supplies the drive signals to the scan lines SCL(1) to SCL(N) during the second write period SBG of the second sub-field period BGF, and the signal output circuit 31*a* outputs the pixel signals corresponding to the first sub-pixels 49_O and the second sub-pixels 49_E. Then, during the second light emission period LTBG after a second response period DBG, the light source control circuit 61*a* controls the light emitters 63B of blue (first color) and the light emitters 63G of green (third color) to emit light simultaneously. As a result, as illustrated in FIG. 15B, an image in blue (first color) and green (third color) is displayed in the display area 41*c* during the second sub-field period BGF.

In the configuration and the operation of the first modification of the first embodiment, for example, when one frame period F is 11.1 ms, the first sub-field period BRF and the second sub-field period BGF are each 5.6 ms. As a result, in the same manner as in the configuration and the operation of the first embodiment, the limitation imposed by the write period and the response period in each of the sub-field periods can be more eased than in the second comparative example described above.

Second Modification

Figure 16:
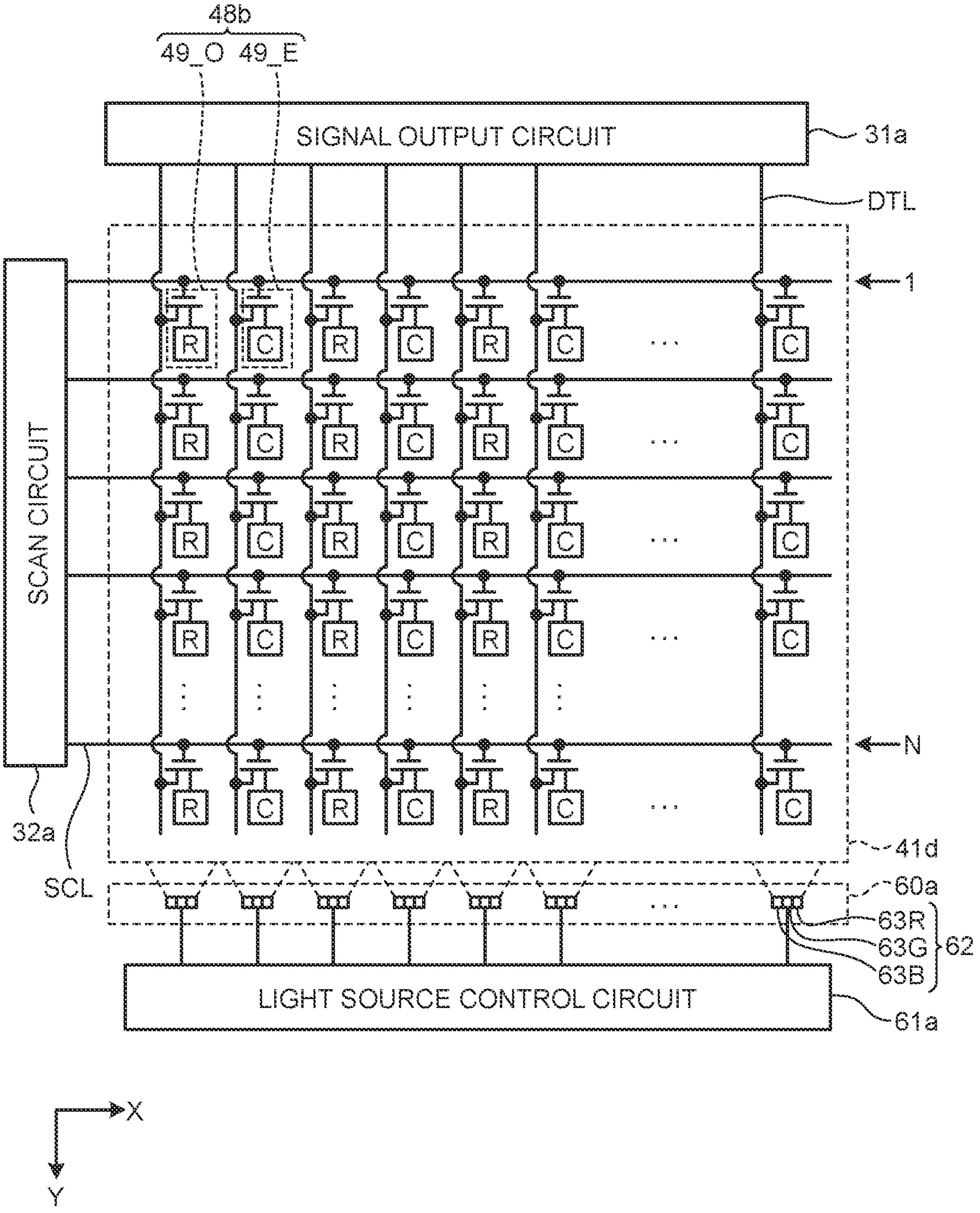
FIG. 16 is a schematic diagram illustrating a configuration example of the display panel according to a second modification of the first embodiment.

FIG. 16 is a schematic diagram illustrating a configuration example of the display panel according to a second modification of the first embodiment.

In the configuration according to the second modification of the first embodiment, the pixel 48*b* includes the first sub-pixel 49_O that displays red (first color) and the second sub-pixel 49_E that is arranged adjacent to the first sub-pixel 49_O in the X direction.

In the configuration according to the second modification of the first embodiment, the first color filter that overlaps a position in a display area 41*d* where the pixel electrode of the first sub-pixel 49_O is provided and transmits light in red (first color) is disposed on the display panel 40*a*. In the configuration according to the second modification of the first embodiment, the second color filter that overlaps a position in the display area 41*d* where the pixel electrode of the second sub-pixel 49_E is provided and transmits light in green (second color) or blue (third color) is disposed on the display panel 40*a*. The second color filter is a color filter of cyan that is a complementary color between green (second color) and blue (third color).

The cyan color filter has a property of transmitting light having a wavelength of green (second color) and transmitting light having a wavelength of blue (third color). Therefore, by causing the light emitter 63G of green (second color) and the light emitter 63B of blue (third color) to emit light in a time-division manner, two colors of green (second color) and blue (third color) can be displayed by the second sub-pixel 49_E.

Figure 17:
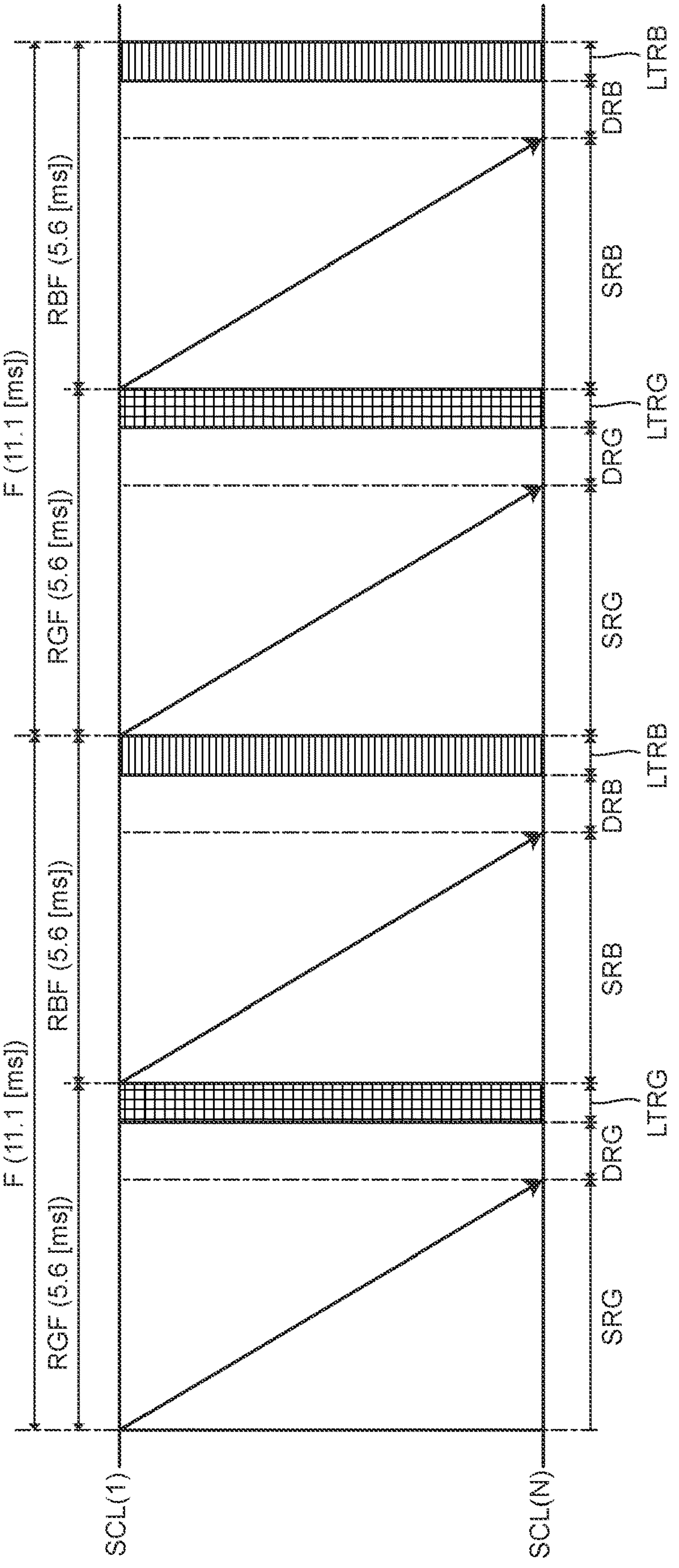
FIG. 17 is a timing diagram illustrating an example of the write period, the response period, and the light emission period in one frame period of the display device according to the second modification of the first embodiment.

FIG. 17 is a timing diagram illustrating an example of the write period, the response period, and the light emission period in one frame period of the display device according to the second modification of the first embodiment.

Figure 18A:
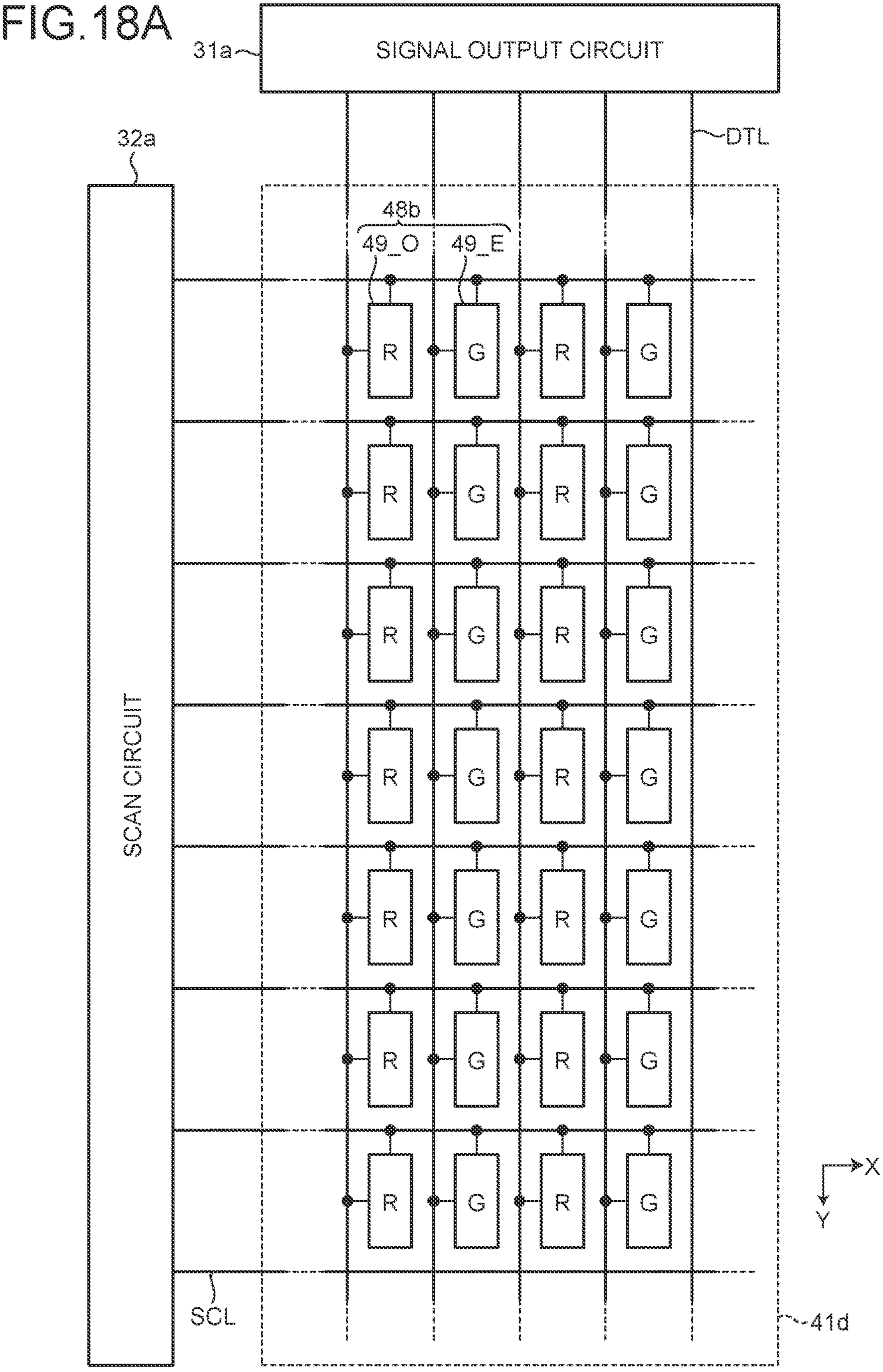
FIG. 18A is a diagram illustrating an exemplary display state in the first sub-field period of the display device according to the second modification of the first embodiment.
Figure 18B:
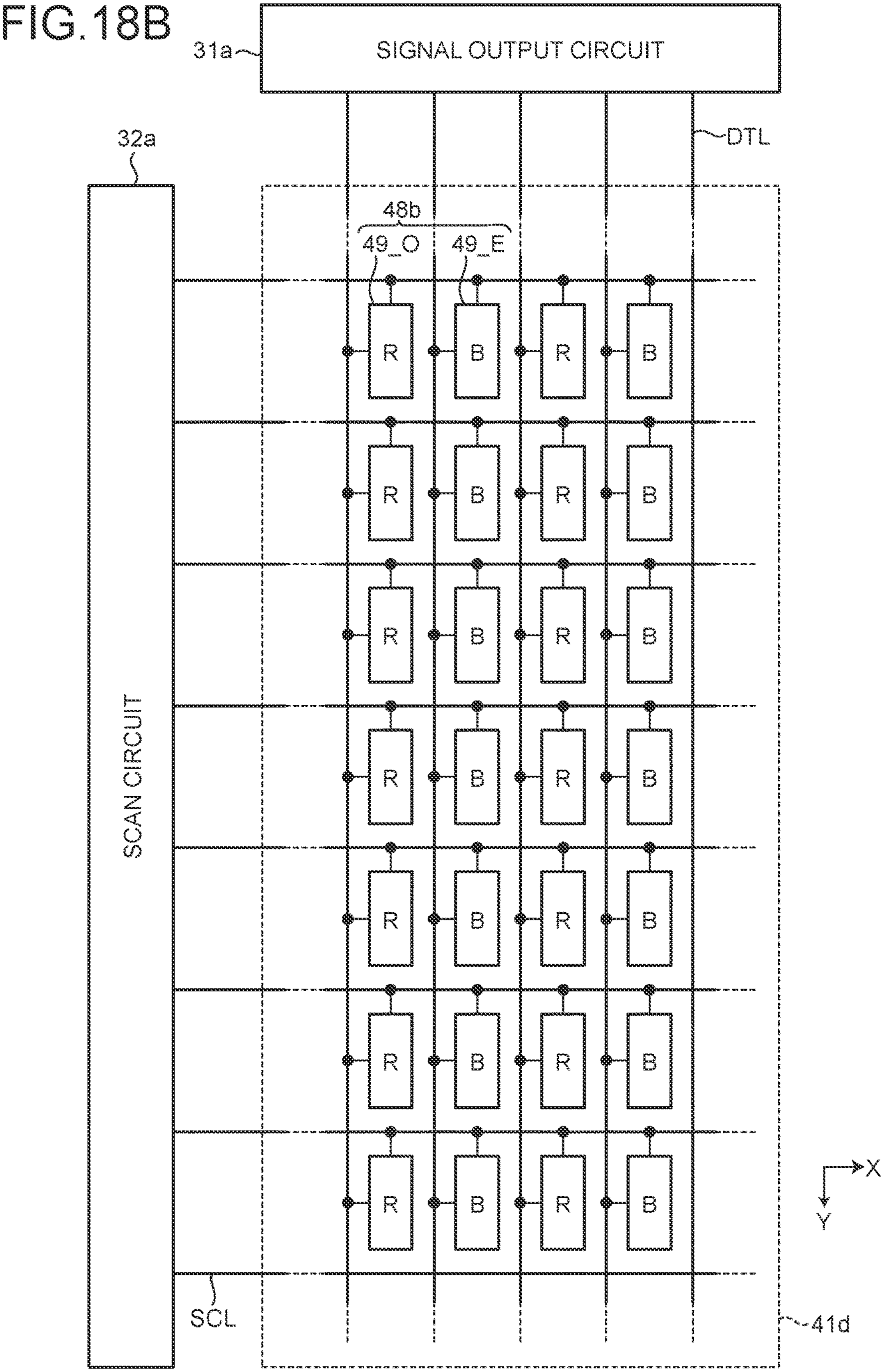
FIG. 18B is a diagram illustrating an exemplary display state in the second sub-field period of the display device according to the second modification of the first embodiment.

As illustrated in FIG. 17, in the second modification of the first embodiment, one frame period F is divided into two periods of a first sub-field period RGF and a second sub-field period RBF. FIG. 18A is a diagram illustrating an exemplary display state in the first sub-field period of the display device according to the second modification of the first embodiment. FIG. 18B is a diagram illustrating an exemplary display state in the second sub-field period of the display device according to the second modification of the first embodiment.

The first sub-field period RGF includes a first write period SRG of writing red (first color) pixel signals to the first sub-pixels 49_O and writing green (second color) pixel signals to the second sub-pixels 49_E. After the first write period SRG, a first light emission period LTRG is provided to cause the light emitters 63R of red (first color) and the light emitters 63G of green (second color) to emit light simultaneously.

The scan circuit 32*a* sequentially supplies the drive signals to the scan lines SCL(1) to SCL(N) during the first write period SRG of the first sub-field period RGF, and the signal output circuit 31*a* outputs the pixel signals corresponding to the first sub-pixels 49_O and the second sub-pixels 49_E. Then, during the first light emission period LTRG after a first response period DRG, the light source control circuit 61*a* controls the light emitters 63R of red (first color) and the light emitters 63G of green (second color) to emit light simultaneously. As a result, as illustrated in FIG. 18A, an image in red (first color) and green (second color) is displayed in the display area 41*d* during the first sub-field period RGF.

The subsequent second sub-field period RBF includes a second write period SRB of writing the red (first color) pixel signals to the first sub-pixels 49_O and writing the blue (third color) pixel signals to the second sub-pixels 49_E. After the second write period SRB, a second light emission period LTRB is provided to cause the light emitters 63R of red (first color) and the light emitters 63B of blue (third color) to emit light simultaneously.

The scan circuit 32*a* sequentially supplies the drive signals to the scan lines SCL(1) to SCL(N) during the second write period of the second sub-field period RBF, and the signal output circuit 31*a* outputs the pixel signals corresponding to the first sub-pixels 49_O and the second sub-pixels 49_E. Then, during the second light emission period LTRB after a second response period DRB, the light source control circuit 61*a* controls the light emitters 63R of red (first color) and the light emitters 63B of blue (third color) to emit light simultaneously. As a result, as illustrated in FIG. 18B, an image in red (first color) and blue (third color) is displayed in the display area 41*d* during the second sub-field period RBF.

In the configuration and the operation of the second modification of the first embodiment, for example, when one frame period F is 11.1 ms, the first sub-field period RGF and the second sub-field period RBF are each 5.6 ms. As a result, in the same manner as in the configuration and the operation of the first embodiment, the limitation imposed by the write period and the response period in each of the sub-field periods can be more eased than in the second comparative example described above.

Second Embodiment

Figure 19A:
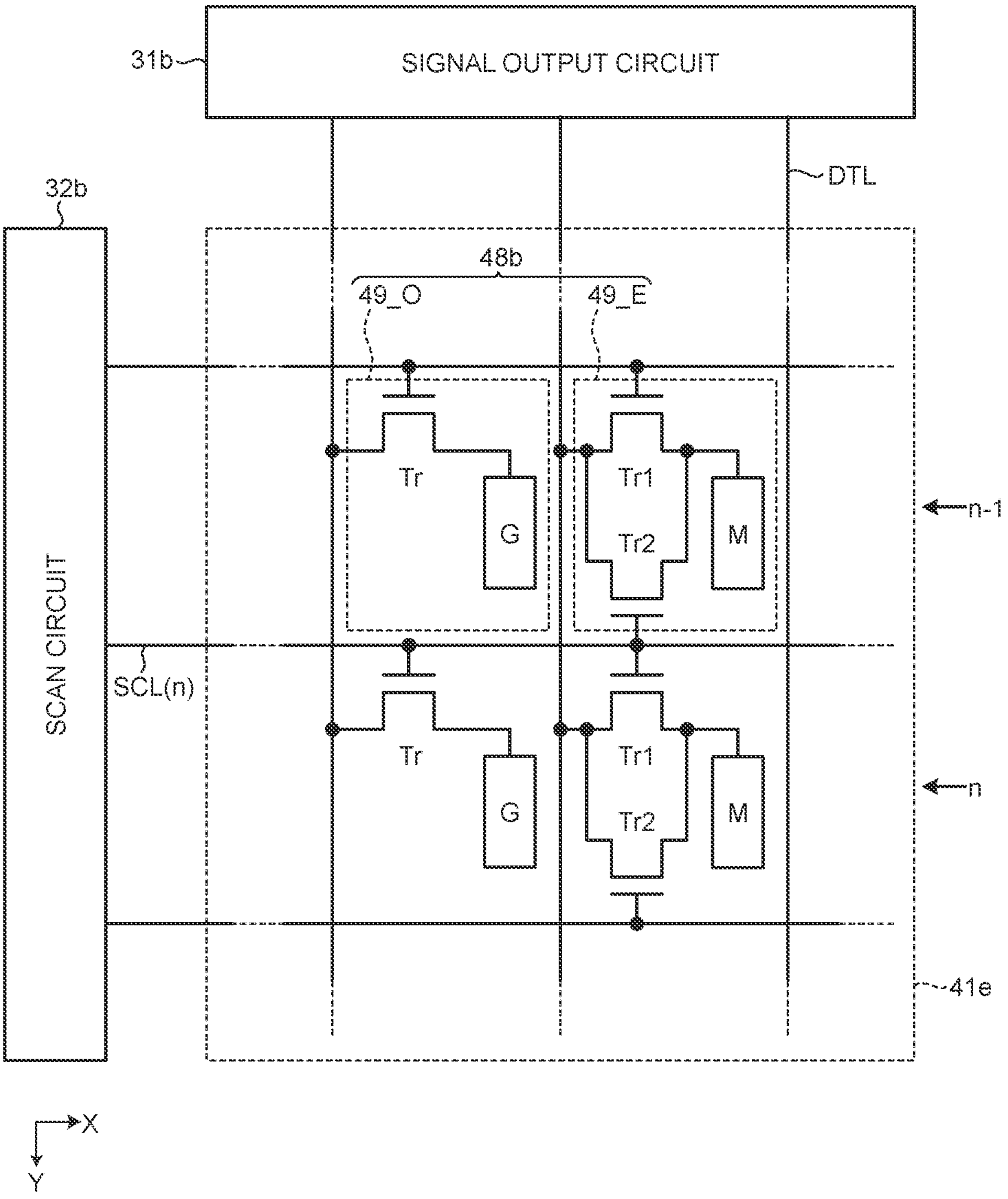
FIG. 19A is a diagram illustrating a first example of a pixel configuration of the display device according to a second embodiment of the present disclosure.
Figure 19B:
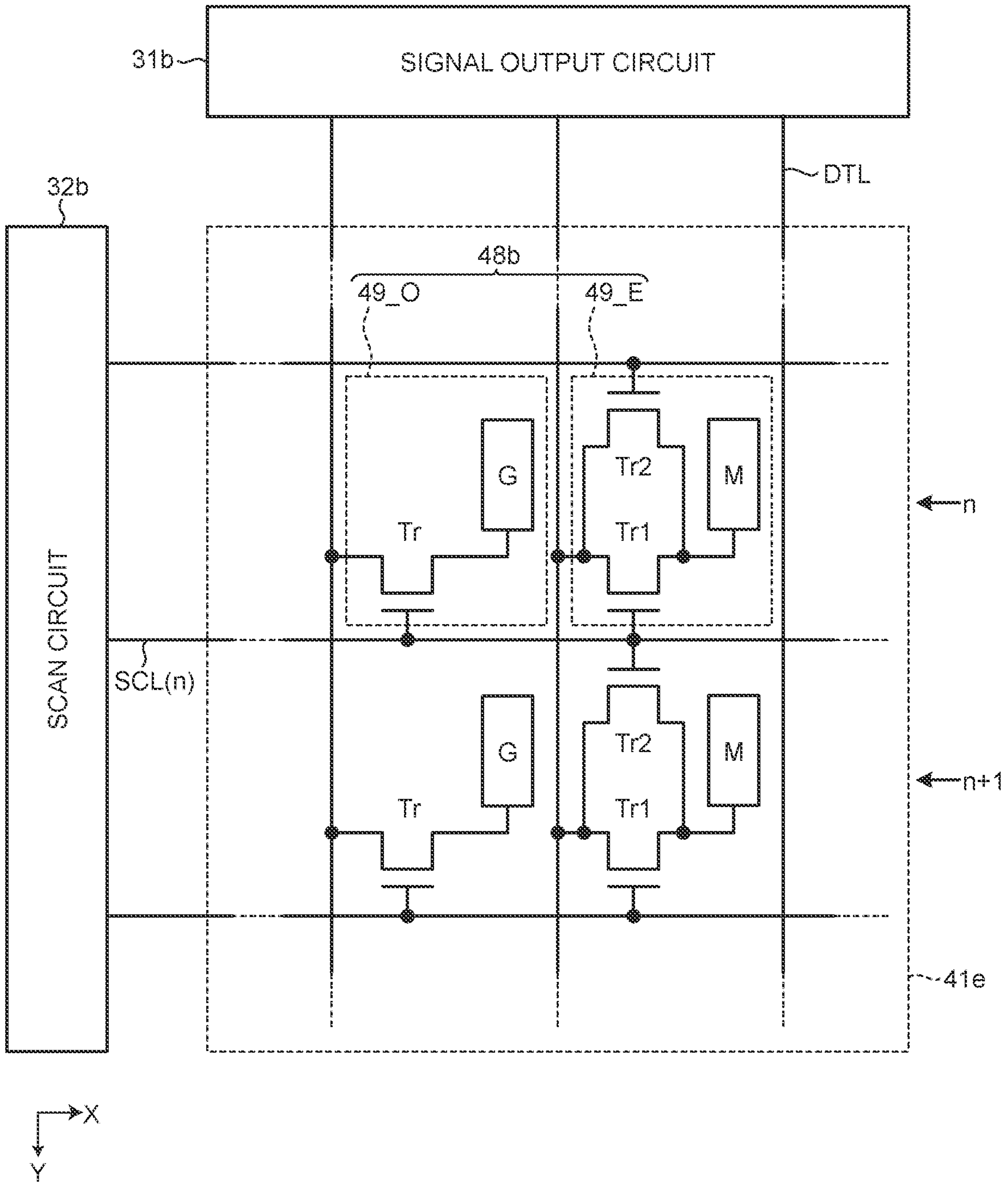
FIG. 19B is a diagram illustrating a second example of the pixel configuration of the display device according to the second embodiment.

FIG. 19A is a diagram illustrating a first example of a pixel configuration of the display device according to a second embodiment of the present disclosure. FIG. 19B is a diagram illustrating a second example of the pixel configuration of the display device according to the second embodiment. In the same manner as in the first embodiment, the block configuration of the display device according to the second embodiment is the same as that of the second comparative example illustrated in FIG. 6, and therefore, will not be described in detail.

As illustrated in FIGS. 19A and 19B, the second embodiment differs from the first embodiment in the configuration of the second sub-pixel 49_E and in the coupling of the first and the second sub-pixels 49_O and 49_E to the scan line SCL. Specifically, the second sub-pixel 49_E includes a first pixel transistor Tr1 and a second pixel transistor Tr2 coupled in parallel to the first pixel transistor Tr1.

As illustrated in FIGS. 19A and 19B, in the configuration according to the second embodiment, the first color filter that overlaps a position in a display area 41*e* where the pixel electrode of the first sub-pixel 49_O is provided and transmits light in green (first color) is disposed on the display panel 40*a*, in the same manner as in the first embodiment. In the configuration according to the second embodiment, the second color filter that overlaps a position in the display area 41*e* where the pixel electrode of the second sub-pixel 49_E is provided and transmits light in red (second color) or blue (third color) is disposed on the display panel 40*a*, in the same manner as in the first embodiment. That is, the second color filter is a color filter of magenta that is a complementary color between red (second color) and blue (third color).

In the configuration of the first example illustrated in FIG. 19A, the scan line SCL(n) in the n-th row (where n is a natural number from 1 to N) is coupled to the gates of pixel transistors Tr of the first sub-pixels 49_O of the pixels 48*b* arranged in the n-th row, the gates of the first pixel transistors Tr1 of the second sub-pixels 49_E of the pixels 48*b* arranged in the n-th row, and the gates of the second pixel transistors Tr2 of the second sub-pixels 49_E of the pixels 48*b* arranged in the (n−1)th row.

As a result, with the configuration of the first example illustrated in FIG. 19A, by supplying the drive signal from a scan circuit 32*b* to the scan line SCL(n), green (first color) is written to the first sub-pixels 49_O of the pixels 48*b* arranged in the n-th row, and the same pixel signals of red (second color) or blue (third color) are simultaneously written to the second sub-pixels 49_E of the pixels 48*b* arranged in the n-th row and the second sub-pixels 49_E of the pixels 48*b* arranged in the (n−1)th row.

In the configuration of the second example illustrated in FIG. 19B, the scan line SCL(n) in the n-th row is coupled to the gates of the pixel transistors Tr of the first sub-pixels 49_O of the pixels 48*b* arranged in the n-th row, the gates of the first pixel transistors Tr1 of the second sub-pixels 49_E of the pixels 48*b* arranged in the n-th row, and the gates of the second pixel transistors Tr2 of the second sub-pixels 49_E of the pixels 48*b* arranged in the (n+1)th row.

As a result, with the configuration of the second example illustrated in FIG. 19B, by supplying the drive signal from a scan circuit 32*b* to the scan line SCL(n), green (first color) is written to the first sub-pixels 49_O of the pixels 48*b* arranged in the n-th row, and the same pixel signals of red (second color) or blue (third color) are simultaneously written to the second sub-pixels 49_E of the pixels 48*b* arranged in the n-th row and the second sub-pixels 49_E of the pixels 48*b* arranged in the (n+1)th row.

Figure 20:
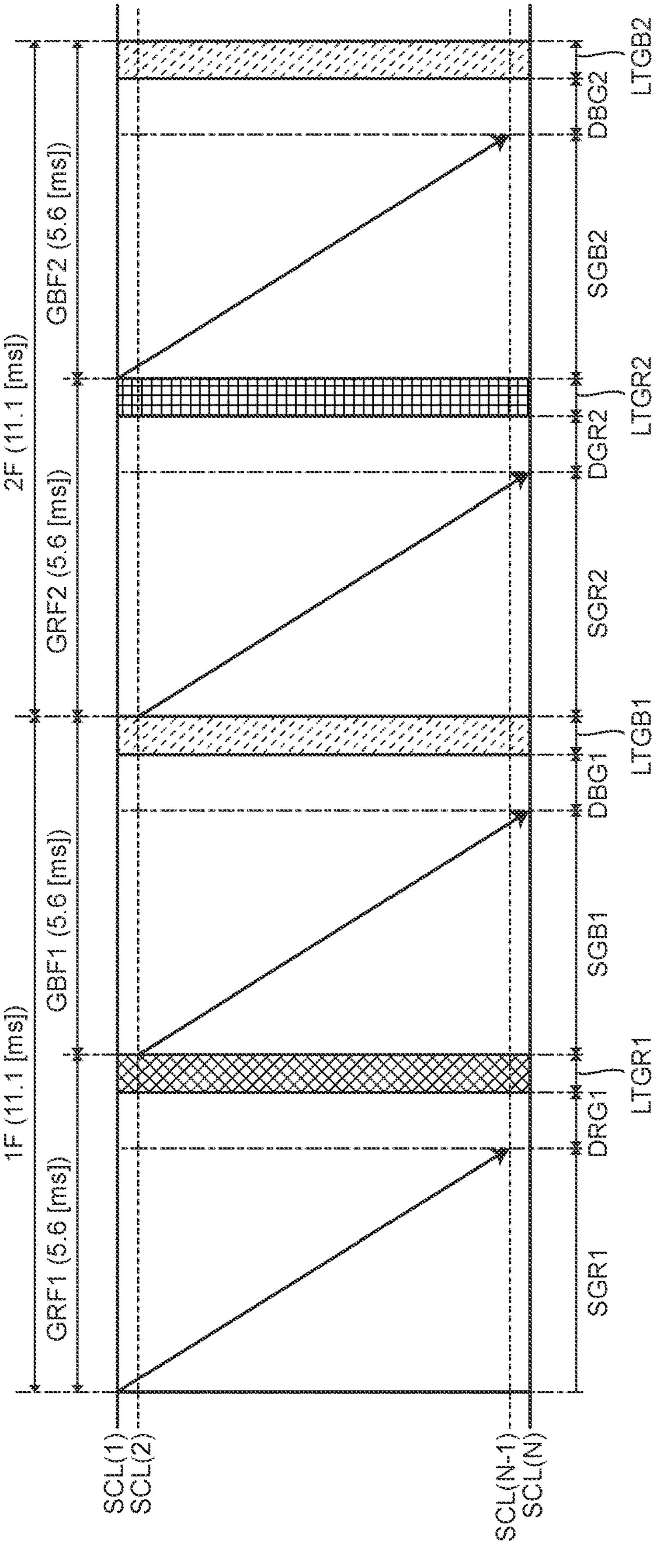
FIG. 20 is a timing diagram illustrating an example of the write period, the response period, and the light emission period in a first frame period and a second frame period of the display device according to the second embodiment.

FIG. 20 is a timing diagram illustrating an example of the write period, the response period, and the light emission period in a first frame period and a second frame period of the display device according to the second embodiment.

As illustrated in FIG. 20, in the second embodiment, a first frame period 1F is divided into two periods of a first sub-field period GRF1 and a second sub-field period GBF1. A second frame period 2F is divided into two periods of a first sub-field period GRF2 and a second sub-field period GBF2.

Figure 21A:
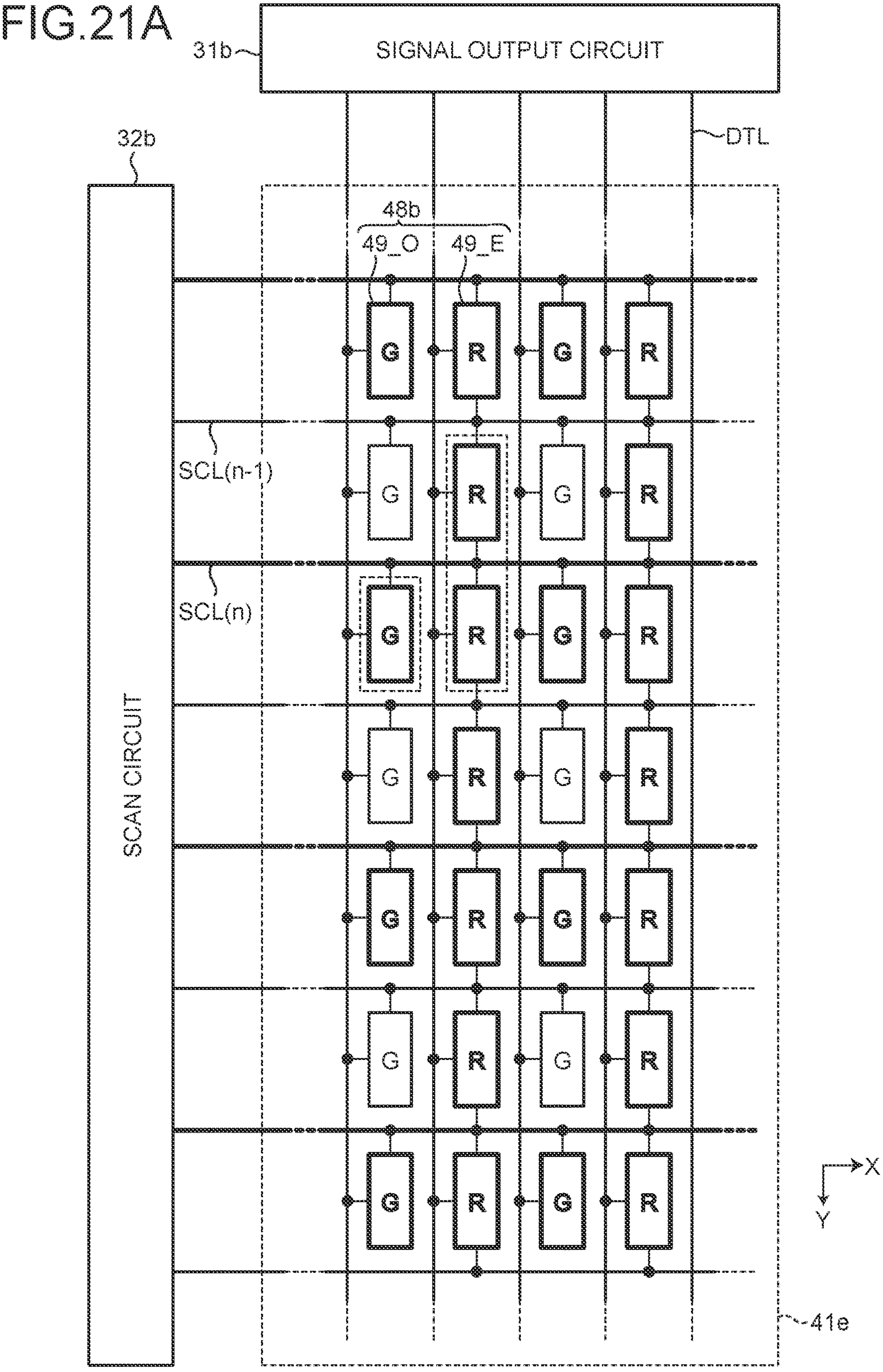
FIG. 21A is a diagram illustrating an exemplary display state in a first sub-field period of the first frame period of the display device according to a first example of the second embodiment.
Figure 21B:
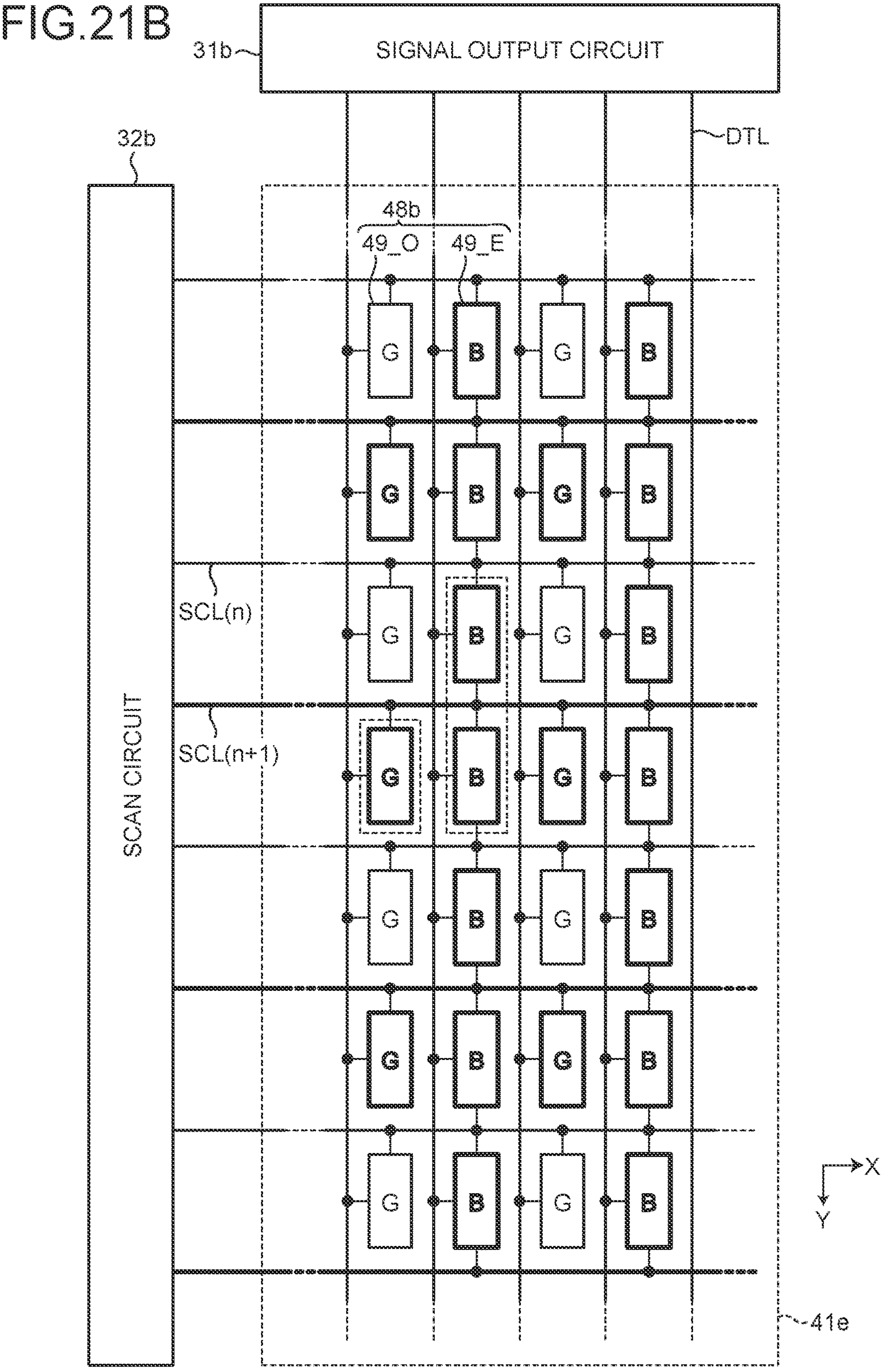
FIG. 21B is a diagram illustrating an exemplary display state in a second sub-field period of the first frame period of the display device according to the first example of the second embodiment.
Figure 21C:
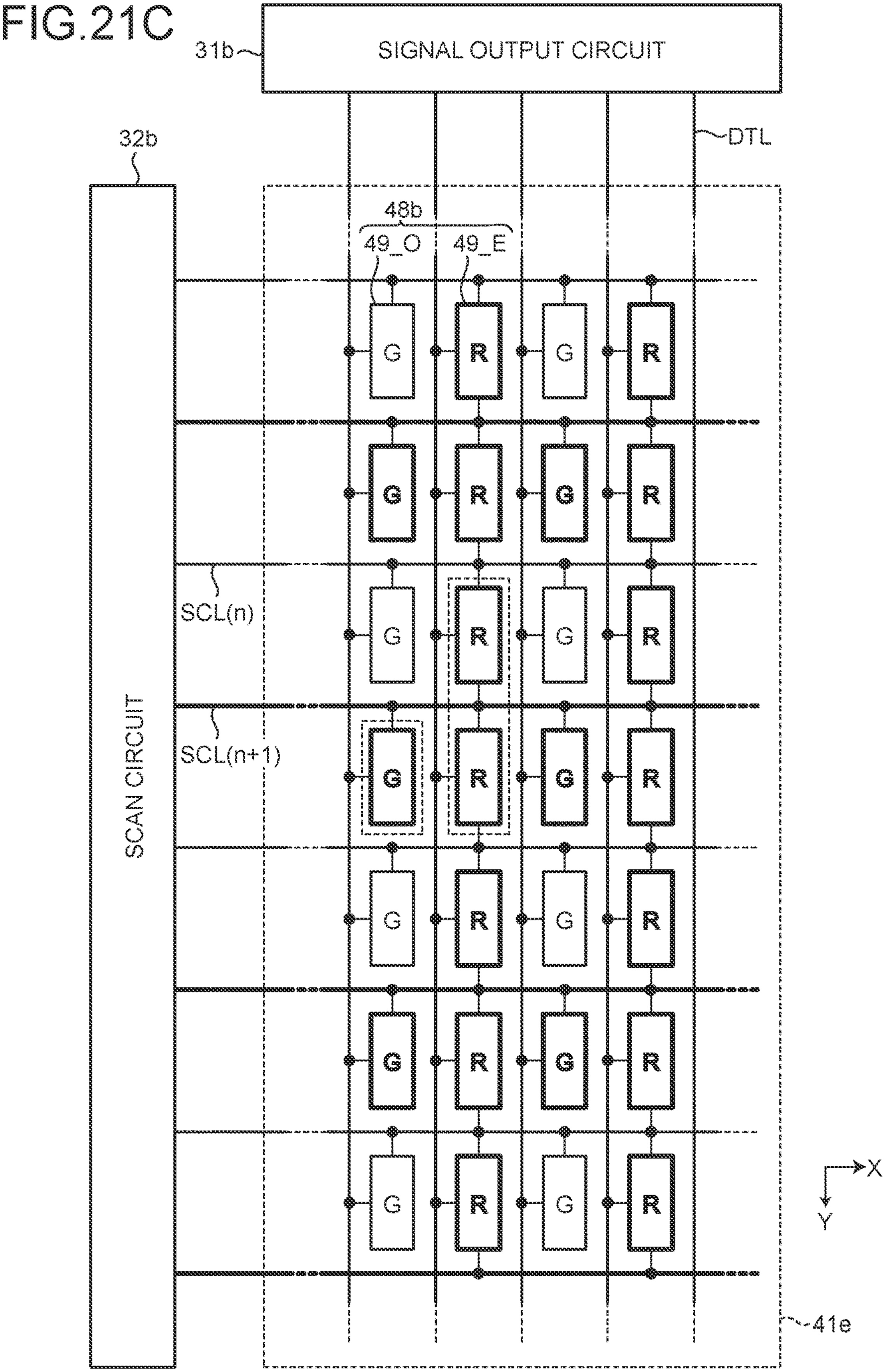
FIG. 21C is a diagram illustrating an exemplary display state in the first sub-field period of the second frame period of the display device according to the first example of the second embodiment.
Figure 21D:
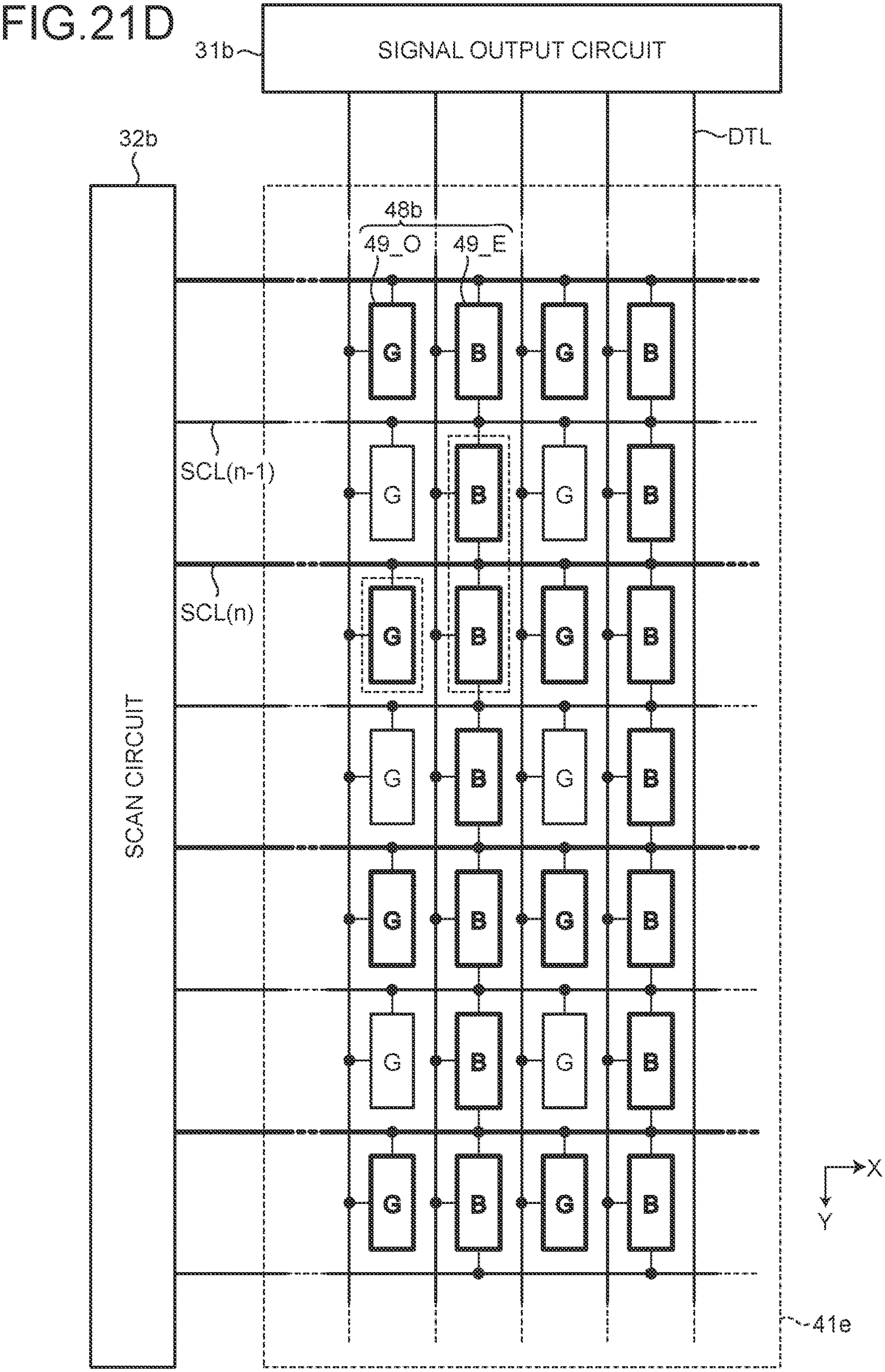
FIG. 21D is a diagram illustrating an exemplary display state in the second sub-field period of the second frame period of the display device according to the first example of the second embodiment.

The following describes more specific operation examples in the first example of the pixel configuration according to the second embodiment illustrated in FIG. 19A, with reference to FIGS. 21A, 21B, 21C, and 21D. FIG. 21A is a diagram illustrating an exemplary display state in the first sub-field period of the first frame period of the display device according to the first example of the second embodiment. FIG. 21B is a diagram illustrating an exemplary display state in the second sub-field period of the first frame period of the display device according to the first example of the second embodiment. FIG. 21C is a diagram illustrating an exemplary display state in the first sub-field period of the second frame period of the display device according to the first example of the second embodiment. FIG. 21D is a diagram illustrating an exemplary display state in the second sub-field period of the second frame period of the display device according to the first example of the second embodiment.

The first sub-field period GRF1 of the first frame period 1F includes a first write period SGR1 of writing the green (first color) pixel signals to the first sub-pixels 49_O in odd-numbered rows and writing the same red (second color)

pixel signals to the second sub-pixels 49_E arranged in the order of an even-numbered row and an odd-numbered row in the second direction. After the first write period SGR1, a first light emission period LTGR1 is provided to cause the light emitters 63G of green (first color) and the light emitters 63R of red (second color) to emit light simultaneously.

The scan circuit 32*b* sequentially supplies the drive signals to the scan lines SCL(1) to SCL(N−1) in the odd-numbered rows during the first write period SGR1 of the first sub-field period GRF1 of the first frame period 1F, and a signal output circuit 31*b* outputs the pixel signals corresponding to the first sub-pixels 49_O and the second sub-pixels 49_E.

As a result, the green (first color) pixel signals are written to the first sub-pixels 49_O in the n-th row coupled to the scan line SCL(n) in an odd-numbered row, and the red (second color) pixel signals for the n-th row are simultaneously written to the second sub-pixels 49_E in the (n−1)th row and the n-th row.

Then, during the first light emission period LTGR1 after a first response period DGR1, the light source control circuit 61*a* controls the light emitters 63G of green (first color) and the light emitters 63R of red (second color) to emit light simultaneously. As a result, in the first sub-field period GRF1 of the first frame period 1F, the display is performed in the state where the green (first color) pixel signals are written to the first sub-pixels 49_O in the n-th row and the red (second color) pixel signals for the n-th row are written to the second sub-pixels 49_E in the (n−1)th row and the n-th row, as illustrated in FIG. 21A.

The subsequent second sub-field period GBF1 of the first frame period 1F includes a second write period SGB1 of writing the green (first color) pixel signals to the first sub-pixels 49_O in the even-numbered rows and writing the same blue (third color) pixel signals to the second sub-pixels 49_E arranged in the order of the odd-numbered row and the even-numbered row in the second direction. After the second write period SGB1, a second light emission period LTGB1 is provided to cause the light emitters 63G of green (first color) and the light emitters 63B of blue (third color) to emit light simultaneously.

The scan circuit 32*b* sequentially supplies the drive signals to the scan lines SCL(2) to SCL(N) in the even-numbered rows during the second write period SGB1 of the second sub-field period GBF1 of the first frame period 1F, and the signal output circuit 31*b* outputs the pixel signals corresponding to the first sub-pixels 49_O and the second sub-pixels 49_E.

As a result, the green (first color) pixel signals are written to the first sub-pixels 49_O in the (n+1)th row coupled to the scan line SCL(n+1) in an even-numbered row, and the blue (third color) pixel signals for the (n+1)th row are simultaneously written to the second sub-pixels 49_E in the n-th row and the (n+1)th row.

Then, during the second light emission period LTGB1 after a second response period DGB1, the light source control circuit 61*a* controls the light emitters 63G of green (first color) and the light emitters 63B of blue (third color) to emit light simultaneously. As a result, in the second sub-field period GBF1 of the first frame period 1F, the display is performed in the state where the green (first color) pixel signals are written to the first sub-pixels 49_O in the (n+1)th row and the blue (third color) pixel signals for the (n+1)th row are written to the second sub-pixels 49_E in the n-th row and the (n+1)th row, as illustrated in FIG. 21B.

The first sub-field period GRF2 of the second frame period 2F includes a first write period SGR2 of writing the green (first color) pixel signals to the first sub-pixels 49_O in the even-numbered rows and writing the same red (second color) pixel signals to the second sub-pixels 49_E arranged in the order of the odd-numbered row and the even-numbered row in the second direction. After the first write period SGR2, a first light emission period LTGR2 is provided to cause the light emitters 63G of green (first color) and the light emitters 63R of red (second color) to emit light simultaneously.

The scan circuit 32*b* sequentially supplies the drive signals to the scan lines SCL(2) to SCL(N) in the even-numbered rows during the first write period SGR2 of the first sub-field period GRF2 of the second frame period 2F, and the signal output circuit 31*b* outputs the pixel signals corresponding to the first sub-pixels 49_O and the second sub-pixels 49_E.

As a result, the green (first color) pixel signals are written to the first sub-pixels 49_O in the (n+1)th row coupled to the scan line SCL(n+1) in the even-numbered row, and the red (second color) pixel signals for the (n+1)th row are simultaneously written to the second sub-pixels 49_E in the n-th row and the (n+1)th row.

Then, during the first light emission period LTGR2 after a first response period DGR2, the light source control circuit 61*a* controls the light emitters 63G of green (first color) and the light emitters 63R of red (second color) to emit light simultaneously. As a result, in the first sub-field period GRF2 of the second frame period 2F, the display is performed in the state where the green (first color) pixel signals are written to the first sub-pixels 49_O in the (n+1)th row and the red (second color) pixel signals for the (n+1)th row are written to the second sub-pixels 49_E in the n-th row and the (n+1)th row, as illustrated in FIG. 21C.

The subsequent second sub-field period GBF2 of the second frame period 2F includes a second write period SGB2 of writing the green (first color) pixel signals to the first sub-pixels 49_O in the odd-numbered rows and writing the same blue (third color) pixel signals to the second sub-pixels 49_E arranged in the order of the even-numbered row and the odd-numbered row in the second direction. After the second write period SGB2, a second light emission period LTGB2 is provided to cause the light emitters 63G of green (first color) and the light emitters 63B of blue (third color) to emit light simultaneously.

The scan circuit 32*b* sequentially supplies the drive signals to the scan lines SCL(1) to SCL(N−1) in the odd-numbered rows during the second write period SGB2 of the second sub-field period GBF2 of the second frame period 2F, and the signal output circuit 31*b* outputs the pixel signals corresponding to the first sub-pixels 49_O and the second sub-pixels 49_E.

As a result, the green (first color) pixel signals are written to the first sub-pixels 49_O in the n-th row coupled to the scan line SCL(n) in the odd-numbered row, and the blue (third color) pixel signals for the n-th row are simultaneously written to the second sub-pixels 49_E in the (n−1)th row and the n-th row.

Then, during the second light emission period LTGB2 after a second response period DGB2, the light source control circuit 61*a* controls the light emitters 63G of green (first color) and the light emitters 63B of blue (third color) to emit light simultaneously. As a result, in the second sub-field period GBF2 of the second frame period 2F, the display is performed in the state where the green (first color) pixel signals are written to the first sub-pixels 49_O in the n-th row and the blue (third color) pixel signals for the n-th row are written to the second sub-pixels 49_E in the (n−1)th row and the n-th row, as illustrated in FIG. 21D.

Figure 22A:
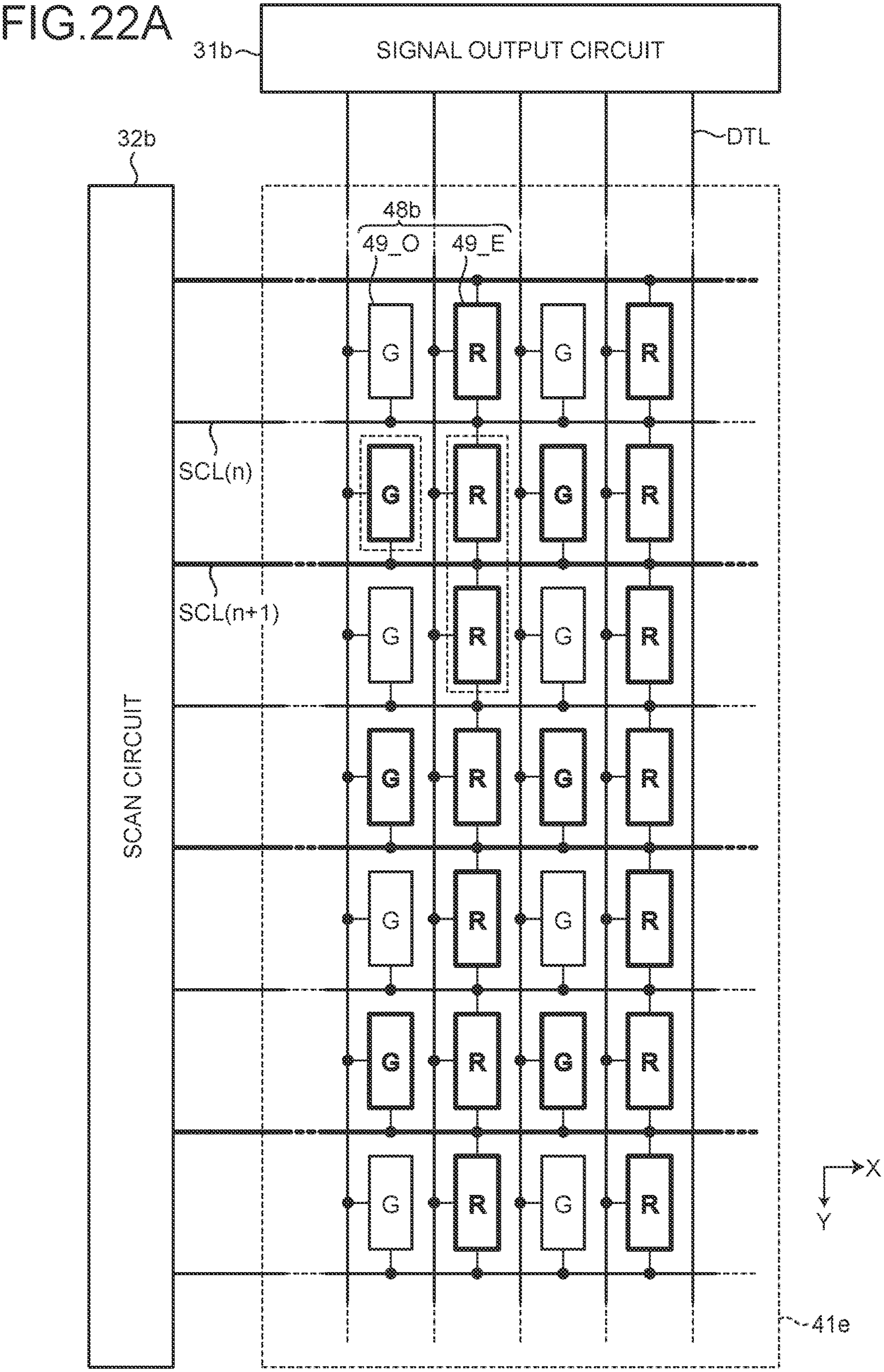
FIG. 22A is a diagram illustrating an exemplary display state in the first sub-field period of the first frame period of the display device according to a second example of the second embodiment.
Figure 22B:
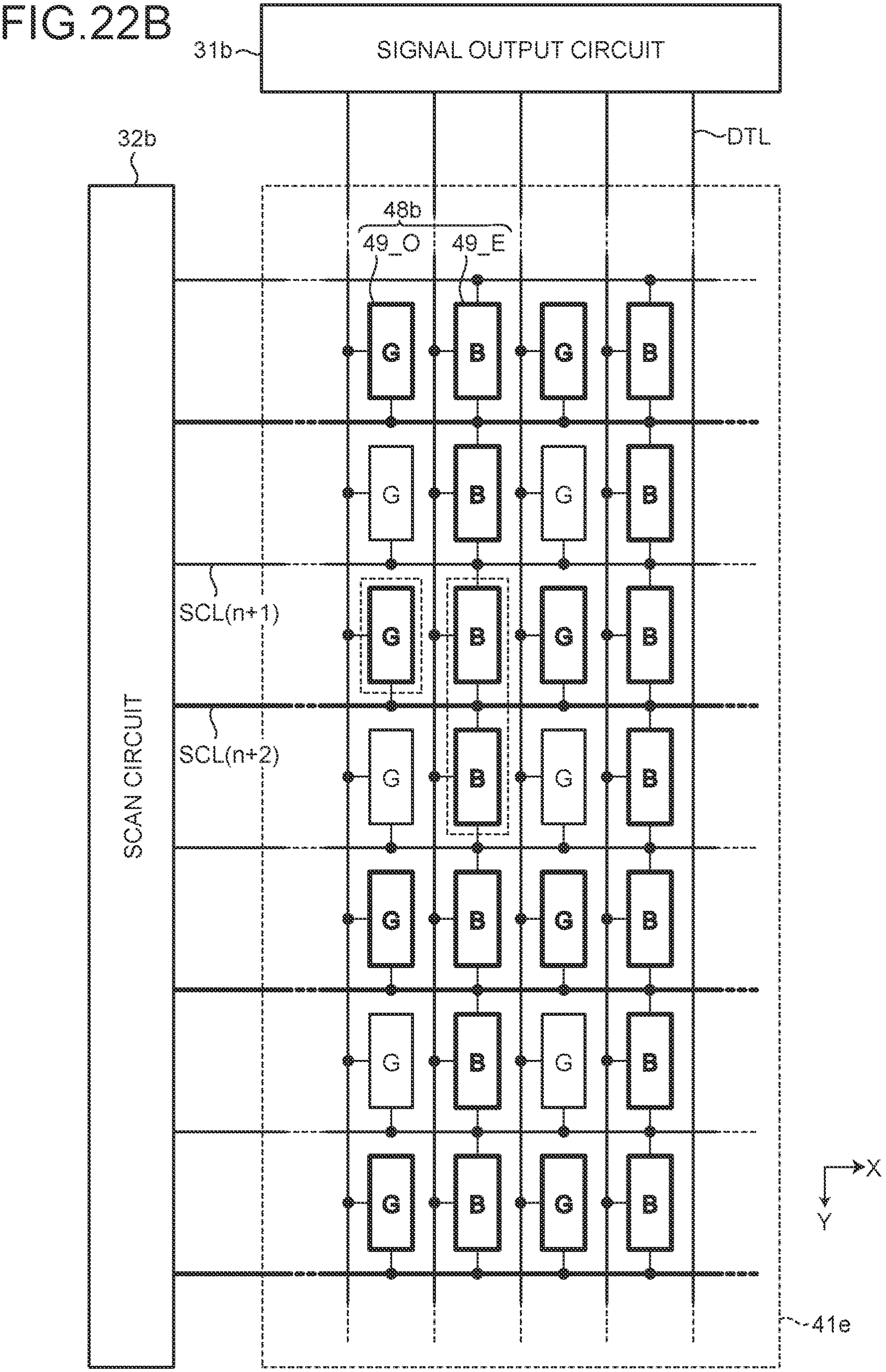
FIG. 22B is a diagram illustrating an exemplary display state in the second sub-field period of the first frame period of the display device according to the second example of the second embodiment.
Figure 22C:
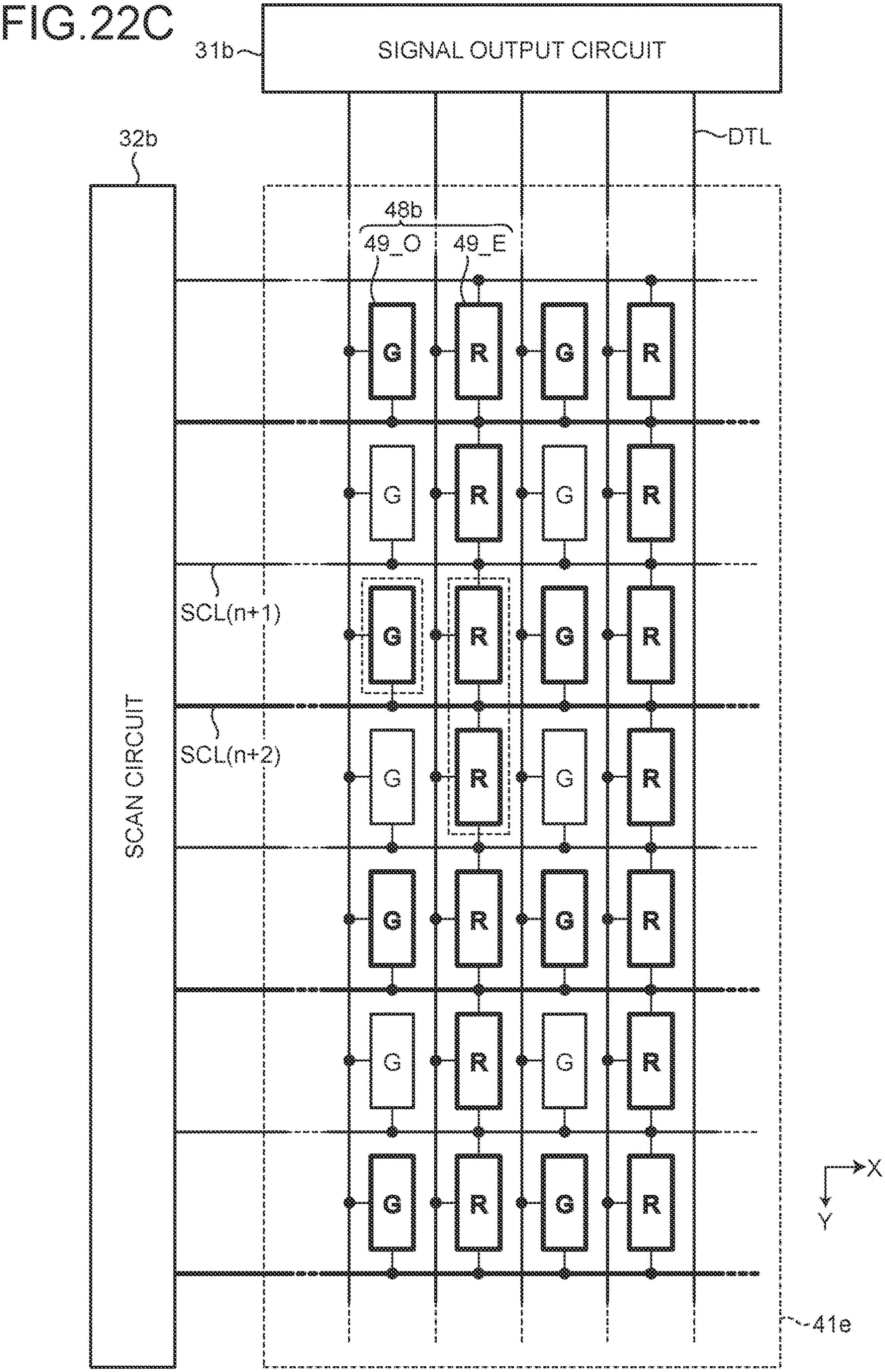
FIG. 22C is a diagram illustrating an exemplary display state in the first sub-field period of the second frame period of the display device according to the second example of the second embodiment.
Figure 22D:
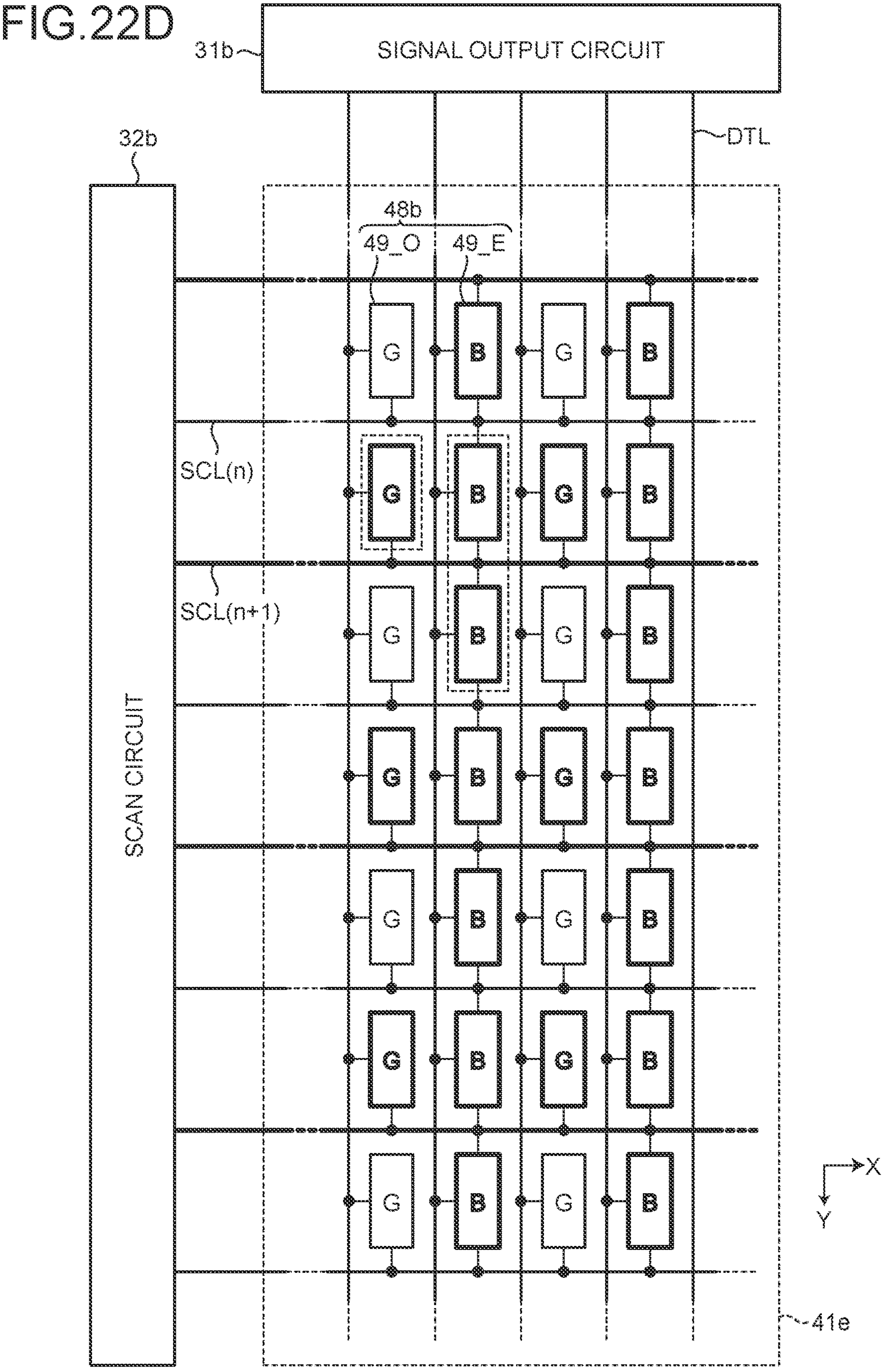
FIG. 22D is a diagram illustrating an exemplary display state in the second sub-field period of the second frame period of the display device according to the second example of the second embodiment.

The following describes more specific operation examples in the second example of the pixel configuration according to the second embodiment illustrated in FIG. 19B, with reference to FIGS. 22A, 22B, 22C, and 22D. FIG. 22A is a diagram illustrating an exemplary display state in the first sub-field period of the first frame period of the display device according to the second example of the second embodiment. FIG. 22B is a diagram illustrating an exemplary display state in the second sub-field period of the first frame period of the display device according to the second example of the second embodiment. FIG. 22C is a diagram illustrating an exemplary display state in the first sub-field period of the second frame period of the display device according to the second example of the second embodiment. FIG. 22D is a diagram illustrating an exemplary display state in the second sub-field period of the second frame period of the display device according to the second example of the second embodiment.

The first sub-field period GRF1 of the first frame period 1F includes the first write period SGR1 of writing green (first color) pixel signals to the first sub-pixels 49_O in the odd-numbered rows and writing the same red (second color) pixel signals to the second sub-pixels 49_E arranged in the order of the odd-numbered row and the even-numbered row in the second direction. After the first write period SGR1, the first light emission period LTGR1 is provided to cause the light emitters 63G of green (first color) and the light emitters 63R of red (second color) to emit light simultaneously.

The scan circuit 32*b* sequentially supplies the drive signals to the scan lines SCL(1) to SCL(N−1) in the odd-numbered rows during the first write period SGR1 of the first sub-field period GRF1 of the first frame period 1F, and the signal output circuit 31*b* outputs the pixel signals corresponding to the first sub-pixels 49_O and the second sub-pixels 49_E.

As a result, the green (first color) pixel signals are written to the first sub-pixels 49_O in the n-th row coupled to the scan line SCL(n) in the odd-numbered row, and the red (second color) pixel signals for the n-th row are simultaneously written to the second sub-pixels 49_E in the n-th row and the (n+1)th row.

Then, during the first light emission period LTGR1 after the first response period DGR1, the light source control circuit 61*a* controls the light emitters 63G of green (first color) and the light emitters 63R of red (second color) to emit light simultaneously. As a result, in the first sub-field period GRF1 of the first frame period 1F, the display is performed in the state where the green (first color) pixel signals are written to the first sub-pixels 49_O in the n-th row and the red (second color) pixel signals for the n-th row are written to the second sub-pixels 49_E in the n-th row and the (n+1)th row, as illustrated in FIG. 22A.

The subsequent second sub-field period GBF1 of the first frame period 1F includes the second write period SGB1 of writing the green (first color) pixel signals to the first sub-pixels 49_O in the even-numbered rows and writing the same blue (third color) pixel signals to the second sub-pixels 49_E arranged in the order of the even-numbered row and the odd-numbered row in the second direction. After the second write period SGB1, the second light emission period LTGB1 is provided to cause the light emitters 63G of green (first color) and the light emitters 63B of blue (third color) to emit light simultaneously.

The scan circuit 32*b* sequentially supplies the drive signals to the scan lines SCL(2) to SCL(N) in the even-numbered rows during the second write period SGB1 of the second sub-field period GBF1 of the first frame period 1F, and the signal output circuit 31*b* outputs the pixel signals corresponding to the first sub-pixels 49_O and the second sub-pixels 49_E.

As a result, the green (first color) pixel signals are written to the first sub-pixels 49_O in the (n+1)th row coupled to the scan line SCL(n+1) in the even-numbered row, and the blue (third color) pixel signals for the (n+1)th row are simultaneously written to the second sub-pixels 49_E in the (n+1)th row and the (n+2)th row.

Then, during the second light emission period LTGB1 after the second response period DGB1, the light source control circuit 61*a* controls the light emitters 63G of green (first color) and the light emitters 63B of blue (third color) to emit light simultaneously. As a result, in the second sub-field period GBF1 of the first frame period 1F, the display is performed in the state where the green (first color) pixel signals are written to the first sub-pixels 49_O in the (n+1)th row and the blue (third color) pixel signals for the (n+1)th row are written to the second sub-pixels 49_E in the (n+1)th row and the (n+2)th row, as illustrated in FIG. 22B.

The first sub-field period GRF2 of the second frame period 2F includes the first write period SGR2 of writing the green (first color) pixel signals to the first sub-pixels 49_O in the even-numbered rows and writing the same red (second color) pixel signals to the second sub-pixels 49_E arranged in the order of the even-numbered row and the odd-numbered row in the second direction. After the first write period SGR2, the first light emission period LTGR2 is provided to cause the light emitters 63G of green (first color) and the light emitters 63R of red (second color) to emit light simultaneously.

The scan circuit 32*b* sequentially supplies the drive signals to the scan lines SCL(2) to SCL(N) in the even-numbered rows during the first write period SGR2 of the first sub-field period GRF2 of the second frame period 2F, and the signal output circuit 31*b* outputs the pixel signals corresponding to the first sub-pixels 49_O and the second sub-pixels 49_E.

As a result, the green (first color) pixel signals are written to the first sub-pixels 49_O in the (n+1)th row coupled to the scan line SCL(n+1) in the even-numbered row, and the red (second color) pixel signals for the (n+1)th row are simultaneously written to the second sub-pixels 49_E in the (n+1)th row and the (n+2)th row.

Then, during the first light emission period LTGR2 after the first response period DGR2, the light source control circuit 61*a* controls the light emitters 63G of green (first color) and the light emitters 63R of red (second color) to emit light simultaneously. As a result, in the first sub-field period GRF2 of the second frame period 2F, the display is performed in the state where the green (first color) pixel signals are written to the first sub-pixels 49_O in the (n+1)th row and the red (second color) pixel signals for the (n+1)th row are written to the second sub-pixels 49_E in the (n+1)th row and the (n+2)th row, as illustrated in FIG. 22C.

The subsequent second sub-field period GBF2 of the second frame period 2F includes the second write period SGB2 of writing the green (first color) pixel signals to the first sub-pixels 49_O in the odd-numbered rows and writing the same blue (third color) pixel signals to the second sub-pixels 49_E arranged in the order of the even-numbered row and the odd-numbered row in the second direction. After the second write period SGB2, the second light emission period LTGB2 is provided to cause the light emitters 63G of green (first color) and the light emitters 63B of blue (third color) to emit light simultaneously.

The scan circuit 32*b* sequentially supplies the drive signals to the scan lines SCL(1) to SCL(N−1) in the odd-numbered rows during the second write period SGB2 of the second sub-field period GBF2 of the second frame period 2F, and the signal output circuit 31*b* outputs the pixel signals corresponding to the first sub-pixels 49_O and the second sub-pixels 49_E.

As a result, the green (first color) pixel signals are written to the first sub-pixels 49_O in the n-th row coupled to the scan line SCL(n) in the odd-numbered row, and the blue (third color) pixel signals for the n-th row are simultaneously written to the second sub-pixels 49_E in the n-th row and the (n+1)th row.

Then, during the second light emission period LTGB2 after the second response period DGB2, the light source control circuit 61*a* controls the light emitters 63G of green (first color) and the light emitters 63B of blue (third color) to emit light simultaneously. As a result, in the second sub-field period GBF2 of the second frame period 2F, the display is performed in the state where the green (first color) pixel signals are written to the first sub-pixels 49_O in the n-th row and the blue (third color) pixel signals for the n-th row are written to the second sub-pixels 49_E in the n-th row and the (n+1)th row, as illustrated in FIG. 22D In the configuration and the operation of the second embodiment, the number of rows written in each of the sub-field periods is half that of the first embodiment. As a result, the write period in each of the sub-field periods can be shortened from that in the first embodiment described above.

With the configuration and the operation of the second embodiment, the first sub-pixels 49_O in the odd-numbered rows display green in the first sub-field period GRF1 of the first frame period 1F, and the first sub-pixels 49_O in the even-numbered rows display green in the second sub-field period GBF2 of the first frame period 1F. The first sub-pixels 49_O in the even-numbered rows display green in the first sub-field period GRF2 of the second frame period 2F, and the first sub-pixels 49_O in the odd-numbered rows display green in the second sub-field period GBF2 of the second frame period 2F.

The operation described above holds the display of green of the first sub-pixels 49_O in the odd-numbered rows written in the first sub-field period GRF1 of the first frame period 1F during the second sub-field period GBF1 of the first frame period 1F. In the same manner, the display of green of the first sub-pixels 49_O in the even-numbered rows written in the first sub-field period GRF2 of the second frame period 2F is held during the second sub-field period GBF2 of the second frame period 2F. Therefore, the resolution of green that is more luminous than red and blue is maintained without causing a reduction in luminance.

In contrast, with the configuration and the operation of the second embodiment, the red pixel signals for the even-numbered row (or the odd-numbered row) are written over two lines in the first sub-field period GRF1 of the first frame period 1F, and the blue pixel signals for the odd-numbered row (or the even-numbered row) are written over two lines in the second sub-field period GBF2 of the first frame period 1F. In addition, the red pixel signals for the odd-numbered row (or the even-numbered row) are written over two lines in the first sub-field period GRF2 of the second frame period 2F, and the blue pixel signals for the even-numbered row (or the odd-numbered row) are written over two lines in the second sub-field period GBF2 of the second frame period 2F.

The operation described above substantially halves the apparent resolution of red and blue that are less luminous than green. However, by displaying red in the even-numbered rows (or the odd-numbered rows) and blue in the odd-numbered rows (or the even-numbered rows) in the first frame period 1F and displaying red in the odd-numbered rows (or the even-numbered rows) and blue in the even-numbered rows (or the odd-numbered rows) in the second frame period 2F, the reduction in the apparent resolution of red and blue can be restrained.

Thus, with the configuration and the operation of the second embodiment, the resolution of green that is more luminous and more sensitive to the resolution is maintained, and the apparent resolution of red and blue that are less luminous is restrained from decreasing. This feature provides an advantage over the first embodiment that the reduction in the apparent resolution can be restrained.

The colors displayed by the first sub-pixel 49_O and the second sub-pixel 49_E can be changed in the same manner as in the first embodiment. The following describes modifications of the second embodiment in which the display colors of the first sub-pixel 49_O and the second sub-pixel 49_E are changed.

First Modification

Figure 23A:
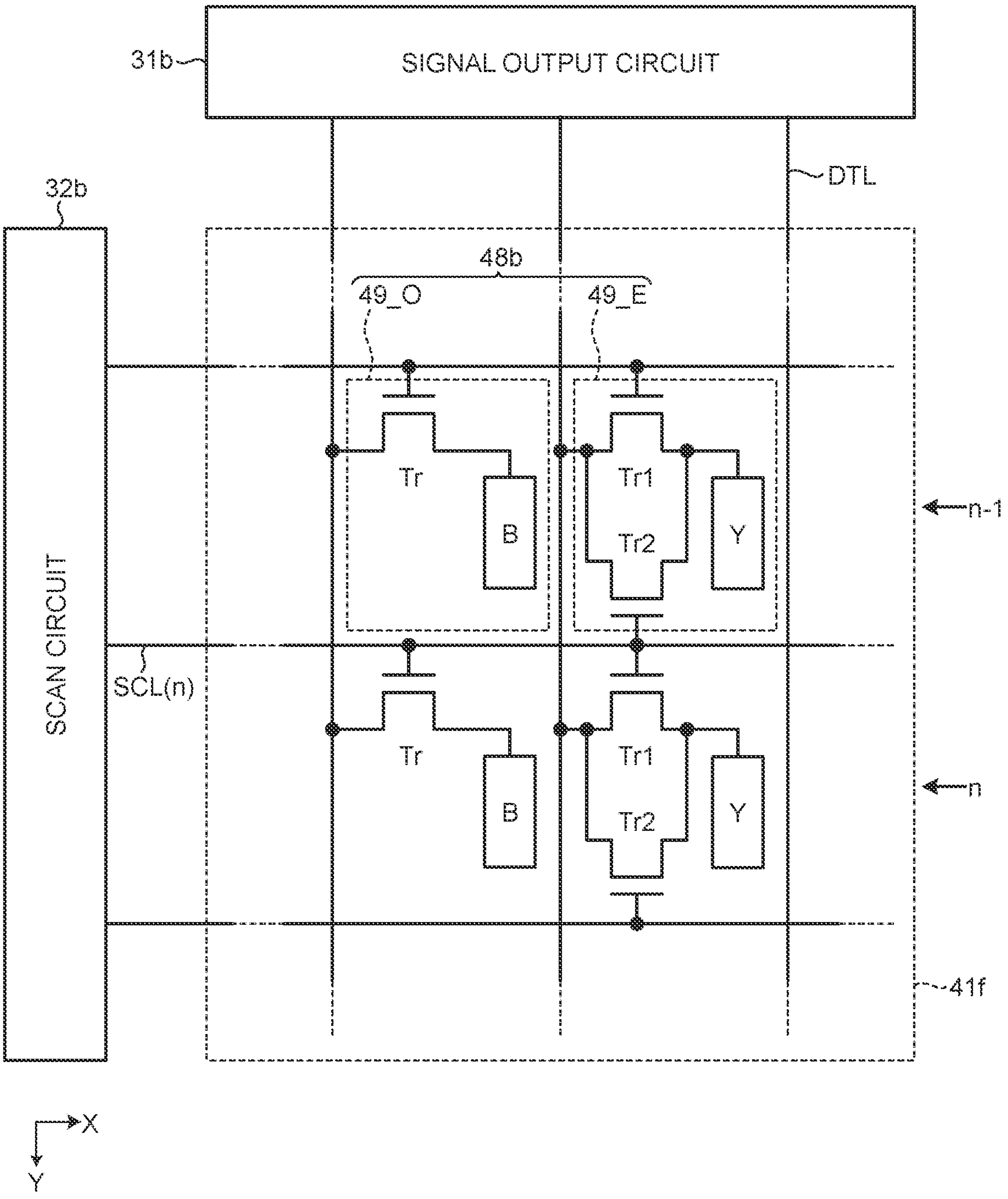
FIG. 23A is a diagram illustrating a first example of a pixel configuration of the display device according to a first modification of the second embodiment.
Figure 23B:
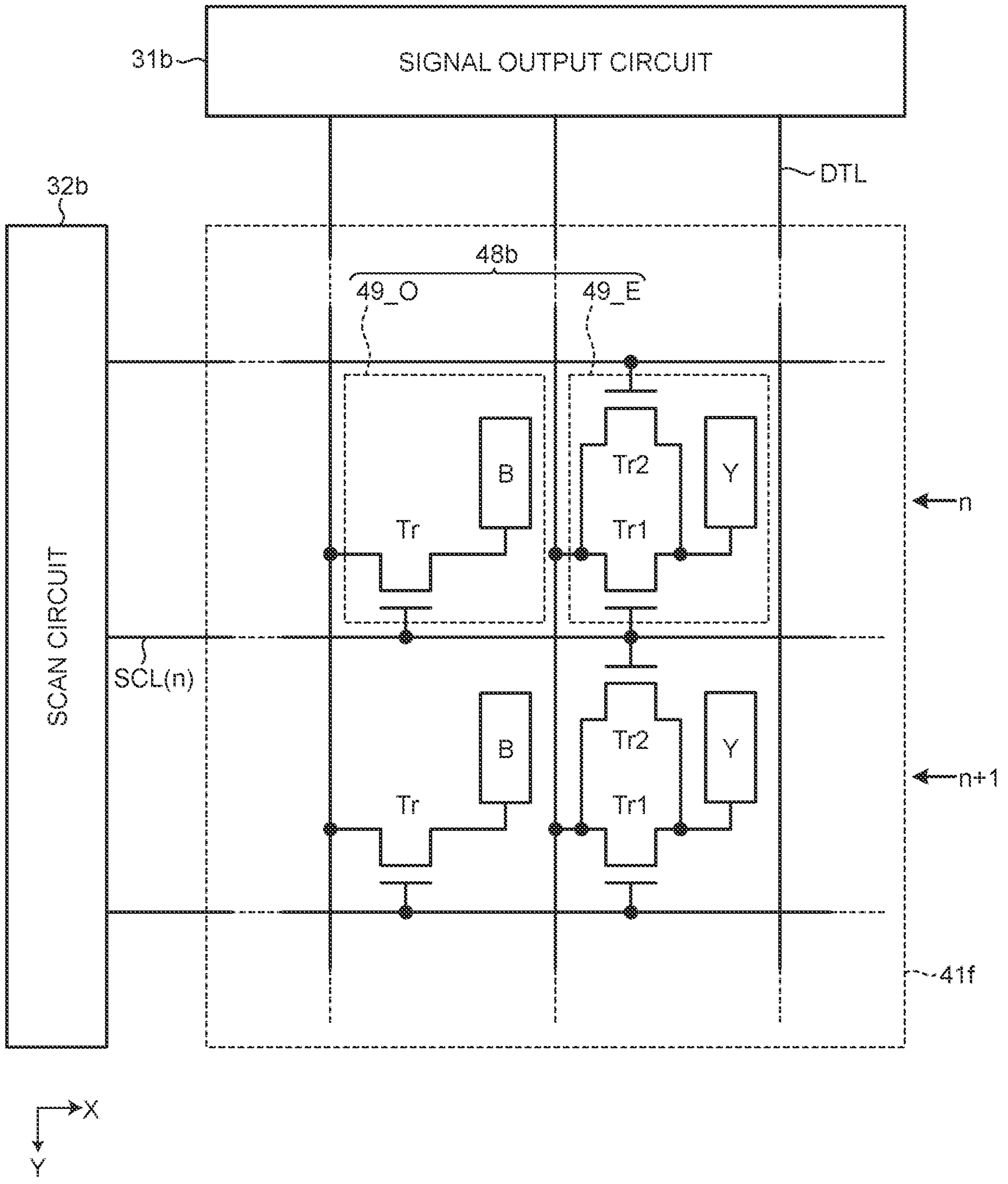
FIG. 23B is a diagram illustrating a second example of the pixel configuration of the display device according to the first modification of the second embodiment.

FIG. 23A is a diagram illustrating a first example of a pixel configuration of the display device according to a first modification of the second embodiment. FIG. 23B is a diagram illustrating a second example of the pixel configuration of the display device according to the first modification of the second embodiment.

As illustrated in FIGS. 23A and 23B, the first modification of the second embodiment differs from the first modification of the first embodiment in the configuration of the second sub-pixel 49_E and in the coupling of the first and the second sub-pixels 49_O and 49_E to the scan line SCL. Specifically, the second sub-pixel 49_E includes the first pixel transistor Tr1 and the second pixel transistor Tr2 coupled in parallel to the first pixel transistor Tr1.

As illustrated in FIGS. 23A and 23B, in the configuration according to the first modification of the second embodiment, the first color filter that overlaps a position in a display area 41*f* where the pixel electrode of the first sub-pixel 49_O is provided and transmits light in blue (first color) is disposed on the display panel 40*a*, in the same manner as in the first modification of the first embodiment. In the configuration according to the first modification of the second embodiment, the second color filter that overlaps a position in the display area 41*f* where the pixel electrode of the second sub-pixel 49_E is provided and transmits light in red (second color) or green (third color) is disposed on the display panel 40*a*, in the same manner as in the first modification of the first embodiment. That is, the second color filter is a color filter of yellow that is a complementary color between red (second color) and green (third color).

In the configuration of the first example illustrated in FIG. 23A, the scan line SCL(n) in the n-th row is coupled to the gates of the pixel transistors Tr of the first sub-pixels 49_O of the pixels 48*b* arranged in the n-th row, the gates of the first pixel transistors Tr1 of the second sub-pixels 49_E of the pixels 48*b* arranged in the n-th row, and the gates of the second pixel transistors Tr2 of the second sub-pixels 49_E of the pixels 48*b* arranged in the (n−1)th row.

As a result, with the configuration of the first example illustrated in FIG. 23A, by supplying the drive signal from the scan circuit 32*b* to the scan line SCL(n), blue (first color) is written to the first sub-pixels 49_O of the pixels 48*b* arranged in the n-th row, and the same pixel signals of red (second color) or green (third color) are simultaneously written to the second sub-pixels 49_E of the pixels 48*b* arranged in the n-th row and the second sub-pixels 49_E of the pixels 48*b* arranged in the (n−1)th row.

In the configuration of the second example illustrated in FIG. 23B, the scan line SCL(n) in the n-th row is coupled to the gates of the pixel transistors Tr of the first sub-pixels 49_O of the pixels 48*b* arranged in the n-th row, the gates of the first pixel transistors Tr1 of the second sub-pixels 49_E of the pixels 48*b* arranged in the n-th row, and the gates of the second pixel transistors Tr2 of the second sub-pixels 49_E of the pixels 48*b* arranged in the (n+1)th row.

As a result, with the configuration of the second example illustrated in FIG. 23B, by supplying the drive signal from the scan circuit 32*b* to the scan line SCL(n), blue (first color) is written to the first sub-pixels 49_O of the pixels 48*b* arranged in the n-th row, and the same pixel signals of red (second color) or green (third color) are simultaneously written to the second sub-pixels 49_E of the pixels 48*b* arranged in the n-th row and the second sub-pixels 49_E of the pixels 48*b* arranged in the (n+1)th row.

Figure 24:
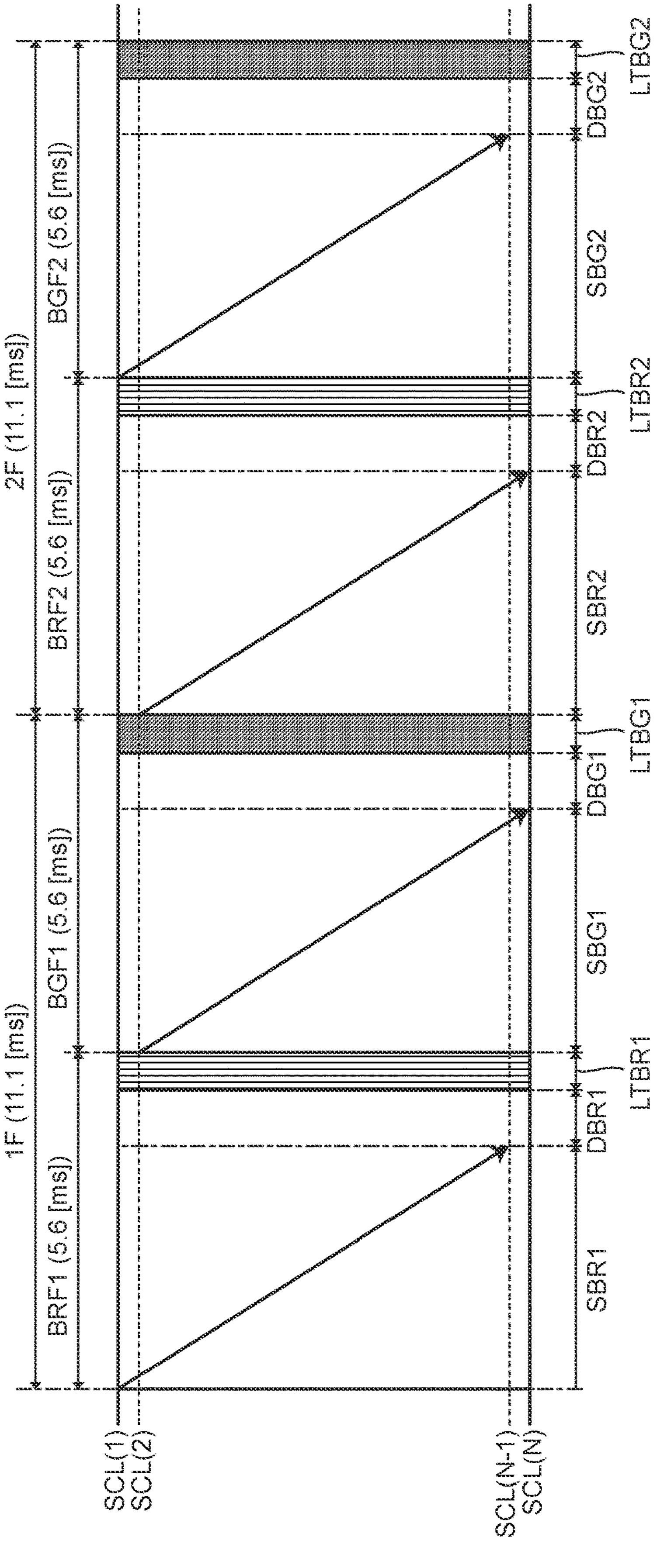
FIG. 24 is a timing diagram illustrating an example of the write period, the response period, and the light emission period in the first frame period and the second frame period of the display device according to the first modification of the second embodiment.

FIG. 24 is a timing diagram illustrating an example of the write period, the response period, and the light emission period in the first frame period and the second frame period of the display device according to the first modification of the second embodiment.

As illustrated in FIG. 24, in the first modification of the second embodiment, the first frame period 1F is divided into two periods of a first sub-field period BRF1 and a second sub-field period BGF1. The second frame period 2F is divided into two periods of a first sub-field period BRF2 and a second sub-field period BGF2.

Figure 25A:
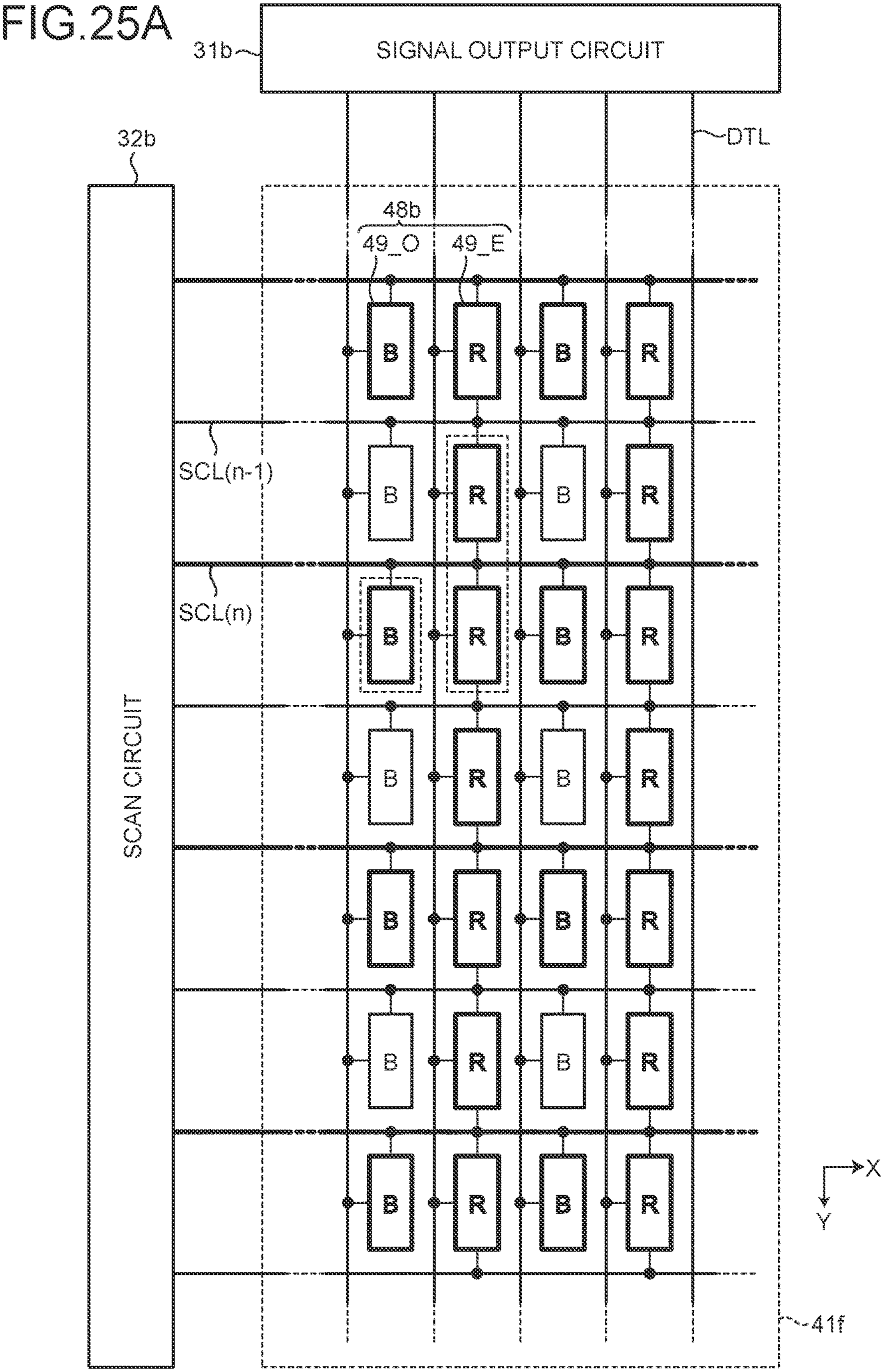
FIG. 25A is a diagram illustrating an exemplary display state in the first sub-field period of the first frame period of the display device according to a first example of the first modification of the second embodiment.
Figure 25B:
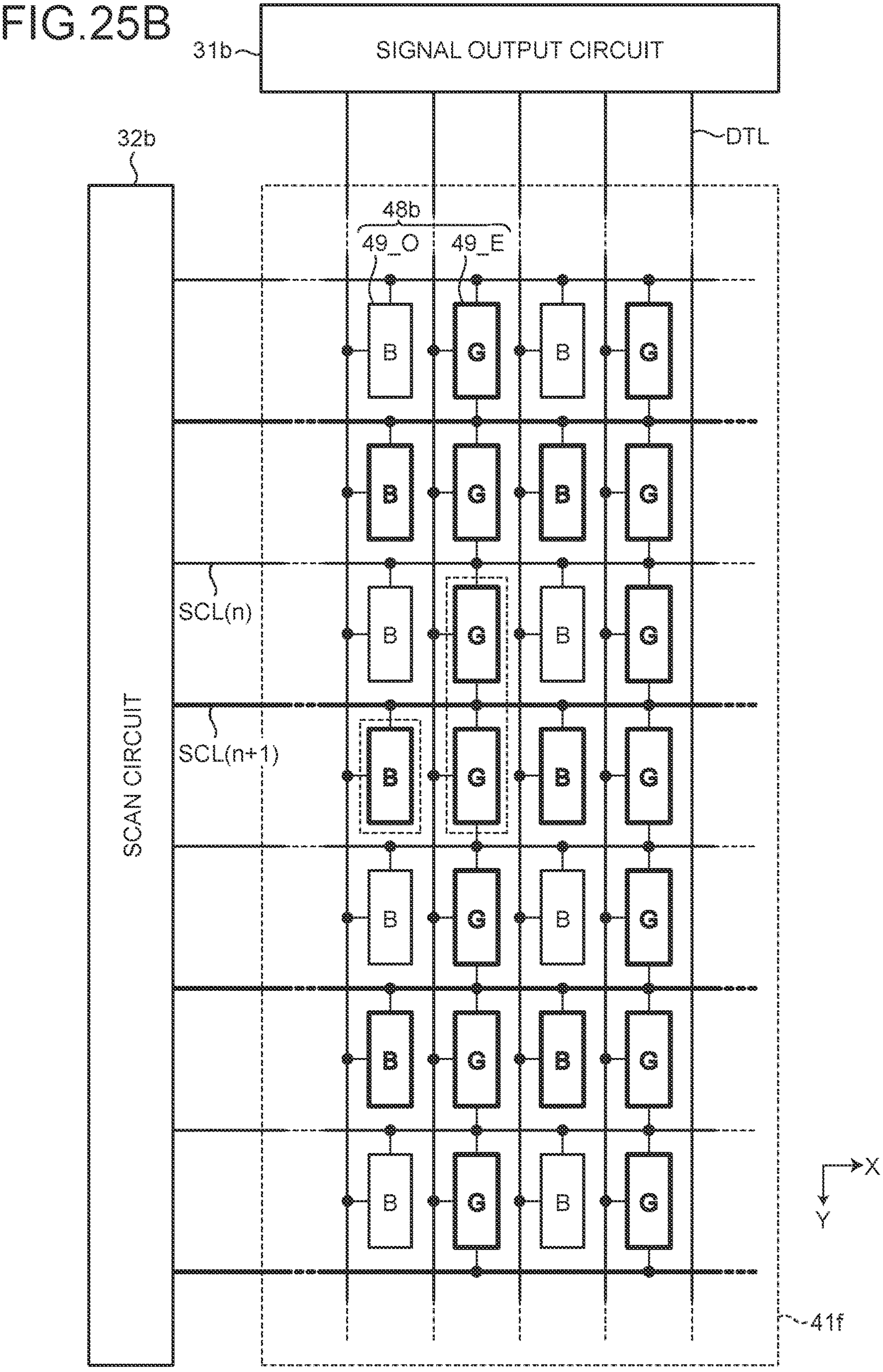
FIG. 25B is a diagram illustrating an exemplary display state in the second sub-field period of the first frame period of the display device according to the first example of the first modification of the second embodiment.
Figure 25C:
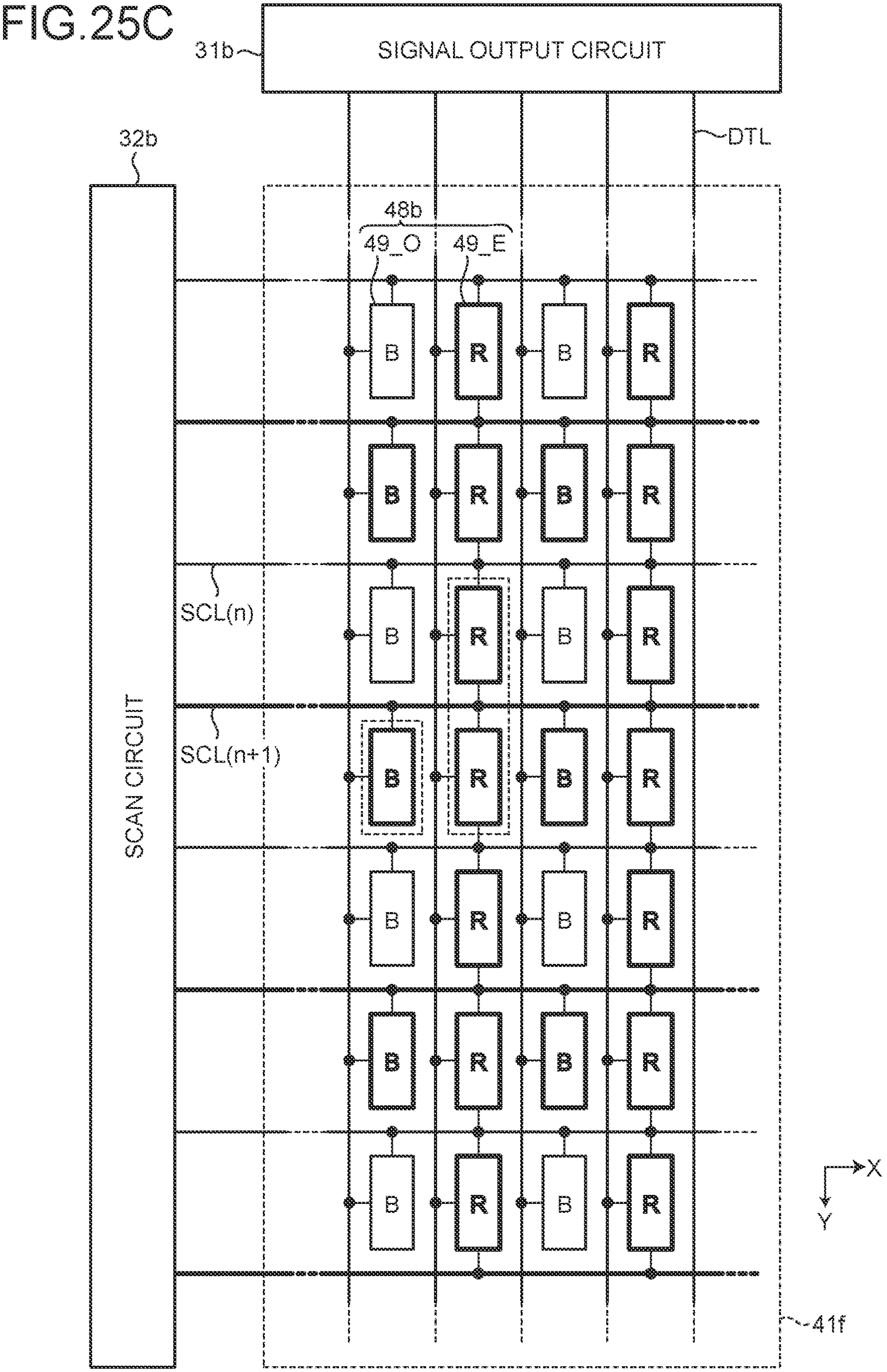
FIG. 25C is a diagram illustrating an exemplary display state in the first sub-field period of the second frame period of the display device according to the first example of the first modification of the second embodiment.
Figure 25D:
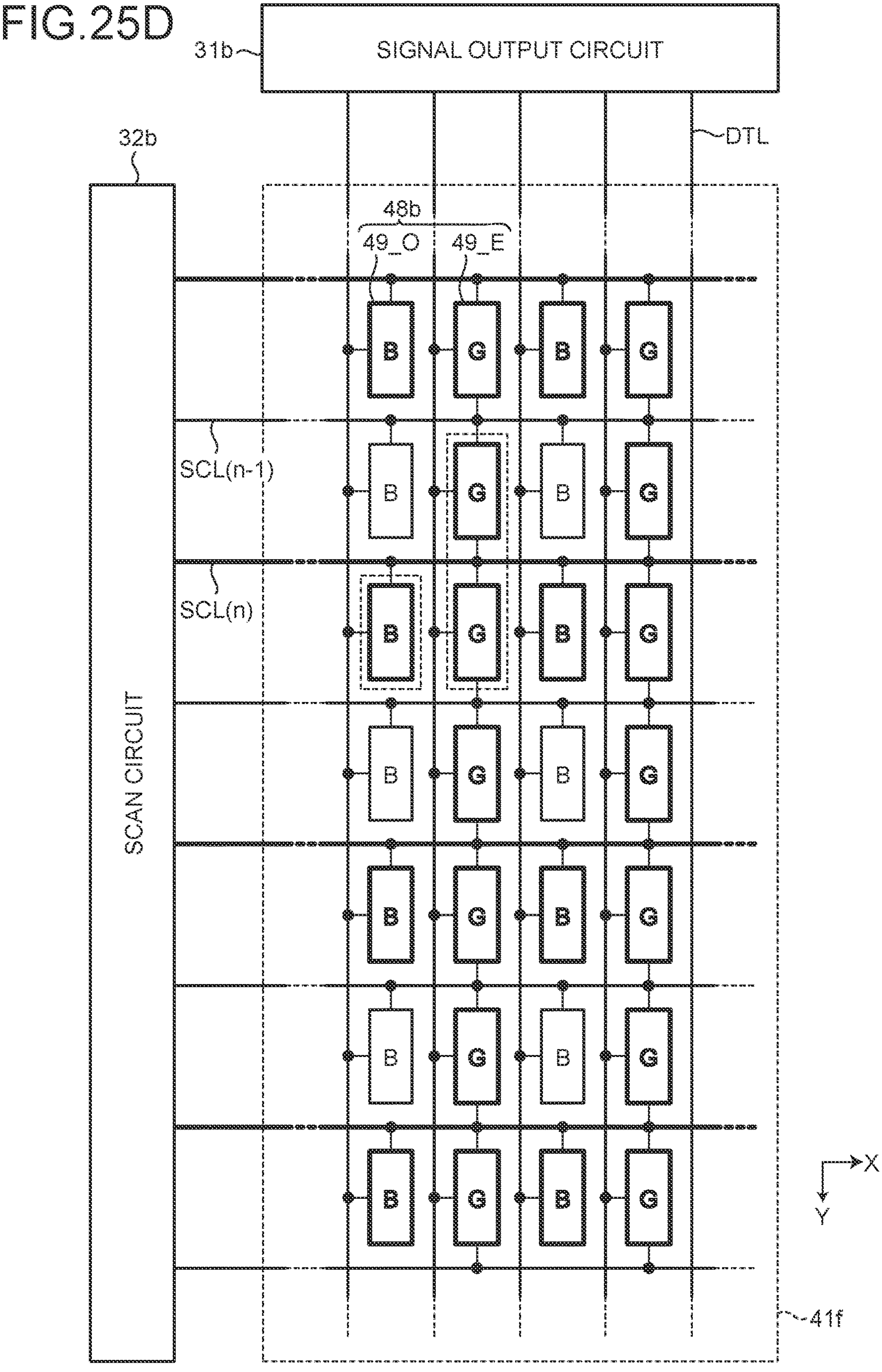
FIG. 25D is a diagram illustrating an exemplary display state in the second sub-field period of the second frame period of the display device according to the first example of the first modification of the second embodiment.

The following describes more specific operation examples in the first example of the pixel configuration according to the first modification of the second embodiment illustrated in FIG. 23A, with reference to FIGS. 25A, 25B, 25C, and 25D. FIG. 25A is a diagram illustrating an exemplary display state in the first sub-field period of the first frame period of the display device according to the first example of the first modification of the second embodiment. FIG. 25B is a diagram illustrating an exemplary display state in the second sub-field period of the first frame period of the display device according to the first example of the first modification of the second embodiment. FIG. 25C is a diagram illustrating an exemplary display state in the first sub-field period of the second frame period of the display device according to the first example of the first modification of the second embodiment. FIG. 25D is a diagram illustrating an exemplary display state in the second sub-field period of the second frame period of the display device according to the first example of the first modification of the second embodiment.

The first sub-field period BRF1 of the first frame period 1F includes a first write period SBR1 of writing the blue (first color) pixel signals to the first sub-pixels 49_O in the odd-numbered rows and writing the same red (second color) pixel signals to the second sub-pixels 49_E arranged in the order of the even-numbered row and the odd-numbered row in the second direction. After the first write period SBR1, a first light emission period LTBR1 is provided to cause the light emitters 63B of blue (first color) and the light emitters 63R of red (second color) to emit light simultaneously.

The scan circuit 32*b* sequentially supplies the drive signals to the scan lines SCL(1) to SCL(N−1) in the odd-numbered rows during the first write period SBR1 of the first sub-field period BRF1 of the first frame period 1F, and the signal output circuit 31*b* outputs the pixel signals corresponding to the first sub-pixels 49_O and the second sub-pixels 49_E.

As a result, the blue (first color) pixel signals are written to the first sub-pixels 49_O in the n-th row coupled to the scan line SCL(n) in the odd-numbered row, and the red (second color) pixel signals for the n-th row are simultaneously written to the second sub-pixels 49_E in the (n−1)th row and the n-th row.

Then, during the first light emission period LTBR1 after a first response period DBR1, the light source control circuit 61*a* controls the light emitters 63B of blue (first color) and the light emitters 63R of red (second color) to emit light simultaneously. As a result, in the first sub-field period BRF1 of the first frame period 1F, the display is performed in the state where the blue (first color) pixel signals are written to the first sub-pixels 49_O in the n-th row and the red (second color) pixel signals for the n-th row are written to the second sub-pixels 49_E in the (n−1)th row and the n-th row, as illustrated in FIG. 25A.

The subsequent second sub-field period BGF1 of the first frame period 1F includes a second write period SBG1 of writing the blue (first color) pixel signals to the first sub-pixels 49_O in the even-numbered rows and writing the same green (third color) pixel signals to the second sub-pixels 49_E arranged in the order of the odd-numbered row and the even-numbered row in the second direction. After the second write period SBG1, a second light emission period LTBG1 is provided to cause the light emitters 63B of blue (first color) and the light emitters 63G of green (third color) to emit light simultaneously.

The scan circuit 32*b* sequentially supplies the drive signals to the scan lines SCL(2) to SCL(N) in the even-numbered rows during the second write period SBG1 of the second sub-field period BGF1 of the first frame period 1F, and the signal output circuit 31*b* outputs the pixel signals corresponding to the first sub-pixels 49_O and the second sub-pixels 49_E.

As a result, the blue (first color) pixel signals are written to the first sub-pixels 49_O in the (n+1)th row coupled to the scan line SCL(n+1) in the even-numbered row, and the green (third color) pixel signals for the (n+1)th row are simultaneously written to the second sub-pixels 49_E in the n-th row and the (n+1)th row.

Then, during the second light emission period LTBG1 after a second response period DBG1, the light source control circuit 61*a* controls the light emitters 63B of blue (first color) and the light emitters 63G of green (third color) to emit light simultaneously. As a result, in the second sub-field period BGF1 of the first frame period 1F, the display is performed in the state where the blue (first color) pixel signals are written to the first sub-pixels 49_O in the (n+1)th row and the green (third color) pixel signals for the (n+1)th row are written to the second sub-pixels 49_E in the n-th row and the (n+1)th row, as illustrated in FIG. 25B.

The first sub-field period BRF2 of the second frame period 2F includes a first write period SBR2 of writing the blue (first color) pixel signals to the first sub-pixels 49_O in the even-numbered rows and writing the same red (second color) pixel signals to the second sub-pixels 49_E arranged in the order of the odd-numbered row and the even-numbered row in the second direction. After the first write period SBR2, a first light emission period LTBR2 is provided to cause the light emitters 63B of blue (first color) and the light emitters 63R of red (second color) to emit light simultaneously.

The scan circuit 32*b* sequentially supplies the drive signals to the scan lines SCL(2) to SCL(N) in the even-numbered rows during the first write period SBR2 of the first sub-field period BRF2 of the second frame period 2F, and the signal output circuit 31*b* outputs the pixel signals corresponding to the first sub-pixels 49_O and the second sub-pixels 49_E.

As a result, the blue (first color) pixel signals are written to the first sub-pixels 49_O in the (n+1)th row coupled to the scan line SCL(n+1) in the even-numbered row, and the red (second color) pixel signals for the (n+1)th row are simultaneously written to the second sub-pixels 49_E in the n-th row and the (n+1)th row.

Then, during the first light emission period LTBR2 after a first response period DBR2, the light source control circuit 61*a* controls the light emitters 63B of blue (first color) and the light emitters 63R of red (second color) to emit light simultaneously. As a result, in the first sub-field period BRF2 of the second frame period 2F, the display is performed in the state where the blue (first color) pixel signals are written to the first sub-pixels 49_O in the (n+1)th row and the red (second color) pixel signals for the (n+1)th row are written to the second sub-pixels 49_E in the n-th row and the (n+1)th row, as illustrated in FIG. 25C.

The subsequent second sub-field period BGF2 of the second frame period 2F includes a second write period SBG2 of writing the blue (first color) pixel signals to the first sub-pixels 49_O in the odd-numbered rows and writing the same green (third color) pixel signals to the second sub-pixels 49_E arranged in the order of the even-numbered row and the odd-numbered row in the second direction. After the second write period SBG2, a second light emission period LTBG2 is provided to cause the light emitters 63B of blue (first color) and the light emitters 63G of green (third color) to emit light simultaneously.

The scan circuit 32*b* sequentially supplies the drive signals to the scan lines SCL(1) to SCL(N−1) in the odd-numbered rows during the second write period SBG2 of the second sub-field period BGF2 of the second frame period 2F, and the signal output circuit 31*b* outputs the pixel signals corresponding to the first sub-pixels 49_O and the second sub-pixels 49_E.

As a result, the blue (first color) pixel signals are written to the first sub-pixels 49_O in the n-th row coupled to the scan line SCL(n) in the odd-numbered row, and the green (third color) pixel signals for the n-th row are simultaneously written to the second sub-pixels 49_E in the (n−1)th row and the n-th row.

Then, during the second light emission period LTBG2 after a second response period DBG2, the light source control circuit 61*a* controls the light emitters 63B of blue (first color) and the light emitters 63G of green (third color) to emit light simultaneously. As a result, in the second sub-field period BGF2 of the second frame period 2F, the display is performed in the state where the blue (first color) pixel signals are written to the first sub-pixels 49_O in the n-th row and the green (third color) pixel signals for the n-th row are written to the second sub-pixels 49_E in the (n−1)th row and the n-th row, as illustrated in FIG. 25D.

Figure 26A:
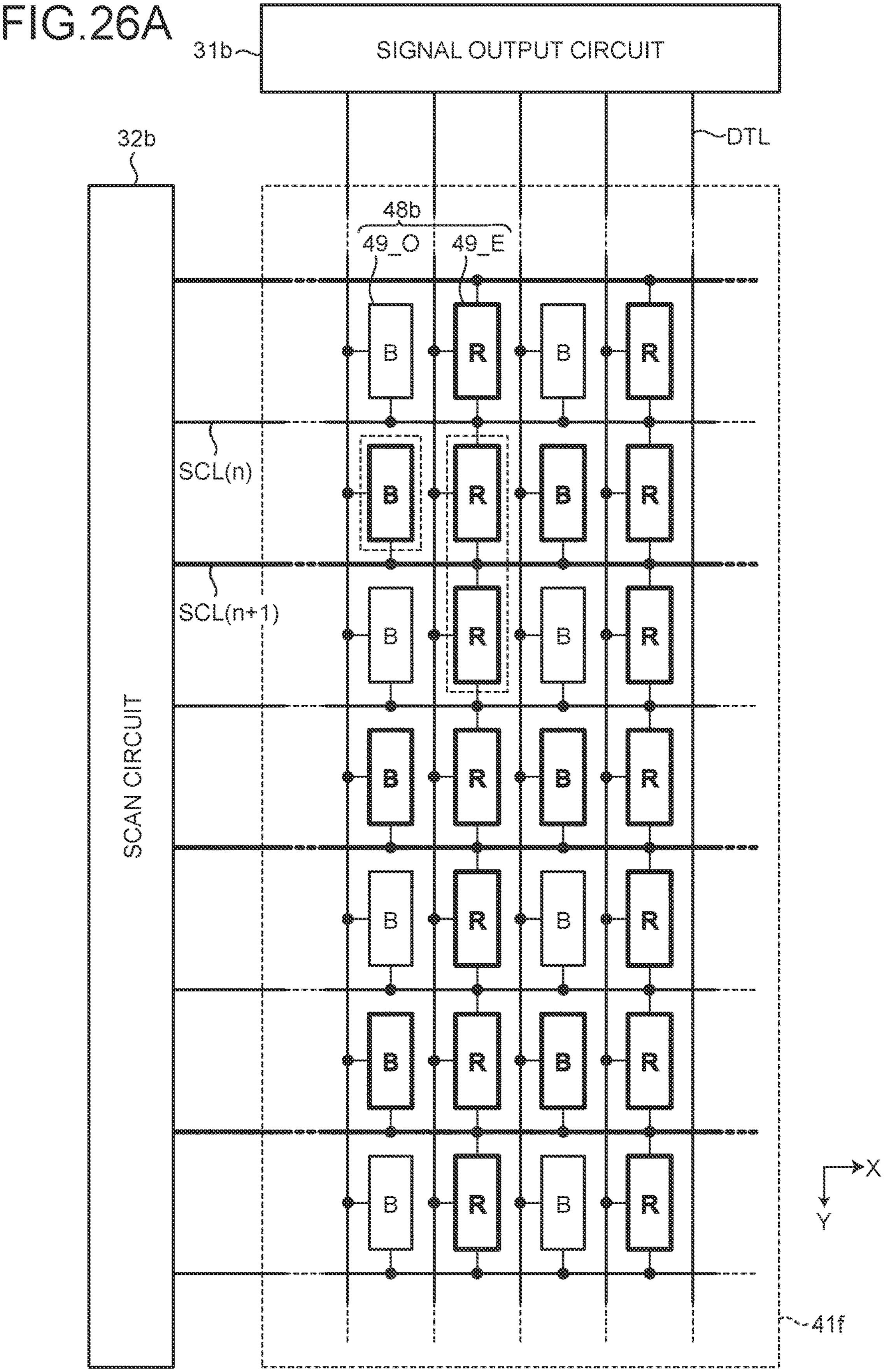
FIG. 26A is a diagram illustrating an exemplary display state in the first sub-field period of the first frame period of the display device according to a second example of the first modification of the second embodiment.
Figure 26B:
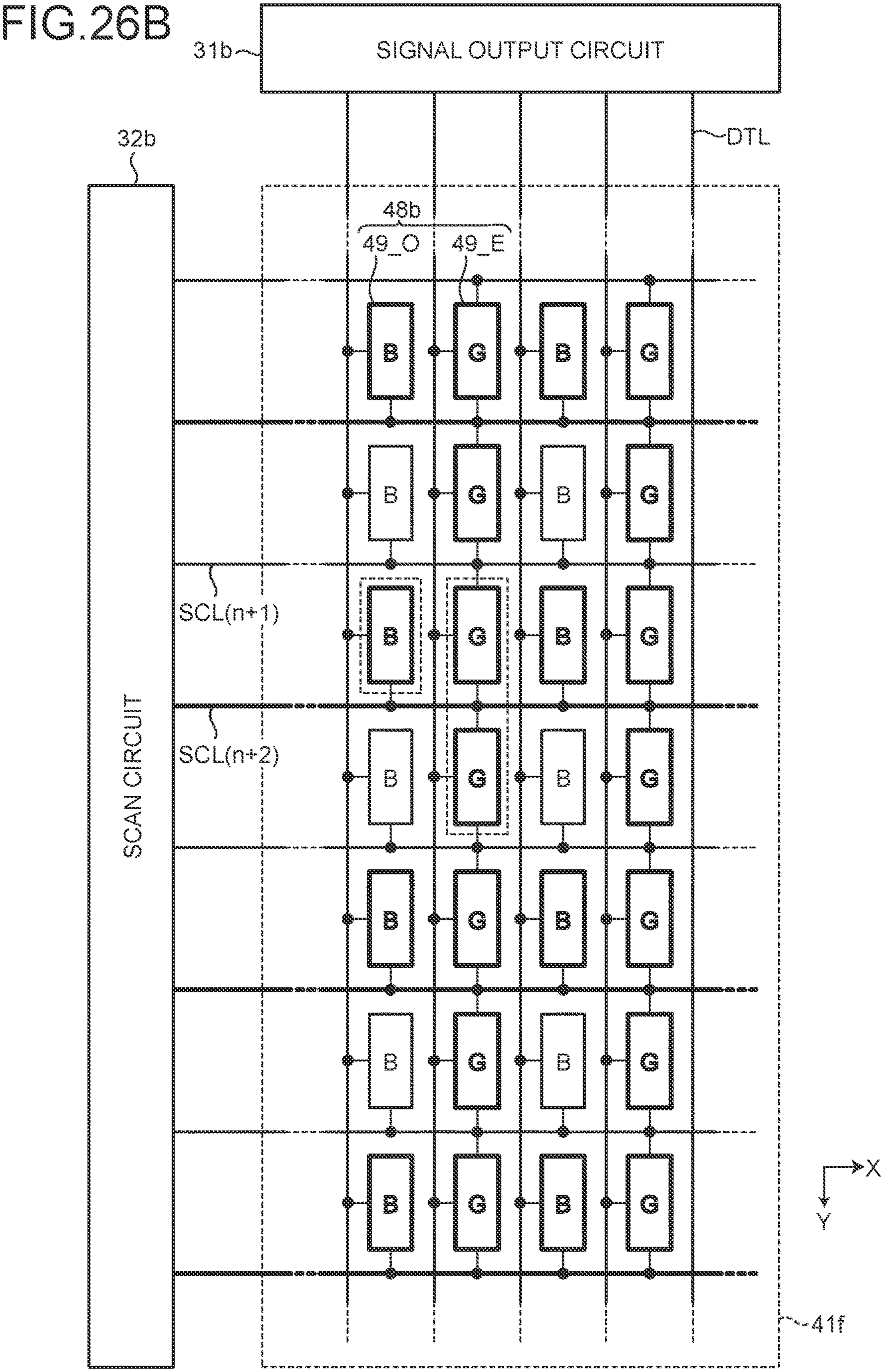
FIG. 26B is a diagram illustrating an exemplary display state in the second sub-field period of the first frame period of the display device according to the second example of the first modification of the second embodiment.
Figure 26C:
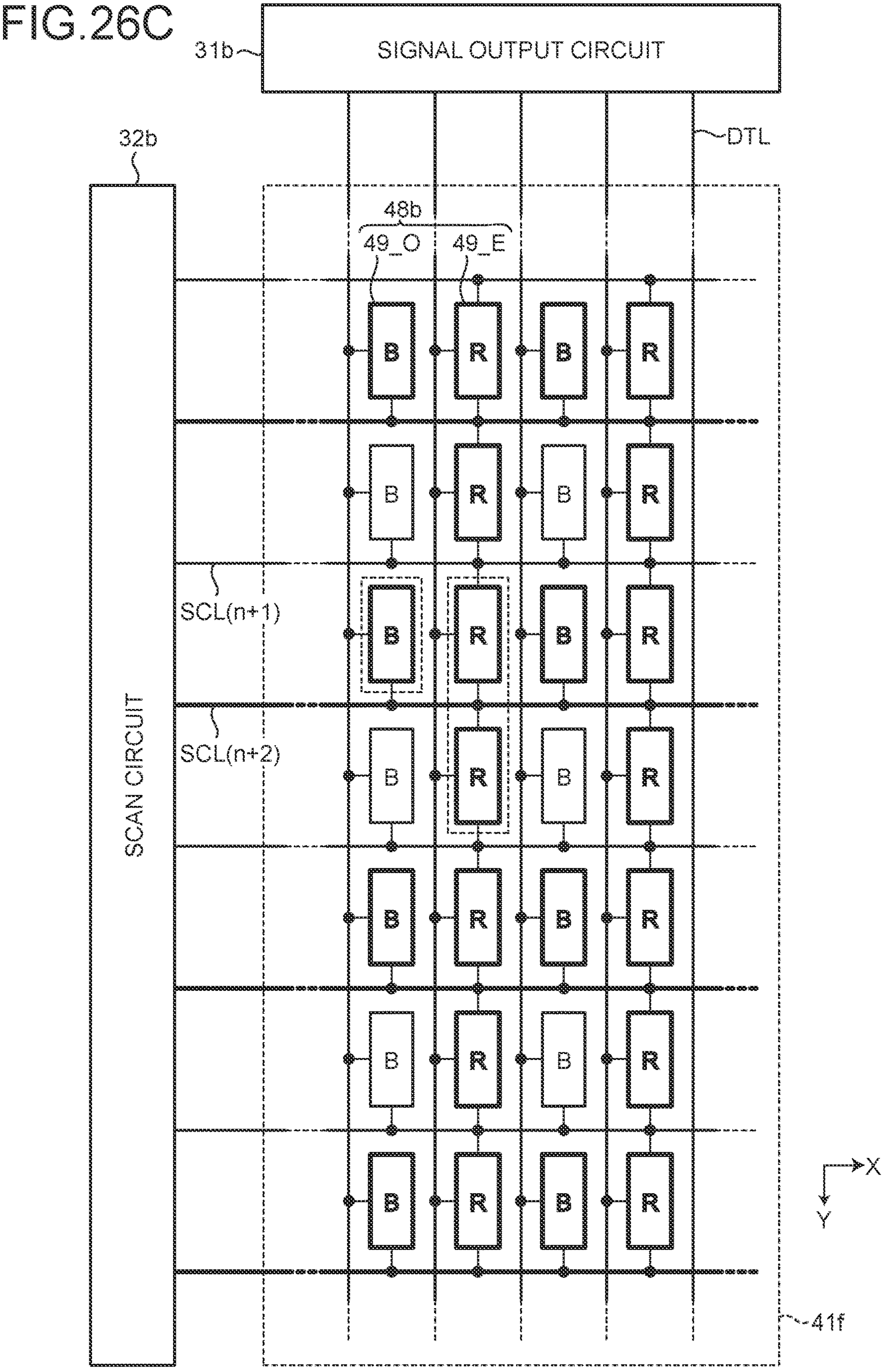
FIG. 26C is a diagram illustrating an exemplary display state in the first sub-field period of the second frame period of the display device according to the second example of the first modification of the second embodiment.
Figure 26D:
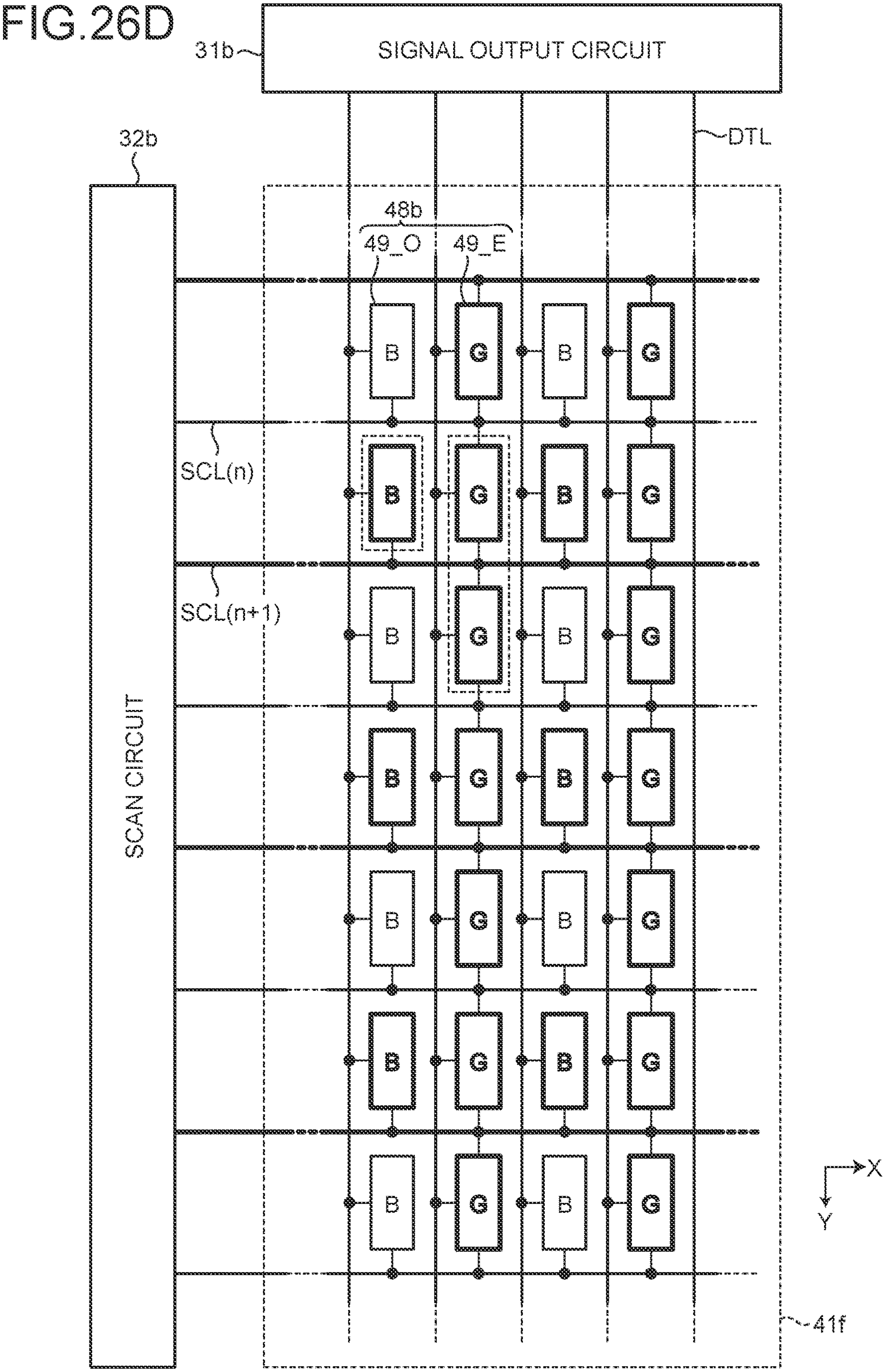
FIG. 26D is a diagram illustrating an exemplary display state in the second sub-field period of the second frame period of the display device according to the second example of the first modification of the second embodiment.

The following describes more specific operation examples in the second example of the pixel configuration according to the first modification of the second embodiment illustrated in FIG. 23B, with reference to FIGS. 26A, 26B, 26C, and 26D. FIG. 26A is a diagram illustrating an exemplary display state in the first sub-field period of the first frame period of the display device according to the second example of the first modification of the second embodiment. FIG. 26B is a diagram illustrating an exemplary display state in the second sub-field period of the first frame period of the display device according to the second example of the first modification of the second embodiment. FIG. 26C is a diagram illustrating an exemplary display state in the first sub-field period of the second frame period of the display device according to the second example of the first modification of the second embodiment. FIG. 26D is a diagram illustrating an exemplary display state in the second sub-field period of the second frame period of the display device according to the second example of the first modification of the second embodiment.

The first sub-field period BRF1 of the first frame period 1F includes the first write period SBR1 of writing the blue (first color) pixel signals to the first sub-pixels 49_O in the odd-numbered rows and writing the same red (second color) pixel signals to the second sub-pixels 49_E arranged in the order of the odd-numbered row and the even-numbered row in the second direction. After the first write period SBR1, the first light emission period LTBR1 is provided to cause the light emitters 63B of blue (first color) and the light emitters 63R of red (second color) to emit light simultaneously.

The scan circuit 32*b* sequentially supplies the drive signals to the scan lines SCL(1) to SCL(N−1) in the odd-numbered rows during the first write period SBR1 of the first sub-field period BRF1 of the first frame period 1F, and the signal output circuit 31*b* outputs the pixel signals corresponding to the first sub-pixels 49_O and the second sub-pixels 49_E.

As a result, the blue (first color) pixel signals are written to the first sub-pixels 49_O in the n-th row coupled to the scan line SCL(n) in the odd-numbered row, and the red (second color) pixel signals for the n-th row are simultaneously written to the second sub-pixels 49_E in the n-th row and the (n+1)th row.

Then, during the first light emission period LTBR1 after a first response period DBR1, the light source control circuit 61*a* controls the light emitters 63B of blue (first color) and the light emitters 63R of red (second color) to emit light simultaneously. As a result, in the first sub-field period BRF1 of the first frame period 1F, the display is performed in the state where the blue (first color) pixel signals are written to the first sub-pixels 49_O in the n-th row and the red (second color) pixel signals for the n-th row are written to the second sub-pixels 49_E in the n-th row and the (n+1)th row, as illustrated in FIG. 26A.

The subsequent second sub-field period BGF1 of the first frame period 1F includes the second write period SBG1 of writing the blue (first color) pixel signals to the first sub-pixels 49_O in the even-numbered rows and writing the same green (third color) pixel signals to the second sub-pixels 49_E arranged in the order of the even-numbered row and the odd-numbered row in the second direction. After the second write period SBG1, the second light emission period LTBG1 is provided to cause the light emitters 63B of blue (first color) and the light emitters 63G of green (third color) to emit light simultaneously.

The scan circuit 32*b* sequentially supplies the drive signals to the scan lines SCL(2) to SCL(N) in the even-numbered rows during the second write period SBG1 of the second sub-field period BGF1 of the first frame period 1F, and the signal output circuit 31*b* outputs the pixel signals corresponding to the first sub-pixels 49_O and the second sub-pixels 49_E.

As a result, the blue (first color) pixel signals are written to the first sub-pixels 49_O in the (n+1)th row coupled to the scan line SCL(n+1) in the even-numbered row, and the green (third color) pixel signals for the (n+1)th row are simultaneously written to the second sub-pixels 49_E in the (n+1)th row and the (n+2)th row.

Then, during the second light emission period LTBG1 after the second response period DBG1, the light source control circuit 61*a* controls the light emitters 63B of blue (first color) and the light emitters 63G of green (third color) to emit light simultaneously. As a result, in the second sub-field period BGF1 of the first frame period 1F, the display is performed in the state where the blue (first color) pixel signals are written to the first sub-pixels 49_O in the (n+1)th row and the green (third color) pixel signals for the (n+1)th row are written to the second sub-pixels 49_E in the (n+1)th row and the (n+2)th row, as illustrated in FIG. 26B.

The first sub-field period BRF2 of the second frame period 2F includes the first write period SBR2 of writing the blue (first color) pixel signals to the first sub-pixels 49_O in the even-numbered rows and writing the same red (second color) pixel signals to the second sub-pixels 49_E arranged in the order of the even-numbered row and the odd-numbered row in the second direction. After the first write period SBR2, the first light emission period LTBR2 is provided to cause the light emitters 63B of blue (first color) and the light emitters 63R of red (second color) to emit light simultaneously.

The scan circuit 32*b* sequentially supplies the drive signals to the scan lines SCL(2) to SCL(N) in the even-numbered rows during the first write period SBR2 of the first sub-field period BRF2 of the second frame period 2F, and the signal output circuit 31*b* outputs the pixel signals corresponding to the first sub-pixels 49_O and the second sub-pixels 49_E.

As a result, the blue (first color) pixel signals are written to the first sub-pixels 49_O in the (n+1)th row coupled to the scan line SCL(n+1) in the even-numbered row, and the red (second color) pixel signals for the (n+1)th row are simultaneously written to the second sub-pixels 49_E in the (n+1)th row and the (n+2)th row.

Then, during the first light emission period LTBR2 after a first response period DBR2, the light source control circuit 61*a* controls the light emitters 63B of blue (first color) and the light emitters 63R of red (second color) to emit light simultaneously. As a result, in the first sub-field period BRF2 of the second frame period 2F, the display is performed in the state where the blue (first color) pixel signals are written to the first sub-pixels 49_O in the (n+1)th row and the red (second color) pixel signals for the (n+1)th row are written to the second sub-pixels 49_E in the (n+1)th row and the (n+2)th row, as illustrated in FIG. 26C.

The subsequent second sub-field period BGF2 of the second frame period 2F includes the second write period SBG2 of writing the blue (first color) pixel signals to the first sub-pixels 49_O in the odd-numbered rows and writing the same green (third color) pixel signals to the second sub-pixels 49_E arranged in the order of the even-numbered row and the odd-numbered row in the second direction. After the second write period SBG2, the second light emission period LTBG2 is provided to cause the light emitters 63B of blue (first color) and the light emitters 63G of green (third color) to emit light simultaneously.

The scan circuit 32*b* sequentially supplies the drive signals to the scan lines SCL(1) to SCL(N−1) in the odd-numbered rows during the second write period SBG2 of the second sub-field period BGF2 of the second frame period 2F, and the signal output circuit 31*b* outputs the pixel signals corresponding to the first sub-pixels 49_O and the second sub-pixels 49_E.

As a result, the blue (first color) pixel signals are written to the first sub-pixels 49_O in the n-th row coupled to the scan line SCL(n) in the odd-numbered row, and the green (third color) pixel signals for the n-th row are simultaneously written to the second sub-pixels 49_E in the n-th row and the (n+1)th row.

Then, during the second light emission period LTBG2 after the second response period DBG2, the light source control circuit 61*a* controls the light emitters 63B of blue (first color) and the light emitters 63G of green (third color) to emit light simultaneously. As a result, in the second sub-field period BGF2 of the second frame period 2F, the display is performed in the state where the blue (first color) pixel signals are written to the first sub-pixels 49_O in the n-th row and the green (third color) pixel signals for the n-th row are written to the second sub-pixels 49_E in the n-th row and the (n+1)th row, as illustrated in FIG. 26D.

In the configuration and the operation of the first modification of the second embodiment, the number of rows written in each of the sub-field periods is half that of the first modification of the first embodiment. As a result, the write period in each of the sub-field periods can be shortened from that in the first modification of the first embodiment described above.

Second Modification

Figure 27A:
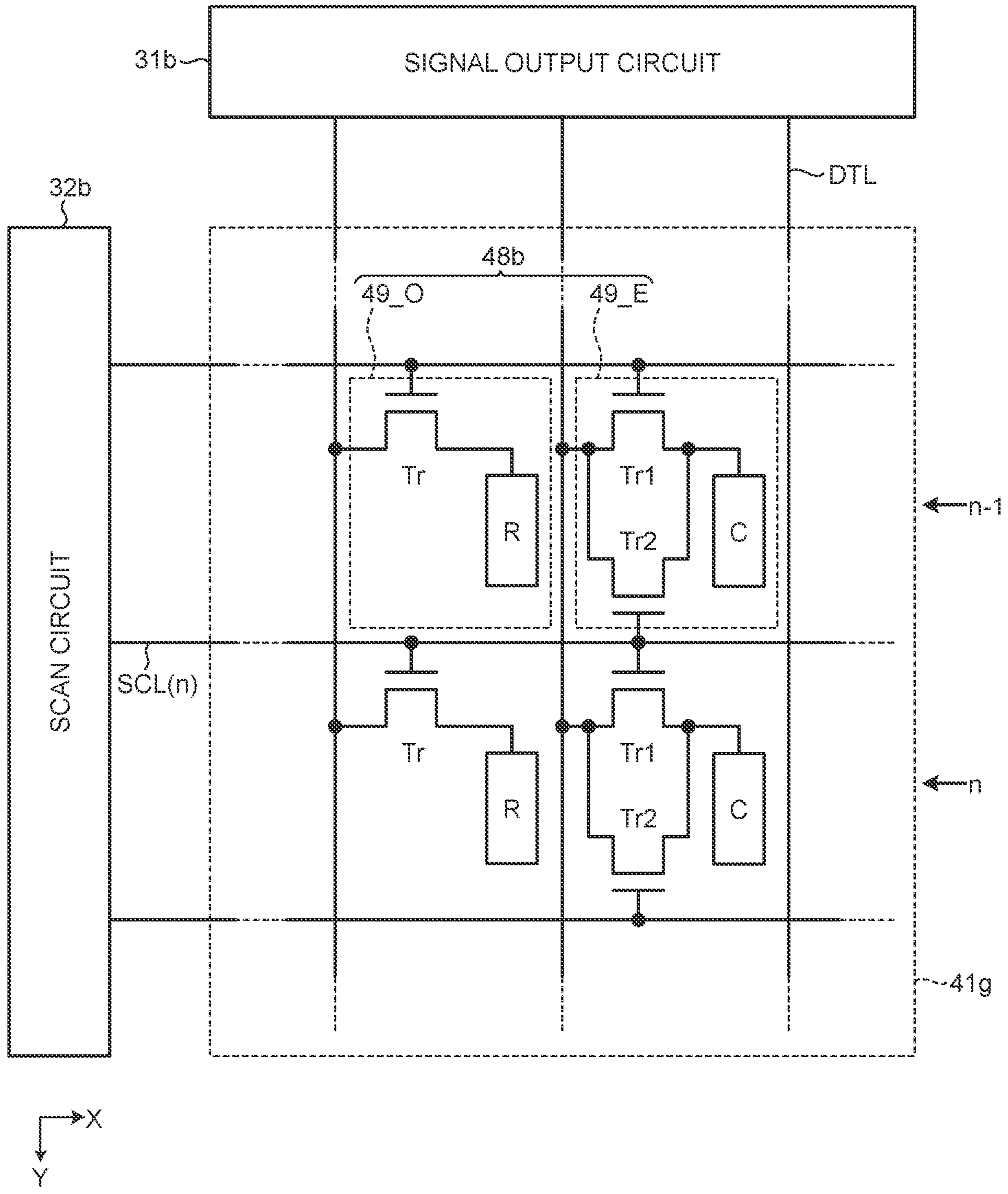
FIG. 27A is a diagram illustrating a first example of a pixel configuration of the display device according to a second modification of the second embodiment.
Figure 27B:
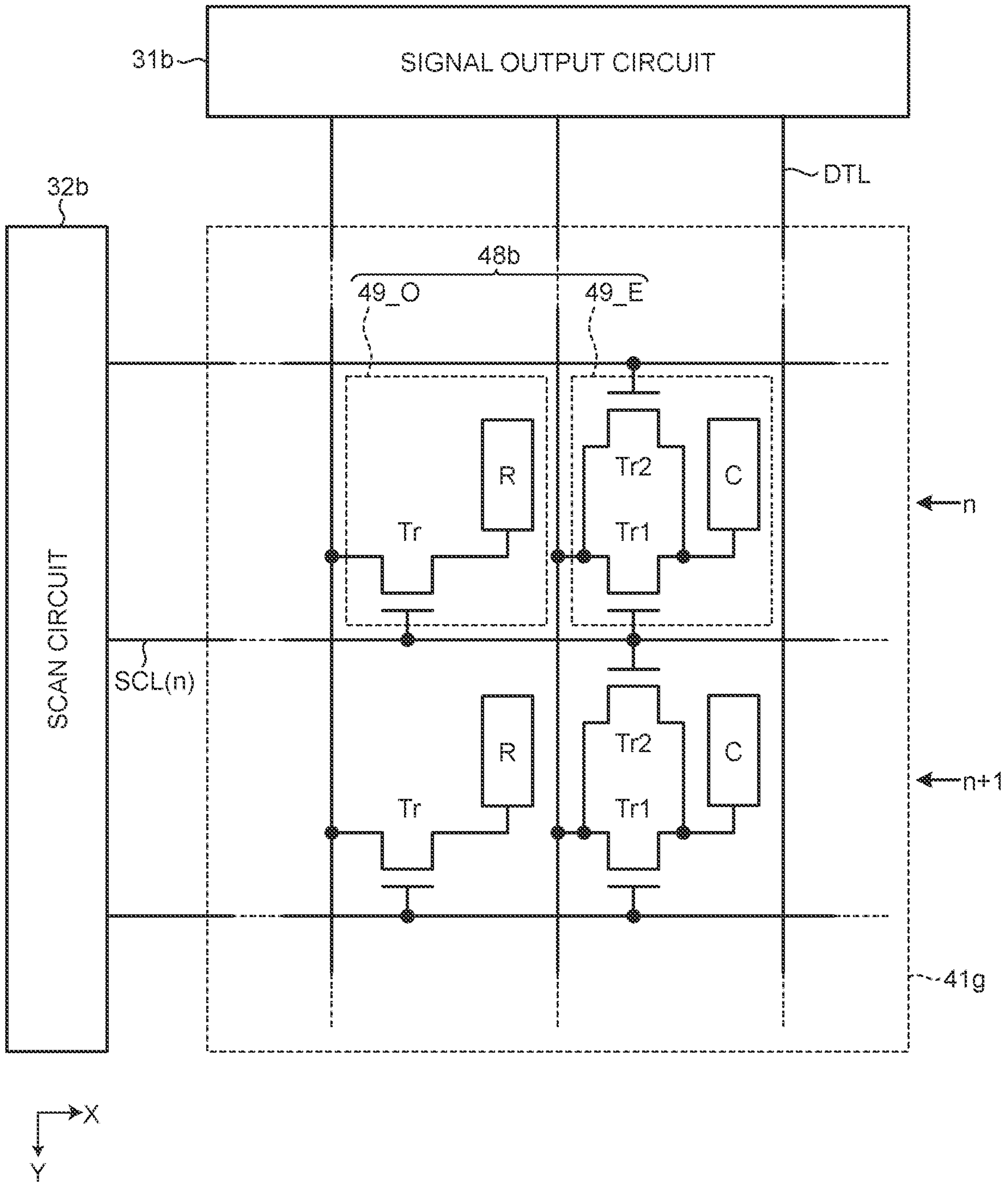
FIG. 27B is a diagram illustrating a second example of the pixel configuration of the display device according to the second modification of the second embodiment.

FIG. 27A is a diagram illustrating a first example of a pixel configuration of the display device according to a second modification of the second embodiment. FIG. 27B is a diagram illustrating a second example of the pixel configuration of the display device according to the second modification of the second embodiment.

As illustrated in FIGS. 27A and 27B, the second modification of the second embodiment differs from the second modification of the first embodiment in the configuration of the second sub-pixel 49_E and in the coupling of the first and the second sub-pixels 49_O and 49_E to the scan line SCL. Specifically, the second sub-pixel 49_E includes the first pixel transistor Tr1 and the second pixel transistor Tr2 coupled in parallel to the first pixel transistor Tr1.

As illustrated in FIGS. 27A and 27B, in the configuration according to the second modification of the second embodiment, the first color filter that overlaps a position in a display area 41*g* where the pixel electrode of the first sub-pixel 49_O is provided and transmits light in red (first color) is disposed on the display panel 40*a*, in the same manner as in the second modification of the first embodiment. In the configuration according to the second modification of the second embodiment, the second color filter that overlaps a position in the display area 41*g* where the pixel electrode of the second sub-pixel 49_E is provided and transmits light in green (second color) or blue (third color) is disposed on the display panel 40*a*, in the same manner as in the second modification of the first embodiment. That is, the second color filter is a color filter of cyan that is a complementary color between green (second color) and blue (third color).

In the configuration of the first example illustrated in FIG. 27A, the scan line SCL(n) in the n-th row is coupled to the gates of the pixel transistors Tr of the first sub-pixels 49_O of the pixels 48*b* arranged in the n-th row, the gates of the first pixel transistors Tr1 of the second sub-pixels 49_E of the pixels 48*b* arranged in the n-th row, and the gates of the second pixel transistors Tr2 of the second sub-pixels 49_E of the pixels 48*b* arranged in the (n−1)th row.

As a result, with the configuration of the first example illustrated in FIG. 27A, by supplying the drive signal from the scan circuit 32*b* to the scan line SCL(n), red (first color) is written to the first sub-pixel 49_O of the pixel 48*b* arranged in the n-th row, and the same pixel signals of green (second color) or blue (third color) are simultaneously written to the second sub-pixel 49_E of the pixel 48*b* arranged in the n-th row and the second sub-pixel 49_E of the pixel 48*b* arranged in the (n−1)th row.

In the configuration of the second example illustrated in FIG. 27B, the scan line SCL(n) in the n-th row is coupled to the gates of the pixel transistors Tr of the first sub-pixels 49_O of the pixels 48*b* arranged in the n-th row, the gates of the first pixel transistors Tr1 of the second sub-pixels 49_E of the pixels 48*b* arranged in the n-th row, and the gates of the second pixel transistors Tr2 of the second sub-pixels 49_E of the pixels 48*b* arranged in the (n+1)th row.

As a result, with the configuration of the second example illustrated in FIG. 27B, by supplying the drive signal from the scan circuit 32*b* to the scan line SCL(n), red (first color) is written to the first sub-pixel 49_O of the pixel 48*b* arranged in the n-th row, and the same pixel signals of green (second color) or blue (third color) are simultaneously written to the second sub-pixel 49_E of the pixel 48*b* arranged in the n-th row and the second sub-pixel 49_E of the pixel 48*b* arranged in the (n+1)th row.

Figure 28:
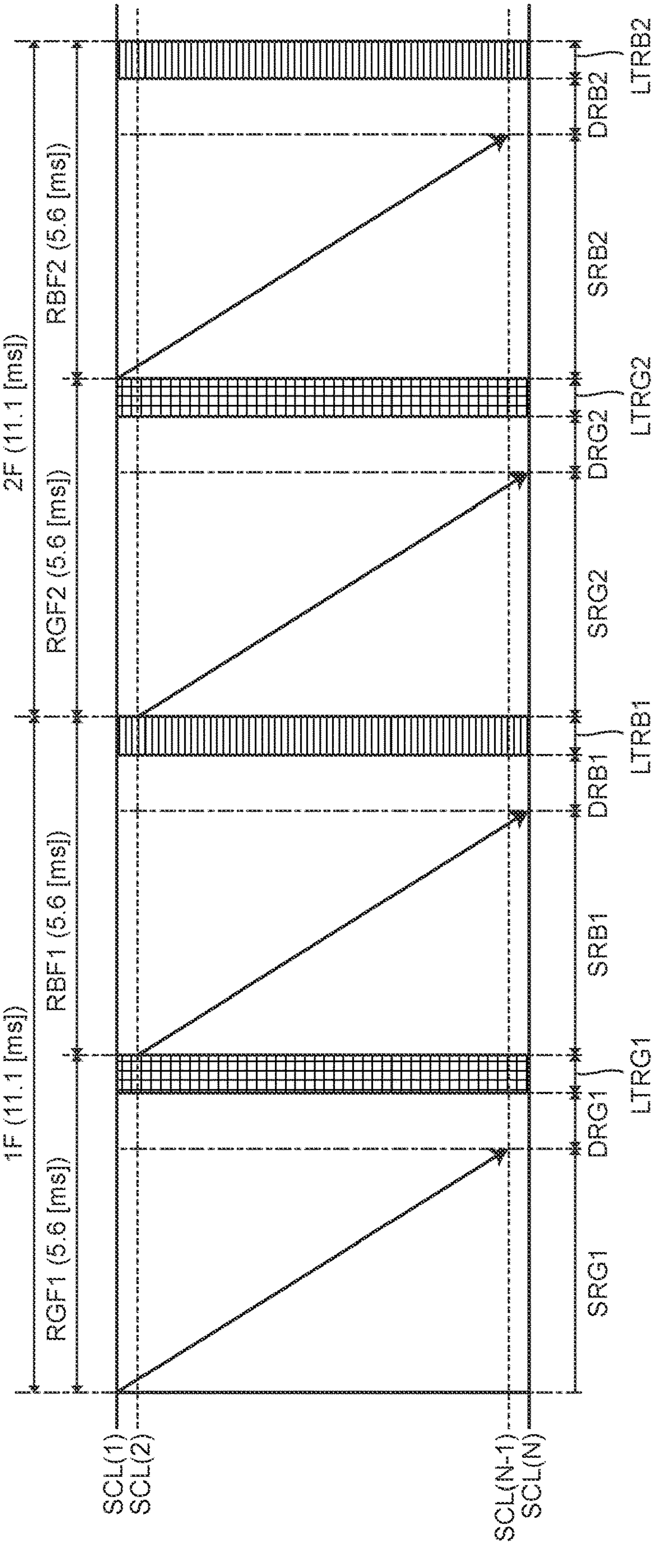
FIG. 28 is a timing diagram illustrating an example of the write period, the response period, and the light emission period in the first frame period and the second frame period of the display device according to the second modification of the second embodiment.

FIG. 28 is a timing diagram illustrating an example of the write period, the response period, and the light emission period in the first frame period and the second frame period of the display device according to the second modification of the second embodiment.

As illustrated in FIG. 28, in the second modification of the second embodiment, the first frame period 1F is divided into two periods of a first sub-field period RGF1 and a second sub-field period RBF1. The second frame period 2F is divided into two periods of a first sub-field period RGF2 and a second sub-field period RBF2.

Figure 29A:
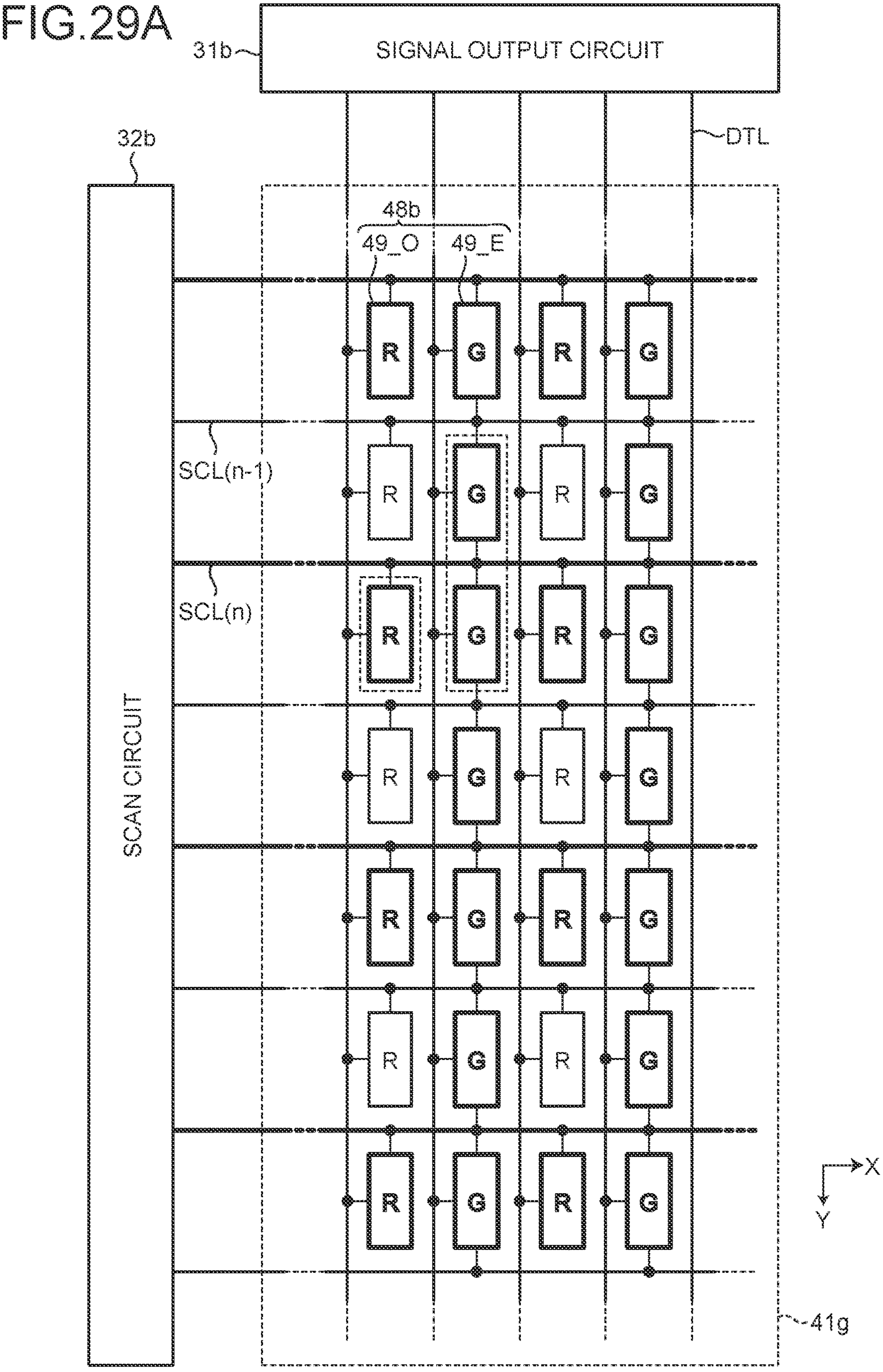
FIG. 29A is a diagram illustrating an exemplary display state in the first sub-field period of the first frame period of the display device according to a first example of the second modification of the second embodiment.
Figure 29B:
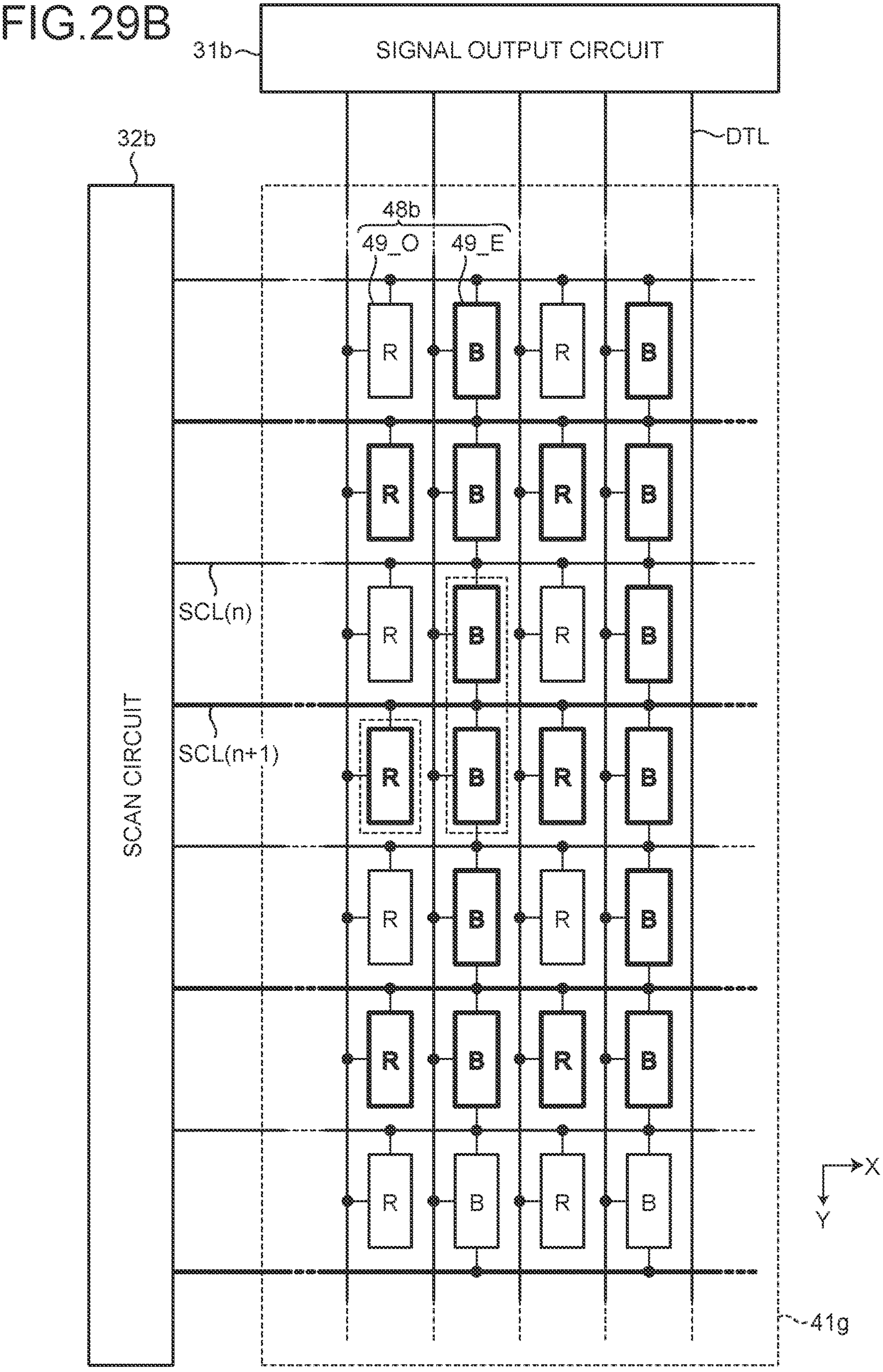
FIG. 29B is a diagram illustrating an exemplary display state in the second sub-field period of the first frame period of the display device according to the first example of the second modification of the second embodiment.
Figure 29C:
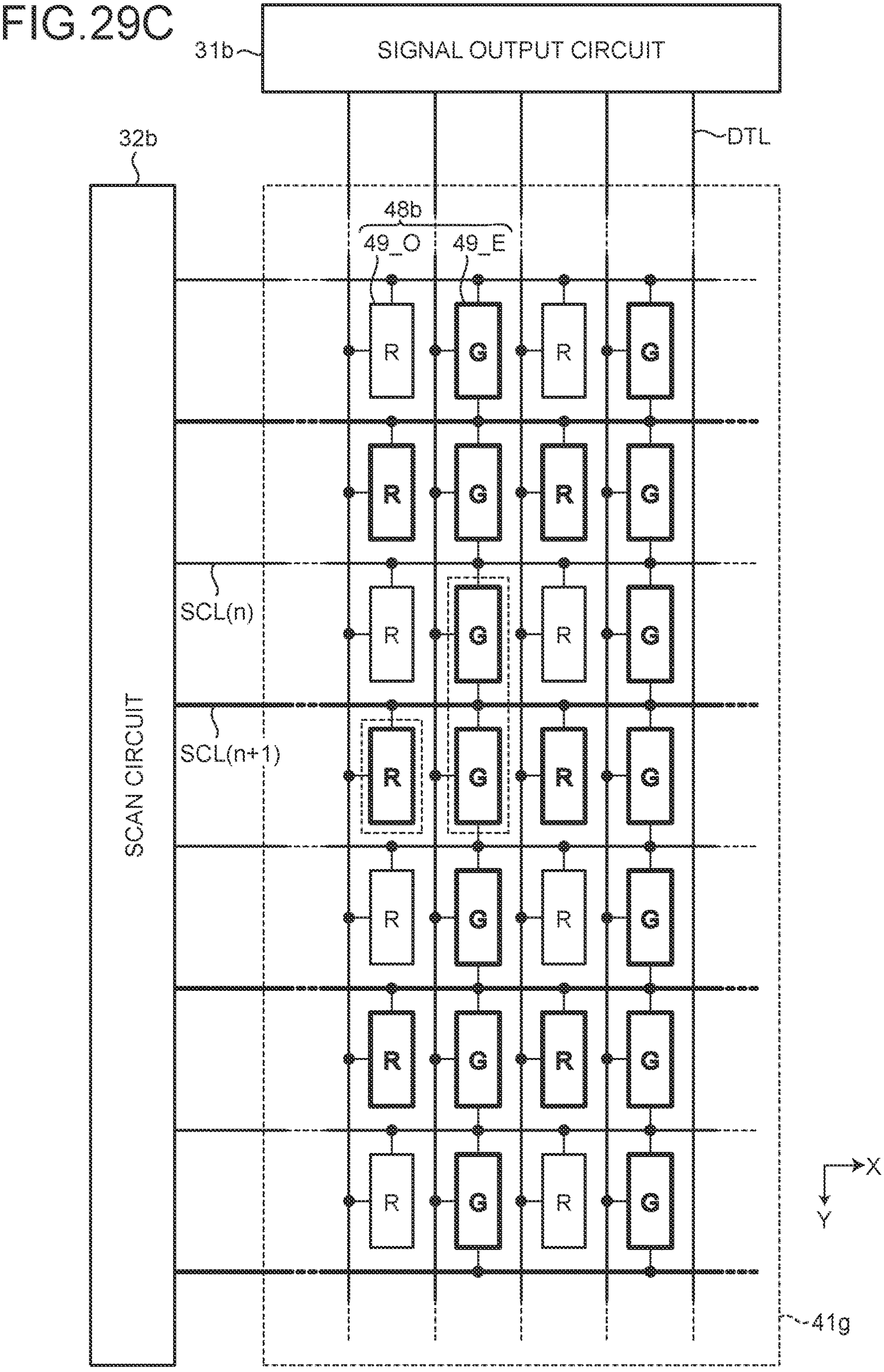
FIG. 29C is a diagram illustrating an exemplary display state in the first sub-field period of the second frame period of the display device according to the first example of the second modification of the second embodiment.
Figure 29D:
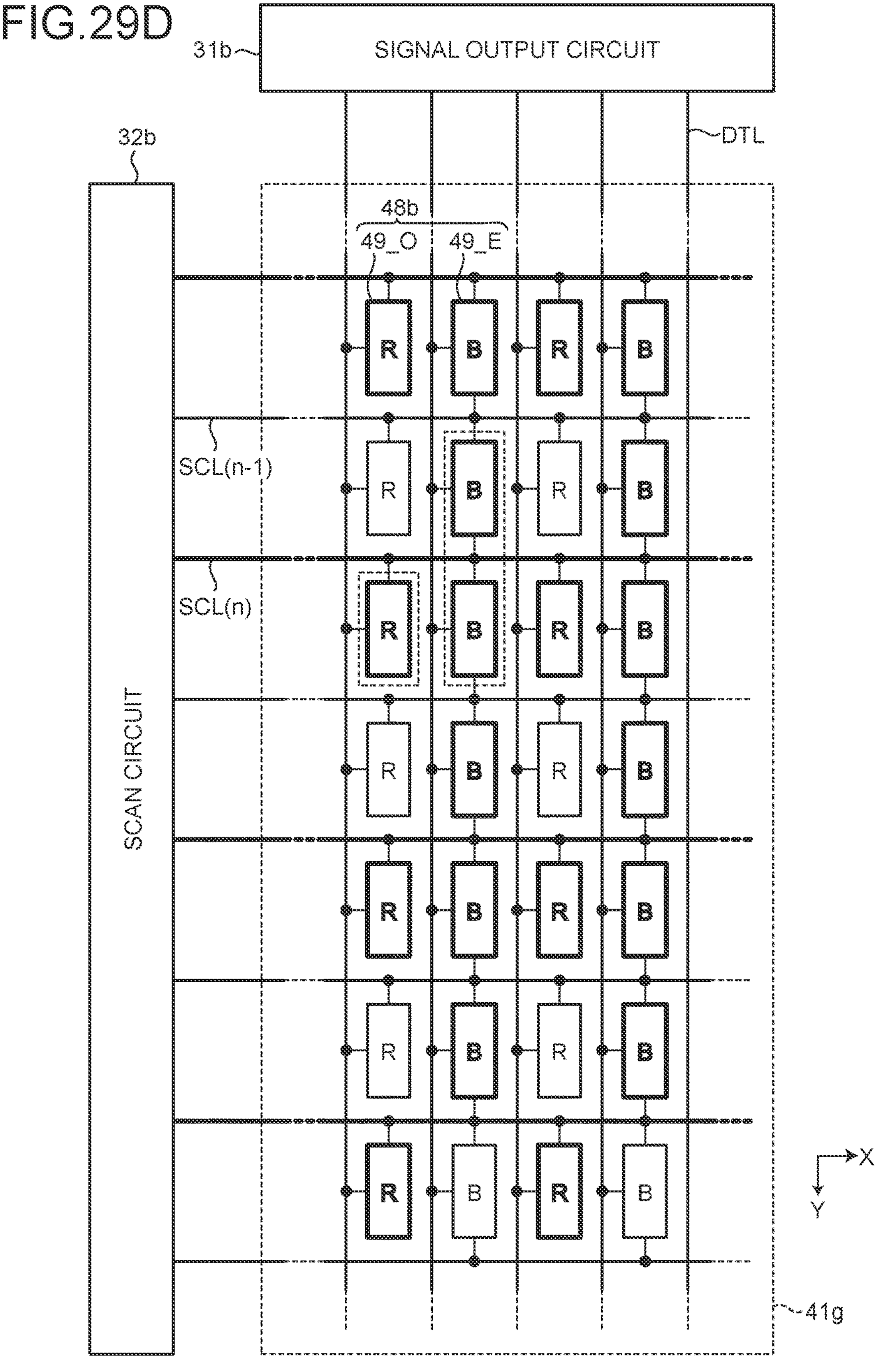
FIG. 29D is a diagram illustrating an exemplary display state in the second sub-field period of the second frame period of the display device according to the first example of the second modification of the second embodiment.

The following describes more specific operation examples in the first example of the pixel configuration according to the second modification of the second embodiment illustrated in FIG. 27A, with reference to FIGS. 29A, 29B, 29C, and 29D. FIG. 29A is a diagram illustrating an exemplary display state in the first sub-field period of the first frame period of the display device according to the first example of the second modification of the second embodiment. FIG. 29B is a diagram illustrating an exemplary display state in the second sub-field period of the first frame period of the display device according to the first example of the second modification of the second embodiment. FIG. 29C is a diagram illustrating an exemplary display state in the first sub-field period of the second frame period of the display device according to the first example of the second modification of the second embodiment. FIG. 29D is a diagram illustrating an exemplary display state in the second sub-field period of the second frame period of the display device according to the first example of the second modification of the second embodiment.

The first sub-field period RGF1 of the first frame period 1F includes a first write period SRG1 of writing the red (first color) pixel signals to the first sub-pixels 49_O in the odd-numbered rows and writing the same green (second color) pixel signals to the second sub-pixels 49_E arranged in the order of the even-numbered row and the odd-numbered row in the second direction. After the first write period SRG1, a first light emission period LTRG1 is provided to cause the light emitters 63R of red (first color) and the light emitters 63G of green (second color) to emit light simultaneously.

The scan circuit 32*b* sequentially supplies the drive signals to the scan lines SCL(1) to SCL(N−1) in the odd-numbered rows during the first write period SRG1 of the first sub-field period RGF1 of the first frame period 1F, and the signal output circuit 31*b* outputs the pixel signals corresponding to the first sub-pixels 49_O and the second sub-pixels 49_E.

As a result, the red (first color) pixel signals are written to the first sub-pixels 49_O in the n-th row coupled to the scan line SCL(n) in the odd-numbered row, and the green (second color) pixel signals for the n-th row are simultaneously written to the second sub-pixels 49_E in the (n−1)th row and the n-th row.

Then, during the first light emission period LTRG1 after a first response period DRG1, the light source control circuit 61*a* controls the light emitters 63R of red (first color) and the light emitters 63G of green (second color) to emit light simultaneously. As a result, in the first sub-field period RGF1 of the first frame period 1F, the display is performed in the state where the red (first color) pixel signals are written to the first sub-pixels 49_O in the n-th row and the green (second color) pixel signals for the n-th row are written to the second sub-pixels 49_E in the (n−1)th row and the n-th row, as illustrated in FIG. 29A.

The subsequent second sub-field period RBF1 of the first frame period 1F includes a second write period SRB1 of writing the red (first color) pixel signals to the first sub-pixels 49_O in the even-numbered rows and writing the same blue (third color) pixel signals to the second sub-pixels 49_E arranged in the order of the odd-numbered row and the even-numbered row in the second direction. After the second write period SRB1, a second light emission period LTRB1 is provided to cause the light emitters 63R of red (first color) and the light emitters 63B of blue (third color) to emit light simultaneously.

The scan circuit 32*b* sequentially supplies the drive signals to the scan lines SCL(2) to SCL(N) in the even-numbered rows during the second write period SRB1 of the second sub-field period RBF1 of the first frame period 1F, and the signal output circuit 31*b* outputs the pixel signals corresponding to the first sub-pixels 49_O and the second sub-pixels 49_E.

As a result, the red (first color) pixel signals are written to the first sub-pixels 49_O in the (n+1)th row coupled to the scan line SCL(n+1) in the even-numbered row, and the blue (third color) pixel signals for the (n+1)th row are simultaneously written to the second sub-pixels 49_E in the n-th row and the (n+1)th row.

Then, during the second light emission period LTRB1 after a second response period DRB1, the light source control circuit 61*a* controls the light emitters 63R of red (first color) and the light emitters 63B of blue (third color) to emit light simultaneously. As a result, in the second sub-field period RBF1 of the first frame period 1F, the display is performed in the state where the red (first color) pixel signals are written to the first sub-pixels 49_O in the (n+1)th row and the blue (third color) pixel signals for the (n+1)th row are written to the second sub-pixels 49_E in the n-th row and the (n+1)th row, as illustrated in FIG. 29B.

The first sub-field period RGF2 of the second frame period 2F includes a first write period SRG2 of writing the red (first color) pixel signals to the first sub-pixels 49_O in the even-numbered rows and writing the same green (second color) pixel signals to the second sub-pixels 49_E arranged in the order of the odd-numbered row and the even-numbered row in the second direction. After the first write period SRG2, a first light emission period LTRG2 is provided to cause the light emitters 63R of red (first color) and the light emitters 63G of green (second color) to emit light simultaneously.

The scan circuit 32*b* sequentially supplies the drive signals to the scan lines SCL(2) to SCL(N) in the even-numbered rows during the first write period SRG2 of the first sub-field period RGF2 of the second frame period 2F, and the signal output circuit 31*b* outputs the pixel signals corresponding to the first sub-pixels 49_O and the second sub-pixels 49_E.

As a result, the red (first color) pixel signals are written to the first sub-pixels 49_O in the (n+1)th row coupled to the scan line SCL(n+1) in the even-numbered row, and the green (second color) pixel signals for the (n+1)th row are simultaneously written to the second sub-pixels 49_E in the n-th row and the (n+1)th row.

Then, during the first light emission period LTRG2 after a first response period DRG2, the light source control circuit 61*a* controls the light emitters 63R of red (first color) and the light emitters 63G of green (second color) to emit light simultaneously. As a result, in the first sub-field period RGF2 of the second frame period 2F, the display is performed in the state where the red (first color) pixel signals are written to the first sub-pixels 49_O in the (n+1)th row and the green (second color) pixel signals for the (n+1)th row are written to the second sub-pixels 49_E in the n-th row and the (n+1)th row, as illustrated in FIG. 29C.

The subsequent second sub-field period RBF2 of the second frame period 2F includes a second write period SRB2 of writing the red (first color) pixel signals to the first sub-pixels 49_O in the odd-numbered rows and writing the same blue (third color) pixel signals to the second sub-pixels 49_E arranged in the order of the even-numbered row and the odd-numbered row in the second direction. After the second write period SRB2, a second light emission period LTRB2 is provided to cause the light emitters 63R of red (first color) and the light emitters 63B of blue (third color) to emit light simultaneously.

The scan circuit 32*b* sequentially supplies the drive signals to the scan lines SCL(1) to SCL(N−1) in the odd-numbered rows during the second write period SRB2 of the second sub-field period RBF2 of the second frame period 2F, and the signal output circuit 31*b* outputs the pixel signals corresponding to the first sub-pixels 49_O and the second sub-pixels 49_E.

As a result, the red (first color) pixel signals are written to the first sub-pixels 49_O in the n-th row coupled to the scan line SCL(n) in the odd-numbered row, and the blue (third color) pixel signals for the n-th row are simultaneously written to the second sub-pixels 49_E in the (n−1)th row and the n-th row.

Then, during the second light emission period LTRB2 after a second response period DRB2, the light source control circuit 61*a* controls the light emitters 63R of red (first color) and the light emitters 63B of blue (third color) to emit light simultaneously. As a result, in the second sub-field period RBF2 of the second frame period 2F, the display is performed in the state where the red (first color) pixel signals are written to the first sub-pixels 49_O in the n-th row and the blue (third color) pixel signals for the n-th row are written to the second sub-pixels 49_E in the (n−1)th row and the n-th row, as illustrated in FIG. 29D.

Figure 30A:
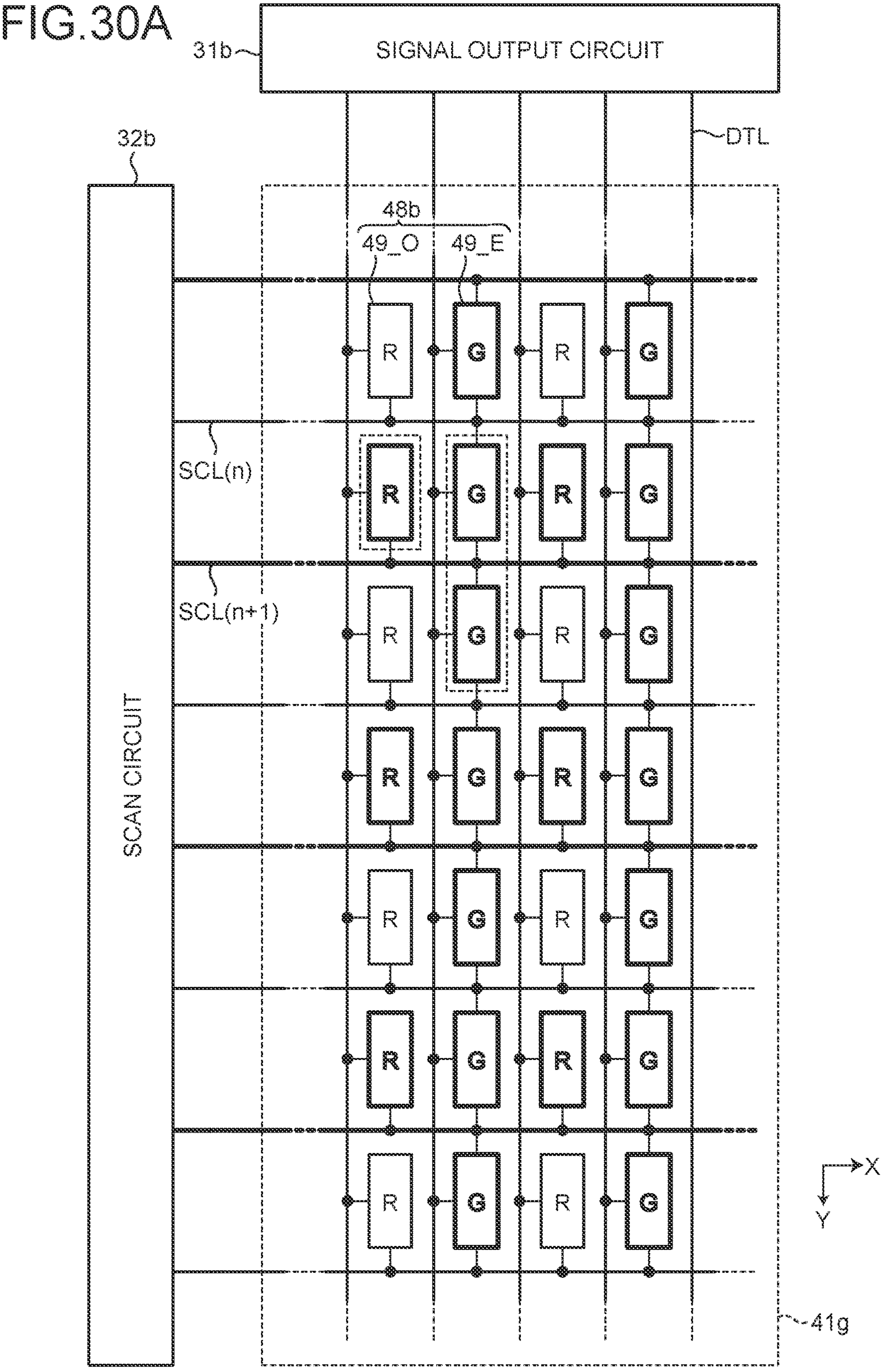
FIG. 30A is a diagram illustrating an exemplary display state in the first sub-field period of the first frame period of the display device according to a second example of the second modification of the second embodiment.
Figure 30B:
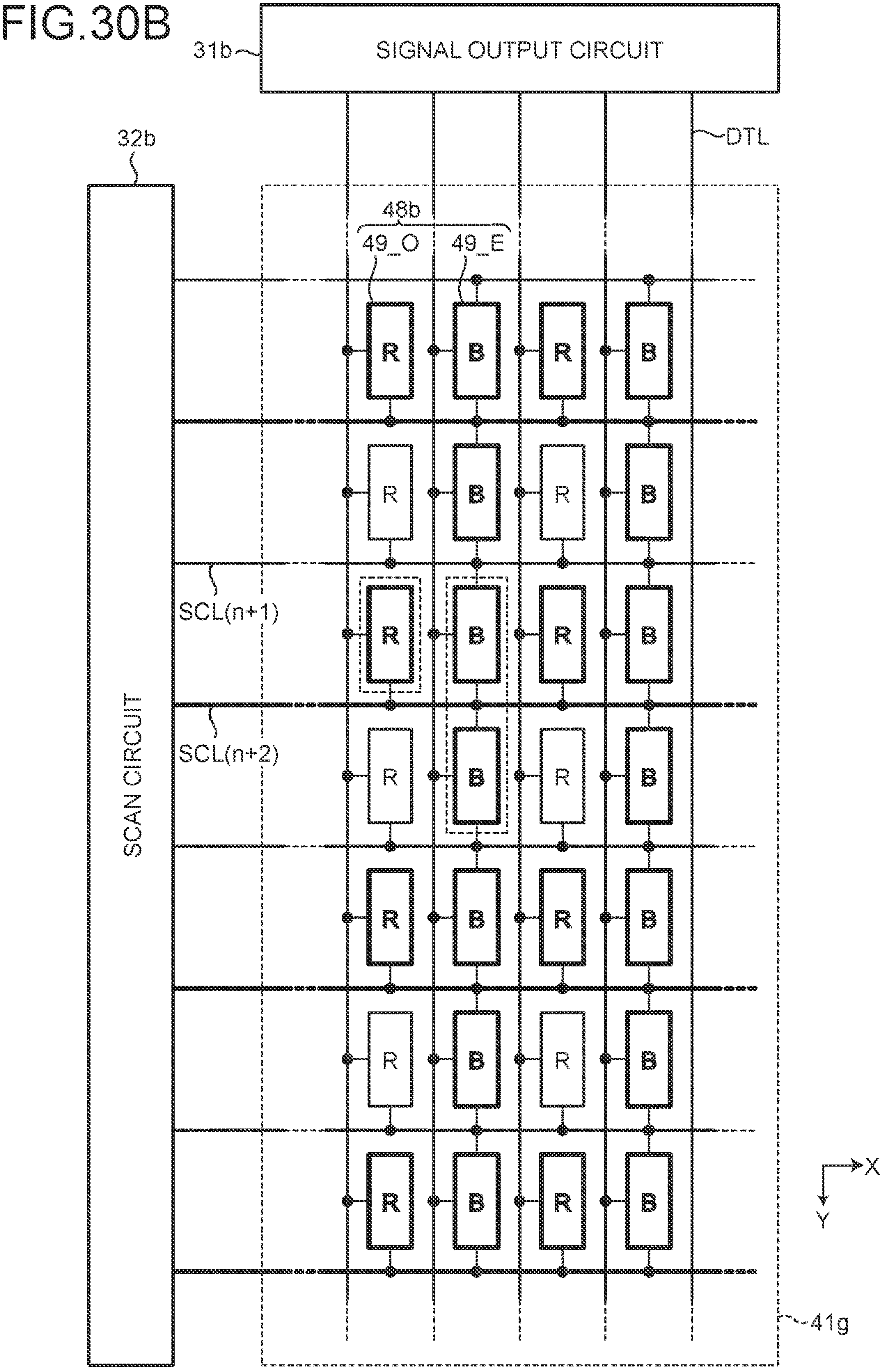
FIG. 30B is a diagram illustrating an exemplary display state in the second sub-field period of the first frame period of the display device according to the second example of the second modification of the second embodiment.
Figure 30C:
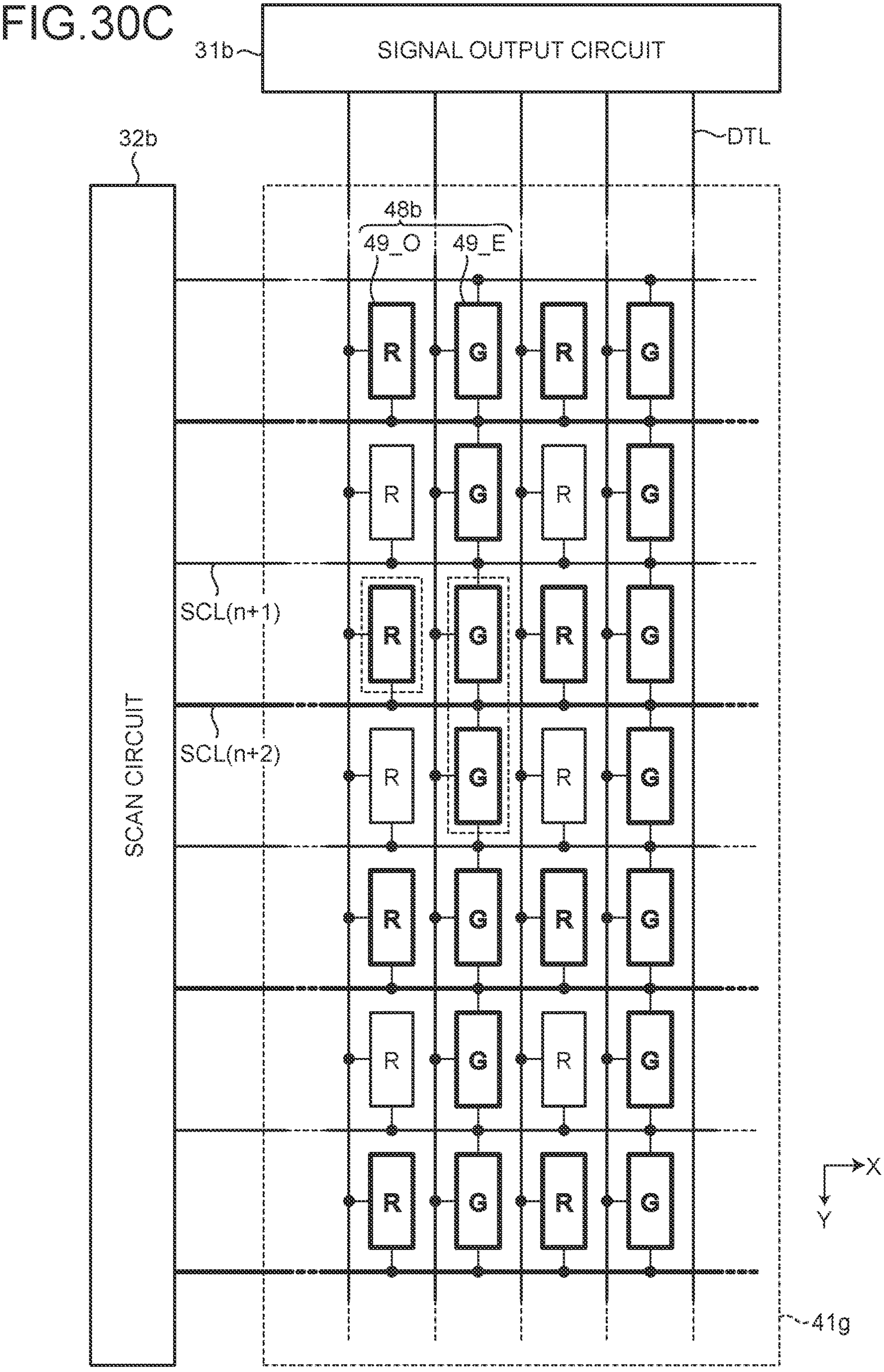
FIG. 30C is a diagram illustrating an exemplary display state in the first sub-field period of the second frame period of the display device according to the second example of the second modification of the second embodiment.
Figure 30D:
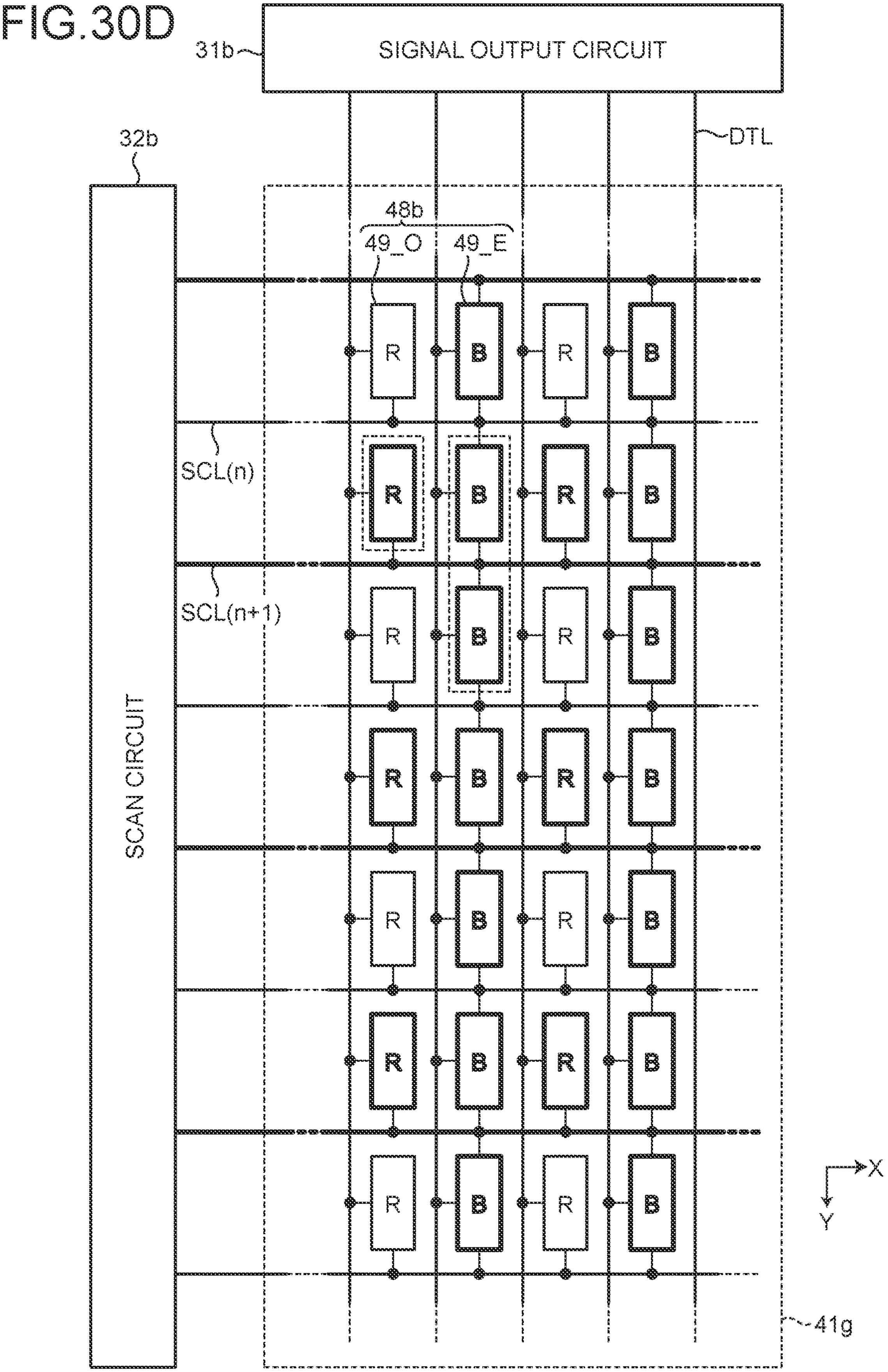
FIG. 30D is a diagram illustrating an exemplary display state in the second sub-field period of the second frame period of the display device according to the second example of the second modification of the second embodiment.

The following describes more specific operation examples in the second example of the pixel configuration according to the second modification of the second embodiment illustrated in FIG. 27B, with reference to FIGS. 30A, 30B, 30C, and 30D. FIG. 30A is a diagram illustrating an exemplary display state in the first sub-field period of the first frame period of the display device according to the second example of the second modification of the second embodiment. FIG. 30B is a diagram illustrating an exemplary display state in the second sub-field period of the first frame period of the display device according to the second example of the second modification of the second embodiment. FIG. 30C is a diagram illustrating an exemplary display state in the first sub-field period of the second frame period of the display device according to the second example of the second modification of the second embodiment. FIG. 30D is a diagram illustrating an exemplary display state in the second sub-field period of the second frame period of the display device according to the second example of the second modification of the second embodiment.

The first sub-field period RGF1 of the first frame period 1F includes the first write period SRG1 of writing the red (first color) pixel signals to the first sub-pixels 49_O in the odd-numbered rows and writing the same green (second color) pixel signals to the second sub-pixels 49_E arranged in the order of the odd-numbered row and the even-numbered row in the second direction. After the first write period SRG1, the first light emission period LTRG1 is provided to cause the light emitters 63R of red (first color) and the light emitters 63G of green (second color) to emit light simultaneously.

The scan circuit 32*b* sequentially supplies the drive signals to the scan lines SCL(1) to SCL(N−1) in the odd-numbered rows during the first write period SRG1 of the first sub-field period RGF1 of the first frame period 1F, and the signal output circuit 31*b* outputs the pixel signals corresponding to the first sub-pixels 49_O and the second sub-pixels 49_E.

As a result, the red (first color) pixel signals are written to the first sub-pixels 49_O in the n-th row coupled to the scan line SCL(n) in the odd-numbered row, and the green (second color) pixel signals for the n-th row are simultaneously written to the second sub-pixels 49_E in the n-th row and the (n+1)th row.

Then, during the first light emission period LTRG1 after the first response period DRG1, the light source control circuit 61*a* controls the light emitters 63R of red (first color) and the light emitters 63G of green (second color) to emit light simultaneously. As a result, in the first sub-field period RGF1 of the first frame period 1F, the display is performed in the state where the red (first color) pixel signals are written to the first sub-pixels 49_O in the n-th row and the green (second color) pixel signals for the n-th row are written to the second sub-pixels 49_E in the n-th row and the (n+1)th row, as illustrated in FIG. 30A.

The subsequent second sub-field period RBF1 of the first frame period 1F includes the second write period SRB1 of writing the red (first color) pixel signals to the first sub-pixels 49_O in the even-numbered rows and writing the same blue (third color) pixel signals to the second sub-pixels 49_E arranged in the order of the even-numbered row and the odd-numbered row in the second direction. After the second write period SRB1, the second light emission period LTRB1 is provided to cause the light emitters 63R of red (first color) and the light emitters 63B of blue (third color) to emit light simultaneously.

The scan circuit 32*b* sequentially supplies the drive signals to the scan lines SCL(2) to SCL(N) in the even-numbered rows during the second write period SRB1 of the second sub-field period RBF1 of the first frame period 1F, and the signal output circuit 31*b* outputs the pixel signals corresponding to the first sub-pixels 49_O and the second sub-pixels 49_E.

As a result, the red (first color) pixel signals are written to the first sub-pixels 49_O in the (n+1)th row coupled to the scan line SCL(n+1) in the even-numbered row, and the blue (third color) pixel signals for the (n+1)th row are simultaneously written to the second sub-pixels 49_E in the (n+1)th row and the (n+2)th row.

Then, during the second light emission period LTRB1 after the second response period DRB1, the light source control circuit 61*a* controls the light emitters 63R of red (first color) and the light emitters 63B of blue (third color) to emit light simultaneously. As a result, in the second sub-field period RBF1 of the first frame period 1F, the display is performed in the state where the red (first color) pixel signals are written to the first sub-pixels 49_O in the (n+1)th row and the blue (third color) pixel signals for the (n+1)th row are written to the second sub-pixels 49_E in the (n+1)th row and the (n+2)th row, as illustrated in FIG. 30B.

The first sub-field period RGF2 of the second frame period 2F includes the first write period SRG2 of writing the red (first color) pixel signals to the first sub-pixels 49_O in the even-numbered rows and writing the same green (second color) pixel signals to the second sub-pixels 49_E arranged in the order of the even-numbered row and the odd-numbered row in the second direction. After the first write period SRG2, the first light emission period LTRG2 is provided to cause the light emitters 63R of red (first color) and the light emitters 63G of green (second color) to emit light simultaneously.

The scan circuit 32*b* sequentially supplies the drive signals to the scan lines SCL(2) to SCL(N) in the even-numbered rows during the first write period SRG2 of the first sub-field period RGF2 of the second frame period 2F, and the signal output circuit 31*b* outputs the pixel signals corresponding to the first sub-pixels 49_O and the second sub-pixels 49_E.

As a result, the red (first color) pixel signals are written to the first sub-pixels 49_O in the (n+1)th row coupled to the scan line SCL(n+1) in the even-numbered row, and the green (second color) pixel signals for the (n+1)th row are simultaneously written to the second sub-pixels 49_E in the (n+1)th row and the (n+2)th row.

Then, during the first light emission period LTRG2 after the first response period DRG2, the light source control circuit 61*a* controls the light emitters 63R of red (first color) and the light emitters 63G of green (second color) to emit light simultaneously. As a result, in the first sub-field period RGF2 of the second frame period 2F, the display is performed in the state where the red (first color) pixel signals are written to the first sub-pixels 49_O in the (n+1)th row and the green (second color) pixel signals for the (n+1)th row are written to the second sub-pixels 49_E in the (n+1)th row and the (n+2)th row, as illustrated in FIG. 30C.

The subsequent second sub-field period RBF2 of the second frame period 2F includes the second write period SRB2 of writing the red (first color) pixel signals to the first sub-pixels 49_O in the odd-numbered rows and writing the same blue (third color) pixel signals to the second sub-pixels 49_E arranged in the order of the even-numbered row and the odd-numbered row in the second direction. After the second write period SRB2, the second light emission period LTRB2 is provided to cause the light emitters 63R of red (first color) and the light emitters 63B of blue (third color) to emit light simultaneously.

The scan circuit 32*b* sequentially supplies the drive signals to the scan lines SCL(1) to SCL(N−1) in the odd-numbered rows during the second write period SRB2 of the second sub-field period RBF2 of the second frame period 2F, and the signal output circuit 31*b* outputs the pixel signals corresponding to the first sub-pixels 49_O and the second sub-pixels 49_E.

As a result, the red (first color) pixel signals are written to the first sub-pixels 49_O in the n-th row coupled to the scan line SCL(n) in the odd-numbered row, and the blue (third color) pixel signals for the n-th row are simultaneously written to the second sub-pixels 49_E in the n-th row and the (n+1)th row.

Then, during the second light emission period LTRB2 after the second response period DRB2, the light source control circuit 61*a* controls the light emitters 63R of red (first color) and the light emitters 63B of blue (third color) to emit light simultaneously. As a result, in the second sub-field period RBF2 of the second frame period 2F, the display is performed in the state where the red (first color) pixel signals are written to the first sub-pixels 49_O in the n-th row and the blue (third color) pixel signals for the n-th row are written to the second sub-pixels 49_E in the n-th row and the (n+1)th row, as illustrated in FIG. 30D.

In the configuration and the operation of the second modification of the second embodiment, the number of rows written in each of the sub-field periods is half that of the second modification of the first embodiment. As a result, the write period in each of the sub-field periods can be shortened from that in the second modification of the first embodiment described above.

Although the preferred embodiments of the present disclosure have been described above, the present disclosure is not limited to the embodiments described above. The content disclosed in the embodiments is merely an example, and can be variously modified within the scope not departing from the gist of the present disclosure. For example, any modifications appropriately made within the scope not departing from the gist of the present disclosure also naturally belong to the technical scope of the present disclosure.

What is claimed is:

1. A display device comprising:
- a display panel having a display area in which a plurality of pixels are arranged in a first direction and a second direction orthogonal to the first direction; and
- a light source configured to emit light to the display panel, wherein
- each of the pixels includes:
  - a first sub-pixel including a color filter for a first color; and
  - a second sub-pixel that is arranged adjacent to the first sub-pixel in the first direction and includes a color filter for a complementary color between a second color and a third color,
- the light source includes:
  - a first light emitter configured to emit light in the first color;
  - a second light emitter configured to emit light in the second color; and
  - a third light emitter configured to emit light in the third color, and
- one frame period in which one screen is displayed in the display area includes:

a first light emission period of causing the first light emitter and the second light emitter to emit light simultaneously; and a second light emission period of causing the first light emitter and the third light emitter to emit light simultaneously.

2. The display device according to claim 1, wherein the first color is green, the second color is red, and the third color is blue.

3. The display device according to claim 1, wherein the first color is blue, the second color is red, and the third color is green.

4. The display device according to claim 1, wherein the first color is red, the second color is green, and the third color is blue.

5. The display device according to claim 1, wherein the one frame period includes a first sub-field period and a second sub-field period, the first sub-field period includes a first write period of writing a pixel signal of the first color to the first sub-pixel and writing a pixel signal of the second color to the second sub-pixel, and the first light emission period after the first write period, and the second sub-field period includes a second write period of writing a pixel signal of the first color to the first sub-pixel and writing a pixel signal of the third color to the second sub-pixel, and the second light emission period after the second write period.

6. The display device according to claim 5, further comprising:

a plurality of scan lines each coupled to gates of respective pixel transistors of the first sub-pixels and the second sub-pixels of the pixels arranged in the first direction; and a scan circuit configured to supply drive signals to the scan lines, wherein the scan circuit is configured to:

sequentially supply the drive signals to the scan lines in the first write period; and sequentially supply the drive signals to the scan lines in the second write period.

7. The display device according to claim 5, wherein a pixel signal of the first color is written to the first sub-pixel of the pixel in one of an odd-numbered row and an even-numbered row in the first write period, and a pixel signal of the first color is written to the first sub-pixel of the pixel in the other of the odd-numbered row and the even-numbered row in the second write period.

8. The display device according to claim 7, wherein in one of the first write period and the second write period, same pixel signals of one of the second color and the third color are simultaneously written to the second sub-pixels arranged in an order of the even-numbered row and the odd-numbered row in the second direction, and in the other of the first write period and the second write period, same pixel signals of the other of the second color and the third color are simultaneously written to the second sub-pixels arranged in an order of the odd-numbered row and the even-numbered row in the second direction.

9. The display device according to claim 5, wherein in the first write period of a first frame period, a pixel signal of the first color is written to the first sub-pixel in an odd-numbered row, and same pixel signals of the second color are simultaneously written to the second sub-pixels arranged in an order of an even-numbered row and the odd-numbered row in the second direction, in the second write period of the first frame period, a pixel signal of the first color is written to the first sub-pixel in the even-numbered row, and same pixel signals of the third color are simultaneously written to the second sub-pixels arranged in an order of the odd-numbered row and the even-numbered row in the second direction, in the first write period of a second frame period subsequent to the first frame period, a pixel signal of the first color is written to the first sub-pixel in the even-numbered row, and same pixel signals of the second color are simultaneously written to the second sub-pixels arranged in the order of the odd-numbered row and the even-numbered row in the second direction, and in the second write period of the second frame period, a pixel signal of the first color is written to the first sub-pixel in the odd-numbered row, and same pixel signals of the third color are simultaneously written to the second sub-pixels arranged in the order of the even-numbered row and the odd-numbered row in the second direction.

10. The display device according to claim 5, wherein in the first write period of a first frame period, a pixel signal of the first color is written to the first sub-pixel in an odd-numbered row, and same pixel signals of the second color are simultaneously written to the second sub-pixels arranged in an order of the odd-numbered row and an even-numbered row in the second direction, in the second write period of the first frame period, a pixel signal of the first color is written to the first sub-pixel in the even-numbered row, and same pixel signals of the third color are simultaneously written to the second sub-pixels arranged in an order of the even-numbered row and the odd-numbered row in the second direction, in the first write period of a second frame period subsequent to the first frame period, a pixel signal of the first color is written to the first sub-pixel in the even-numbered row, and same pixel signals of the second color are simultaneously written to the second sub-pixels arranged in the order of the even-numbered row and the odd-numbered row in the second direction, and in the second write period of the second frame period, a pixel signal of the first color is written to the first sub-pixel in the odd-numbered row, and same pixel signals of the third color are simultaneously written to the second sub-pixels arranged in the order of the odd-numbered row and the even-numbered row in the second direction.

11. The display device according to claim 5, wherein

N of the pixels (where N is a natural number) are arranged in the second direction in the display area, in the first write period of a first frame period, a pixel signal of the first color is written to the first sub-pixel in an n-th row (where n is a natural number from 1 to N), and a pixel signal of the second color for the n-th row is simultaneously written to the second sub-pixels in an (n−1)th row and the n-th row, in the second write period of the first frame period, a pixel signal of the first color is written to the first sub-pixel in an (n+1)th row, and a pixel signal of the third color for the (n+1)th row is simultaneously written to the second sub-pixels in the n-th row and the (n+1)th row, in the first write period of a second frame period subsequent to the first frame period, a pixel signal of the first color is written to the first sub-pixel in the (n+1)th row, and a pixel signal of the second color for the (n+1)th row is simultaneously written to the second sub-pixels in the n-th row and the (n+1)th row, and in the second write period of the second frame period, a pixel signal of the first color is written to the first sub-pixel in the n-th row, and a pixel signal of the third color for the n-th row is simultaneously written to the second sub-pixels in the (n−1)th row and the n-th row.

12. The display device according to claim 5, wherein

N of the pixels (where N is a natural number) are arranged in the second direction in the display area, in the first write period of a first frame period, a pixel signal of the first color is written to the first sub-pixel in an n-th row (where n is a natural number from 1 to N), and a pixel signal of the second color for the n-th row is simultaneously written to the second sub-pixels in the n-th row and an (n+1)th row, in the second write period of the first frame period, a pixel signal of the first color is written to the first sub-pixel in the (n+1)th row, and a pixel signal of the third color for the (n+1)th row is simultaneously written to the second sub-pixels in the (n+1)th row and an (n+2)th row, in the first write period of a second frame period subsequent to the first frame period, a pixel signal of the first color is written to the first sub-pixel in the (n+1)th row, and a pixel signal of the second color for the (n+2)th row is simultaneously written to the second sub-pixels in the (n+1)th row and the (n+2)th row, and in the second write period of the second frame period, a pixel signal of the first color is written to the first sub-pixel in the n-th row, and a pixel signal of the third color for the n-th row is simultaneously written to the second sub-pixels in the n-th row and the (n+1)th row.

13. The display device according to claim 5, wherein

N of the pixels (where N is a natural number) are arranged in the second direction in the display area, the first sub-pixel includes one pixel transistor, the second sub-pixel includes a first pixel transistor and a second pixel transistor coupled in parallel to the first pixel transistor, and the display device further includes:

a plurality of scan lines coupled to gates of respective pixel transistors of the first sub-pixels of the pixels arranged in an n-th row (where n is a natural number from 1 to N), gates of the respective first pixel transistors of the second sub-pixels of the pixels arranged in the n-th row, and gates of the respective second pixel transistors of the second sub-pixels of the pixels arranged in an (n−1)th row; and a scan circuit configured to supply drive signals to the scan lines.

14. The display device according to claim 5, wherein

N of the pixels (where N is a natural number) are arranged in the second direction in the display area, the first sub-pixel includes one pixel transistor, the second sub-pixel includes a first pixel transistor and a second pixel transistor coupled in parallel to the first pixel transistor, and the display device further includes:

a plurality of scan lines coupled to gates of respective pixel transistors of the first sub-pixels of the pixels arranged in an n-th row (where n is a natural number from 1 to N), gates of the respective first pixel transistors of the second sub-pixels of the pixels arranged in the n-th row, and gates of the respective second pixel transistors of the second sub-pixels of the pixels arranged in an (n+1)th row; and a scan circuit configured to supply drive signals to the scan lines.

15. The display device according to claim 13, wherein the scan circuit is configured to:

sequentially supply drive signals to scan lines in odd-numbered rows among the plurality of scan lines in the first write period of a first frame period;

sequentially supply the drive signals to scan lines in even-numbered rows among the plurality of scan lines in the second write period of the first frame period;

sequentially supply the drive signals to scan lines in the even-numbered rows among the plurality of scan lines in the first write period of a second frame period subsequent to the first frame period; and sequentially supply the drive signals to scan lines in the odd-numbered rows among the plurality of scan lines in the second write period of the second frame period.

16. The display device according to claim 14, wherein the scan circuit is configured to:

sequentially supply drive signals to scan lines in odd-numbered rows among the plurality of scan lines in the first write period of a first frame period;

sequentially supply the drive signals to scan lines in even-numbered rows among the plurality of scan lines in the second write period of the first frame period;

sequentially supply the drive signals to scan lines in the even-numbered rows among the plurality of scan lines in the first write period of a second frame period subsequent to the first frame period; and sequentially supply the drive signals to scan lines in the odd-numbered rows among the plurality of scan lines in the second write period of the second frame period.

* * * * *